(12) United States Patent
Homchaudhuri et al.

(10) Patent No.: US 9,820,229 B2
(45) Date of Patent: Nov. 14, 2017

(54) DYNAMIC VOLTAGE AND FREQUENCY SCALING IN WIRELESS MODEMS

(71) Applicant: QUALCOMM Incorporated, San Diego, CA (US)

(72) Inventors: Sandip Homchaudhuri, San Jose, CA (US); Joseph Duncan, San Diego, CA (US); Xiaoru Zhang, Saratoga, CA (US); MeeLan Lee, Los Altos, CA (US); Arunkumar Jayaraman, San Jose, CA (US); Derrick Chu Lin, Belmont, CA (US); Srenik Mehta, Union City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 13/954,035

(22) Filed: Jul. 30, 2013

(65) Prior Publication Data

US 2014/0301259 A1 Oct. 9, 2014

Related U.S. Application Data

(60) Provisional application No. 61/809,257, filed on Apr. 5, 2013.

(51) Int. Cl.
*H04W 52/02* (2009.01)
*G06F 1/32* (2006.01)

(52) U.S. Cl.
CPC ........ *H04W 52/0229* (2013.01); *G06F 1/324* (2013.01); *G06F 1/3206* (2013.01);
(Continued)

(58) Field of Classification Search
CPC ......... H04W 52/0229; H04W 52/0216; H04W 52/0219; H04W 52/0212; H04W 52/0245;
(Continued)

(56) References Cited

U.S. PATENT DOCUMENTS 8,238,868 B2 * 8/2012 Duan ................. G01R 33/0029
                                                        323/267
8,934,504 B2   1/2015 Schwartz et al.
(Continued)

FOREIGN PATENT DOCUMENTS

CN        1765063 A    4/2006
CN      101874356 A   10/2010
EP        1422596 A2   5/2004

OTHER PUBLICATIONS

ISA/EPO, International Search Report and Written Opinion of the International Searching Authority, Int'l App. No. PCT/US2014/032699, Jul. 29, 2014, European Patent Office, Rijswijk, NL, 12 pgs.

*Primary Examiner* — Habte Mered
*Assistant Examiner* — Rownak Islam
(74) *Attorney, Agent, or Firm* — Holland & Hart LLP

(57) ABSTRACT

Methods and apparatuses are described in which dynamic voltage and frequency scaling may be used to save power when processing packets in a wireless communications device. In some cases, inframe detection may allow the device to determine whether to transition from a first (e.g., lower) voltage level to a second (e.g., higher) voltage level to process one or more packets of a received frame. For some packet types the first voltage level may be maintained. In other cases, the device may determine a bandwidth to use from among multiple bandwidths supported by the device. The bandwidth may be determined based on channel conditions. A voltage level may be identified that corresponds to the determined bandwidth and a processing voltage may be scaled to the identified voltage level. The device may be configured to operate in wireless local area network (WLAN) and/or in a cellular network (e.g., LTE).

23 Claims, 30 Drawing Sheets

(52) U.S. Cl.
CPC ........ *G06F 1/3296* (2013.01); *H04W 52/029* (2013.01); *H04W 52/0216* (2013.01); *Y02B 60/1217* (2013.01); *Y02B 60/1285* (2013.01); *Y02B 60/50* (2013.01)

(58) Field of Classification Search
CPC ......... H04W 52/0209; H04W 52/0251; H04W 52/0261; H04W 52/02; H04W 52/029; H04W 52/0232; H04W 52/028; H04W 52/0296; H04W 52/0277; G06F 1/329; G06F 1/3206; G06F 1/3212; G06F 1/3203; G06F 1/3296; G06F 1/324; G06F 1/3243; G06F 1/3287; Y02B 60/50; Y02B 60/1217; Y02B 60/1285; Y02B 60/1282
USPC .................................................. 370/311, 310
See application file for complete search history.

(56) References Cited

U.S. PATENT DOCUMENTS

| | | | | |
|---|---|---|---|---|
| 2004/0215986 | A1* | 10/2004 | Shakkarwar | G06F 1/3296 713/300 |
| 2004/0246891 | A1* | 12/2004 | Kay | H04L 27/0008 370/215 |
| 2005/0276276 | A1* | 12/2005 | Davis | 370/447 |
| 2006/0246857 | A1* | 11/2006 | Grillo et al. | 455/127.1 |
| 2007/0133458 | A1 | 6/2007 | Chandra et al. | |
| 2008/0297133 | A1* | 12/2008 | Duan et al. | 323/318 |
| 2008/0304432 | A1 | 12/2008 | Lee et al. | |
| 2009/0047902 | A1 | 2/2009 | Nory et al. | |
| 2009/0135752 | A1 | 5/2009 | Su et al. | |
| 2009/0276639 | A1* | 11/2009 | Saha | H02M 3/156 713/300 |
| 2010/0191990 | A1* | 7/2010 | Zhang | G06F 12/0864 713/320 |
| 2010/0284393 | A1* | 11/2010 | Abraham | H04L 5/0023 370/343 |
| 2011/0194545 | A1* | 8/2011 | Yang | H04L 5/0023 370/338 |
| 2011/0228689 | A1 | 9/2011 | Wu et al. | |
| 2011/0230172 | A1 | 9/2011 | Pollin et al. | |
| 2012/0063335 | A1 | 3/2012 | Cho et al. | |
| 2012/0063353 | A1* | 3/2012 | Schlenk | H04L 12/12 370/253 |
| 2012/0064849 | A1* | 3/2012 | Langer | H04B 1/04 455/127.2 |
| 2012/0114021 | A1* | 5/2012 | Chung | H04B 7/155 375/211 |
| 2012/0177017 | A1* | 7/2012 | Gong | H04W 74/0816 370/338 |
| 2012/0210325 | A1* | 8/2012 | de Lind van Wijngaarden | H04W 52/0258 718/103 |
| 2012/0257558 | A1 | 10/2012 | Shin et al. | |
| 2012/0315961 | A1 | 12/2012 | Chen et al. | |
| 2013/0007516 | A1* | 1/2013 | Wu | G06F 11/076 714/15 |
| 2013/0029618 | A1 | 1/2013 | Pedersen et al. | |
| 2013/0149972 | A1 | 6/2013 | Luong et al. | |
| 2013/0252558 | A1* | 9/2013 | Nieto | H04W 72/08 455/73 |
| 2014/0113690 | A1* | 4/2014 | Shanmugasundaram | H04W 52/0225 455/574 |
| 2014/0301262 | A1 | 10/2014 | Homchaudhuri et al. | |

\* cited by examiner

DYNAMIC VOLTAGE AND FREQUENCY SCALING IN WIRELESS MODEMS

CROSS-REFERENCES

The present application for patent claims priority to U.S. Provisional Patent Application No. 61/809,257, entitled "DYNAMIC VOLTAGE AND FREQUENCY SCALING IN WIRELESS MODEMS" by Homchaudhuri et al., filed Apr. 5, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communication network may include a number of network devices such as access points (APs) and/or base stations or Node-Bs that can support communication for a number of wireless devices. A wireless device may communicate with a network device bidirectionally. For example, in cellular networks, a user equipment (UE) may communicate with a base station via downlink and uplink. The downlink (or forward link) refers to the communication link from the base station to the UE, and the uplink (or reverse link) refers to the communication link from the UE to the base station. A similar form of communication may occur between a wireless device (e.g., station or STA) and an access point in a wireless local area network (WLAN).

In WLANs, for example, the access point may send data to at least one client device in the form of one or more frames. To reduce power consumption, a client device may operate in a low power consumption mode (e.g., a sleep mode) in some circumstances, such as when the client device is not being used for communication with the access point. In other circumstances, however, reducing the power consumption of the client device may prove challenging because the bandwidth of the signals received by the client device (e.g., signals carrying frames) may not be known. In those cases, such as during a listening mode or an active receive/transmit mode, for example, additional mechanisms may be needed to reduce power consumption. Moreover, similar mechanisms may also be needed for wireless devices used in cellular networks (e.g., UEs).

SUMMARY

Methods and apparatuses are described for wireless communications in which dynamic voltage and frequency scaling (DVFS) may be used to save power when processing packets in a wireless communications device. In some cases, inframe or within frame detection may allow the wireless communications device to determine whether to transition from a first (e.g., lower) voltage level to a second (e.g., higher) voltage level to process one or more packets of a received frame. The second voltage may be selected from multiple voltages based, at least in part, on a bandwidth. For example, different bandwidths may be used and each bandwidth may have a different second voltage associated with it. A lower voltage level may be selected at first to enable sufficient processing (e.g., clocking frequency) of certain types of packets or frames. When a high or very high throughput packet is detected, applying a higher voltage level may allow for higher clock frequencies that are then used to digitally process the contents of the high or very high throughput packets.

In some embodiments, the wireless communications device determines a bandwidth to use from among multiple bandwidths supported by the device. For example, current WLAN devices may support 20 Megahertz (MHz), 40 MHz, 80 MHz, and/or 160 MHz bandwidths. Other wireless devices may support more, fewer, and/or different bandwidths than a WLAN device. The bandwidth may be determined based on channel conditions. In opportunistic wireless systems the bandwidth may be determined using Clear Channel Assessment (CCA) techniques, or in another embodiment, the bandwidth is determined based on higher control plane decisions of the wireless protocol stack. A voltage level may be identified that corresponds to the determined bandwidth and a processing voltage may be scaled to the identified voltage level. For example, one bandwidth may use a first voltage level while a higher bandwidth may use a second voltage level higher than the first voltage level. As noted above, a higher voltage level may allow for higher clock frequencies for digital processing, which may be needed to sustain that mode of operation. The wireless communications device may be configured to operate in a WLAN (also referred to as a Wi-Fi network) and/or in a cellular network (e.g., 3GPP Long Term Evolution or LTE).

A method for wireless communications includes operating at a first voltage level in a wireless communications device. The method includes detecting, within a received frame, a frame metric associated with one or more packets of the received frame. The method further includes determining whether to transition to a second voltage level to process at least a portion of the one or more packets of the received frame based on the detected frame metric. The frame metric may include one or more of a throughput category, a destination of a packet, a transmission grant, and a reception grant. In some embodiments, the method includes applying the second voltage level to one or more subsystems of the wireless communications device. Operating at different voltages may result in different clock frequencies for digital processing.

In some embodiments of the method, the method includes scaling from the first voltage level to the second voltage level, where the second voltage level is greater than the first voltage level. The method may include scaling from the second voltage level to the first voltage level for a next received frame after processing the at least a portion of the one or more packets of the received frame at the second voltage level. The detecting may include detecting the frame metric within a preamble of the received frame.

In some embodiments of the method, the one or more packets in the received frame are IEEE 802.11ac packets. Each of the one or more packets may be a very high throughput (VHT) packet, and the detecting may include detecting the frame metric during the VHT short training field (VHT-STF) of one or more the received VHT packets. The scaling from the first voltage level to the second voltage level may occur within the VHT packet, where the second voltage level is greater than the first voltage level. In some embodiments, the one or more packets are high throughput (HT) packets, and the method includes scaling from the first voltage level to the second voltage level to process at least a portion of one or more of the HT packets, where the second voltage level is greater than the first voltage level. In some embodiments, the one or more packets are legacy packets, and the method includes maintaining the first voltage level for processing one or more of the legacy packets.

In some embodiments of the method, the method includes determining whether the frame is destined for the wireless communications device, and operating at the first voltage level when the frame is not destined for the wireless communications device. The determining may include identifying a media access control (MAC) portion of the frame, and determining a destination of the frame from the MAC portion of the frame. The determining may include identifying a partial association identifier (pAID) field or a group identifier (GID) field in the frame, and determining a destination of the frame from the pAID field or the GID field.

In some embodiments of the method, the method includes identifying a bandwidth associated with the one or more packets of received frame, and scaling from the first voltage level to the second voltage level based at least in part on the frame metric and the identified bandwidth. The frame metric may be a bandwidth associated with one or more packets of the received frame. The method may include identifying a different bandwidth associated with the one or more packets of received frame, and scaling from the second voltage level to a third voltage level based at least in part on the frame metric and the identified different bandwidth. In some embodiments, the method may include scaling from a first clock frequency (e.g., a first clock frequency for digital processing) to a second clock frequency (e.g., a second clock frequency for digital processing) based on the frame metric, where the second clock frequency is greater than the first clock frequency.

In some embodiments of the method, the frame includes an LTE sub-frame having a first slot and a second slot, where the first slot includes a region with physical downlink control channel (PDCCH) information, and the detecting includes detecting the frame metric within the region in the first slot. In some embodiments, the method includes determining from the frame metric whether a portion of the frame is to be decoded by an LTE modem and scaling from the first voltage to the second voltage to process the portion of the frame when a determination is made that the portion of the frame is not to be decoded by the LTE modem.

A method for wireless communications includes determining a bandwidth to be used at a wireless communications device from multiple bandwidths supported by the wireless communications device (e.g., 20 MHz, 40 MHz, 80 MHz, and/or 160 MHz for WLAN devices). The method includes identifying a voltage level to use at the wireless communications device based on the determined bandwidth. The method also includes scaling a voltage level to the identified voltage level to process a frame. In some embodiments, the method includes transmitting the frame while operating at the scaled voltage level. In some embodiments, the method includes receiving the frame having one or more packets, and processing at least a portion of the one or more packets of the received frame at the scaled voltage level. In some embodiments, the method includes receiving the frame having one or more packets, detecting, within the received frame, a frame metric associated with one or more packets of the received frame, and processing at least a portion of the one or more packets of the received frame at the scaled voltage level based on the frame metric and the determined bandwidth.

In some embodiments of the method, each of the bandwidths supported by the wireless communications device has a corresponding voltage level that is different from the voltage level of another bandwidth, and the identified voltage level is the voltage level corresponding to the determined bandwidth. In some embodiments, the method includes adjusting, based on the determined bandwidth, one or more physical layer (PHY) clocks or similar sources of timing or synchronization signals that are used by the wireless communications device.

In some embodiments of the method, the determining includes determining the bandwidth to be used at the wireless communications device based on channel conditions (e.g., CCA techniques) associated with the wireless communications device. The scaling may include scaling to the identified voltage level from a voltage level corresponding to a bandwidth different from the determined bandwidth. The method may include applying the scaled voltage level to one or more subsystems of the wireless communications device.

An apparatus for wireless communications includes means for operating at a first voltage level in a wireless communications device. The apparatus includes means for detecting, within a received frame, a frame metric associated with one or more packets of the received frame. The apparatus also includes means for determining whether to transition to a second voltage level to process at least a portion of the one or more packets of the received frame based on the detected frame metric.

An apparatus for wireless communications includes means for determining a bandwidth to be used at a wireless communications device from multiple bandwidths supported by the wireless communications device. The apparatus includes means for identifying a voltage level to use at the wireless communications device based on the determined bandwidth. The apparatus also includes means for scaling a voltage level to the identified voltage level to process a frame.

A wireless communications device includes a processor and a memory in electronic communication with the processor, where instructions stored in the memory are executable by the processor to operate at a first voltage level in the wireless communications device, to detect, within a received frame, a frame metric associated with one or more packets of the received frame, and to determine whether to transition to a second voltage level to process at least a portion of the one or more packets of the received frame based on the detected frame metric.

A wireless communications device includes a processor and a memory in electronic communication with the processor, where instructions stored in the memory are executable by the processor to determine a bandwidth to be used at the wireless communications device from multiple bandwidths supported by the wireless communications device, to identify a voltage level to use at the wireless communications device based on the determined bandwidth, and to scale a voltage level to the identified voltage level to process a frame.

A wireless communications device includes a detector configured to detect, within a received frame, a frame metric associated with one or more packets of the received frame. The device includes a voltage adjuster configured to operate at a first voltage level, and to determine whether to transition to a second voltage level to process at least a portion of the one or more packets of the received frame based on the detected frame metric.

A wireless communications device includes a bandwidth identifier configured to determine a bandwidth to be used at the wireless communications device from multiple bandwidths supported by the wireless communications device. The device includes a voltage adjuster configured to identify a voltage level to use at the wireless communications device based on the determined bandwidth, and to scale a voltage level to the identified voltage level to process a frame.

A computer program product includes a non-transitory computer-readable medium having code for causing at least one computer to operate at a first voltage level in a wireless communications device. The non-transitory computer-readable medium includes code for causing the at least one computer to detect, within a received frame, a frame metric associated with one or more packets of the received frame. The non-transitory computer-readable medium also includes code for causing the at least one computer to determine whether to transition to a second voltage level to process at least a portion of the one or more packets of the received frame based on the detected frame metric.

A computer program product includes a non-transitory computer-readable medium having code for causing at least one computer to determine a bandwidth to be used at a wireless communications device from multiple bandwidths supported by the wireless communications device. The non-transitory computer-readable medium includes code for causing the at least one computer to identify a voltage level to use at the wireless communications device based on the determined bandwidth. The non-transitory computer-readable medium also includes code for causing the at least one computer to scale a voltage level to the identified voltage level to process a frame.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
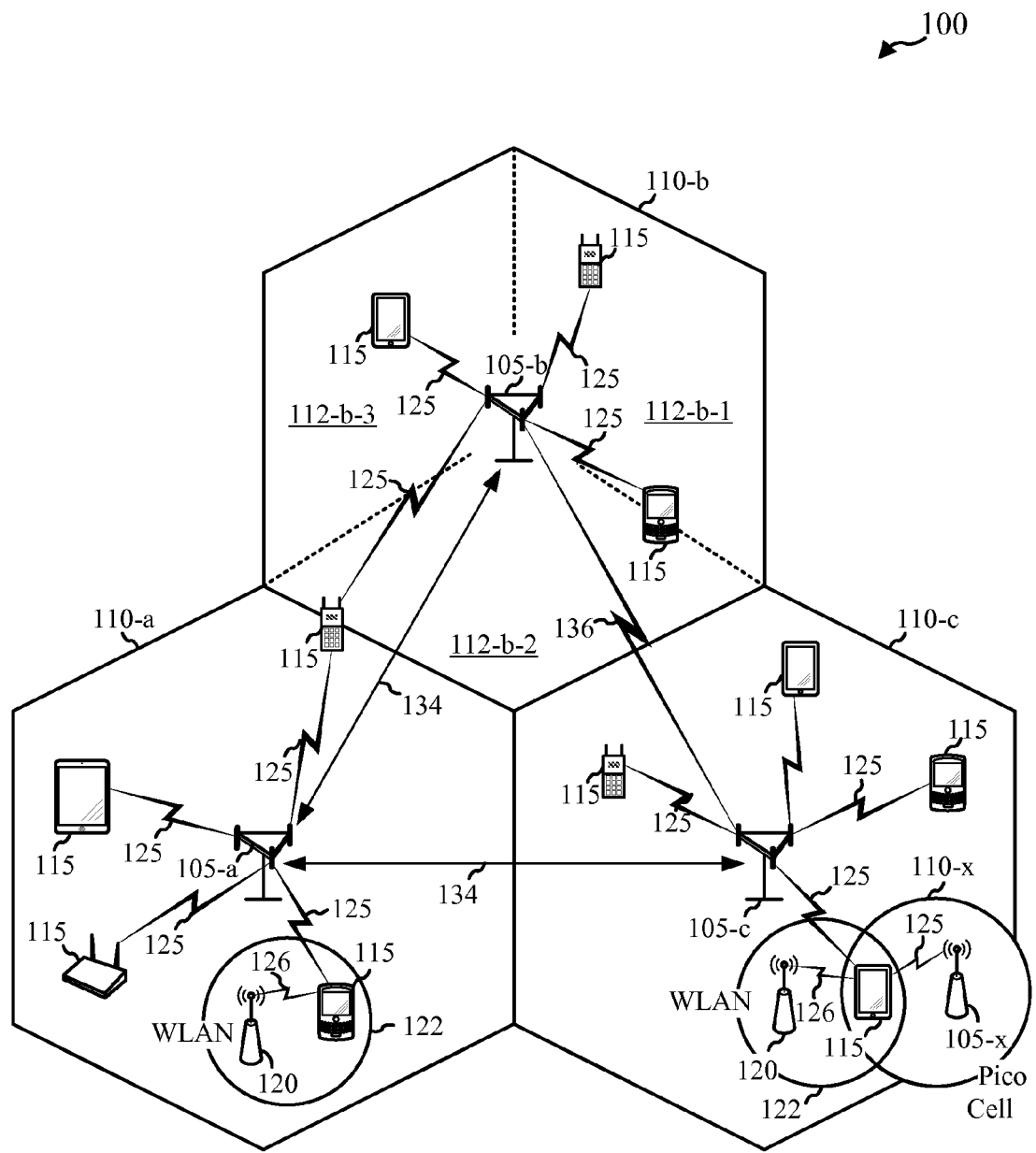
FIG. 1 shows a diagram that illustrates an example of a wireless communications system according to various embodiments.
Figure 1:
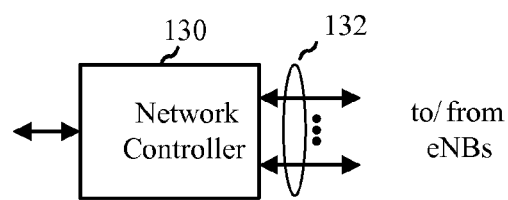

Described embodiments are directed to methods and apparatuses for wireless communications in which dynamic voltage and frequency scaling (DVFS) may be used to save power when processing packets in a wireless communications device. In some cases, inframe detection may allow the device (e.g., UE, STA) to determine whether to transition from a first (e.g., lower) voltage level to a second (e.g., higher) voltage level to process one or more packets of a received frame. A lower voltage level may be selected at first to enable sufficient processing (e.g., clocking frequency) of certain types of packets or frames. When a high or very high throughput packet is detected, applying a higher voltage level may allow for higher clock frequencies that are then used to digitally process the contents of the high or very high throughput packets.

In some embodiments, the wireless communications device may determine a bandwidth to use from among multiple bandwidths supported by the device. WLAN devices, for example, may support 20 MHz, 40 MHz, 80 MHz, and/or 160 MHz bandwidths. The bandwidth may be determined based on channel conditions. A voltage level may be identified that corresponds to the determined bandwidth and a processing voltage may be scaled to the identified voltage level. For example, one bandwidth may use a first voltage level while a higher bandwidth may use a second voltage level higher than the first voltage level. As noted above, a higher voltage level may allow for higher clock frequencies for digital processing. While an increase in digital clock frequency to handle higher bandwidths is typically associated with an increase in the voltage level, there may be some instances in which the voltage is already higher than required for a particular digital clock frequency leaving room for scaling the digital clock frequency slightly higher.

The wireless communications device may be configured to operate in any wireless network such as, but not limited to a wireless local area network (WLAN) and/or in a cellular network (e.g., LTE). WLAN may refer to a network that is based on the protocols described in the various IEEE 802.11 standards (e.g., IEEE 802.11a/g, IEEE 802.11n, IEEE 802.11ac, IEEE 802.11ah, etc.), including draft standards or subsequently developed wireless local area networking standards. When the device is operated in a cellular network, the voltage scaling (and corresponding digital clock frequency scaling) may be determined based on uplink (UL) and downlink (DL) scheduling conditions. For example, an inframe or within frame detection scheme may be used to determine whether the wireless communications device is scheduled to receive or transmit information to a base station. In some cases, the operating voltage level may be reduced until a scheduled reception or transmission is scheduled to take place.

Techniques described herein may be used for various wireless communications systems such as cellular wireless systems, Peer-to-Peer wireless communications, WLANs, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named 3GPP or "3rd Generation Partnership Project." CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a wireless network 100 for communication, which may include an LTE/LTE-A network and a wireless network such as a WLAN. It should be noted that while the example illustrates use of an LTE-A network and WLAN, any various wireless networks may be used, as previously mentioned. The wireless network 100 includes a number of evolved node Bs (eNBs) 105 and other network entities or devices. An eNB may be a station that communicates with the UEs and may also be referred to as a base station, a node B, an access point, or the like. Each eNB 105 may provide communication coverage for a particular geographic area. In 3GPP, the term "cell" can refer to a particular geographic coverage area of an eNB and/or an eNB subsystem serving the coverage area, depending on the context in which the term is used.

An eNB may provide communication coverage for a macro cell, a pico cell, a femto cell, and/or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 105-a, 105-b, and 105-c are macro eNBs for the macro cells 110-a, 110-b, and 110-c, respectively. The eNB 105-x is a pico eNB for the pico cell 110-x. A femto eNB is not shown but may be included in the wireless network 100. An eNB may support one or multiple (e.g., two, three, four, and the like) cells. Together the eNBs 105-a, 105-b, 105-c, pico eNB 105-x, and femto eNB (not shown) may be referred to as eNBs (or eNBs 105) in this disclosure.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 105 via a backhaul 132. The eNBs 105 may also communicate with one another, e.g., directly or indirectly via a wireline backhaul 134 or a wireless backhaul 136.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The wireless network 100 shows transmissions 125 between mobile devices 115 and base stations 105. The transmissions 125 may include uplink (UL) and/or reverse link transmission, from a mobile device 115 to a base station 105, and/or downlink (DL) and/or forward link transmissions, from a base station 105 to a mobile device 115. LTE/LTE-A utilizes OFDMA on the downlink and SC-FDMA on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. The system bandwidths may be 1.25, 2.5, 5, 10 or 20 MHz, for example. For these bandwidths, corresponding Fast Fourier Transforms (FFTs) of 128, 256, 512, 1024 or 2048 points may be used to process data. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Also shown in FIG. 1 are two access points (APs) 120, where the first is connected to a UE 115 (e.g., STA) in cell 110-a and the second is connected to another UE 115 (e.g., STA) in cell 110-c. The UEs may communicate with the access points through transmissions 126. In this example, the UEs connected to the APs 120 may be dual mode devices that support communication with both a cellular network and WLAN. Each of the APs 120 has a coverage area 122 and may support one or more protocols described in the various IEEE 802.11 standards.

Figure 2:
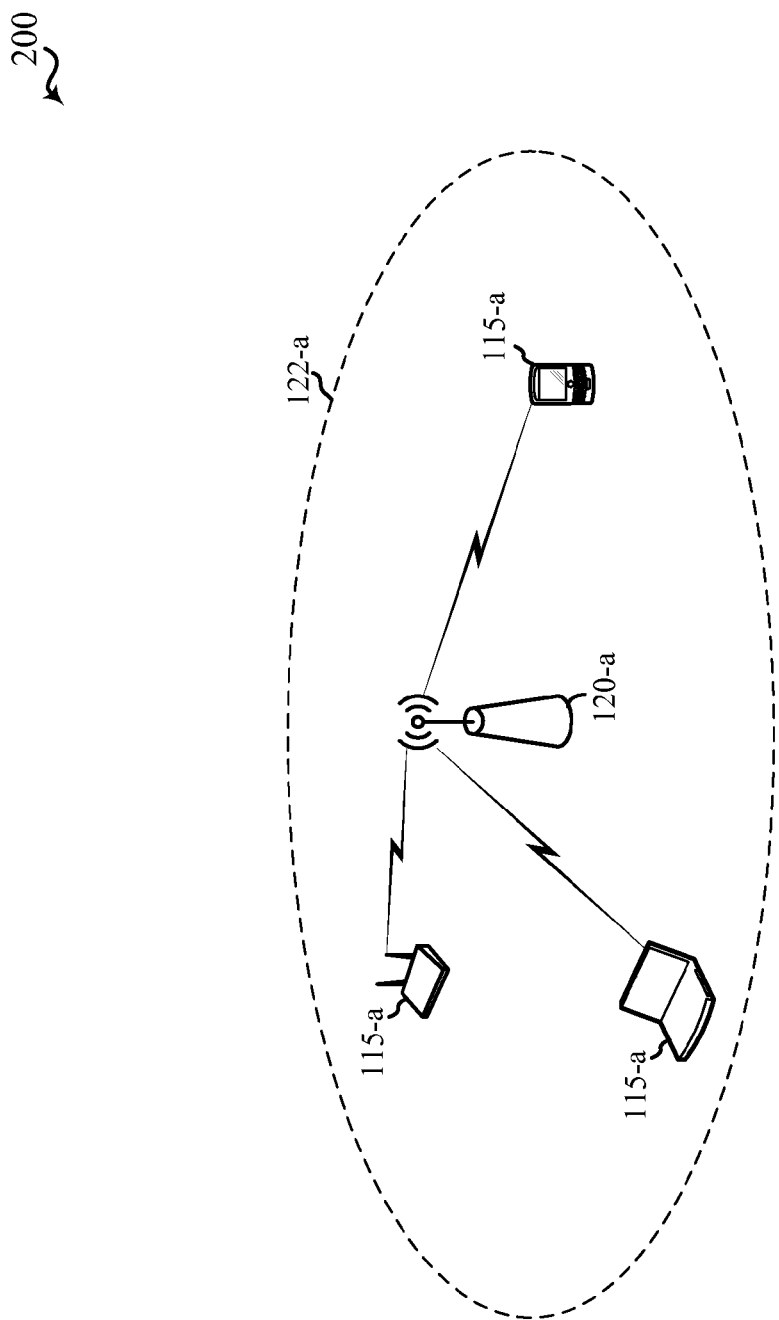
FIG. 2 shows a diagram that illustrates an example of a wireless local area network (WLAN) system according to various embodiments.

FIG. 2 shows a diagram 200 that includes an example of a WLAN, such as the WLANs described above with reference to FIG. 1. An access point 120-a in FIG. 2, which may be an example of the access points 120 of FIG. 1, may generate a wireless local area network, such as an IEEE 802.11 network, or so-called Wi-Fi network, with wireless client devices 115-a. The WLAN may be associated with a coverage area 122-a. The client devices 115-a may be examples of the UEs 115 connected to the APs 120 in FIG. 1.

The access point 120-a may use a wired or wireless communications protocol to establish a communications link with a data or content network (not shown), and/or with a wide area network (not shown). For example, the access point 120-a may use one or more of a cable modem, a digital service link (DSL) modem, an optical communications link such as a T1 or T3 line, or any other form of wired communications protocol to communicatively couple with another network. In another example, the access point 120-a may be wirelessly coupled to a data or content network and/or to a wide area network. For example, the access point 120-a may be wirelessly coupled to a cellular network (e.g., 3G, 4G) such as the one described above with reference to FIG. 1. The access point 120-a may include a wired (e.g., Ethernet) or wireless (e.g., Wi-Fi) router, or a cellular to Wi-Fi hotspot device to allow one or more of the client devices 115-a to communicate with another network.

The wireless devices used in both the wireless network 100 of FIG. 1 and the WLAN of FIG. 2 may include a modem or other like device that may enable dynamic voltage and frequency scaling (DVFS) to save power when processing packets or frames. DVFS enables the adjustment or scaling of digital clock frequencies at each packet or frame to provide a sufficient clock frequency to digitally process the contents of that packet or frame at specific bandwidths. The scaling of digital clock frequencies is typically accompanied by a corresponding voltage scaling to provide the appropriate power to produce the digital clock frequency. For example, to handle data processing at higher bandwidths, a voltage may be increased (higher power) to produce a higher digital clock frequency. On the other hand, to handle data processing at lower bandwidths, a lower voltage (lower power) may be sufficient to produce an appropriate digital clock frequency. Therefore, in DVFS, a reference to voltage scaling may also be a reference to the corresponding scaling of digital clock frequencies. The descriptions provided below detail various aspects of the techniques that may be used enable power savings in a wireless device by using DVFS.

Figure 3:
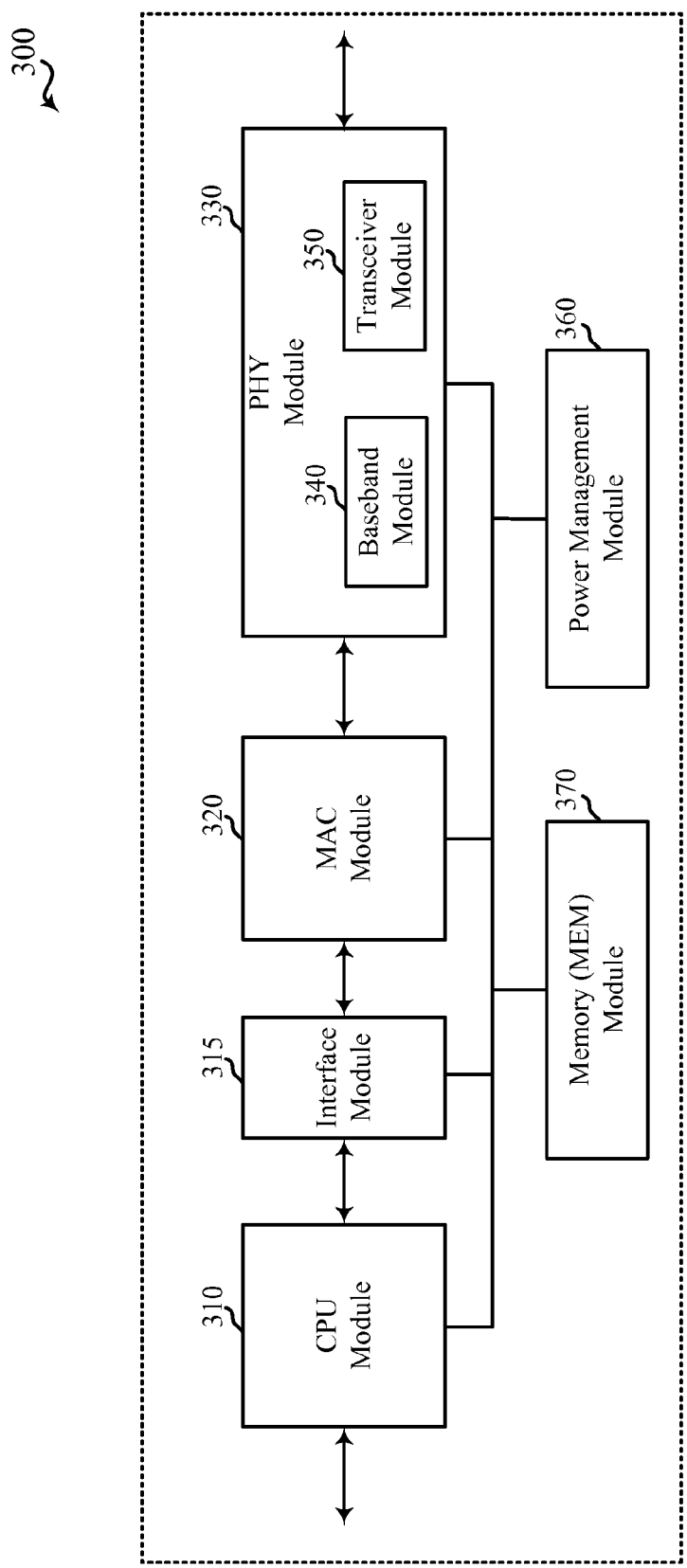
FIG. 3 shows a block diagram that illustrates an example of a wireless modem architecture according to various embodiments.

FIG. 3 shows a device 300 that may be part of a wireless modem. The device 300 may in some cases be implemented in conjunction with one of the UEs 115, eNBs 105, or APs 120 described with reference to FIG. 1 or FIG. 2. The device 300 may be used for WLAN or cellular communications. The device 300 may also be a processor. The device 300 may include a central processing unit (CPU) module 310, an interface module 315, a MAC layer module 320 (or simply MAC module 320), a PHY layer module (or simply PHY module 330), a power management module 360, and a memory (MEM) module 370. The PHY module 330 may include a baseband module 340 and a transceiver module 350. Each of these components may be in communication with each other.

The components of the device 300 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The CPU module 310 may be configured to provide higher level processing of data and/or control information. The CPU module 310 may, in some cases, include one or more processors, microcontrollers, and/or like devices, some of which may be based on an advance microcontroller bus architecture (AMBA), for example.

The interface module 315 may be configured to include a peripheral component interconnect express (PCIE)/universal serial bus (USB)/secure digital input output (SDIO) bridge for the data pipe between the CPU module 310 and the MAC module 320.

The MAC module 320 may be configured to provide an interface between a data link layer (layer 2 in the Open Systems Interconnection (OSI) model) and the network's physical layer (e.g., PHY module 330). The MAC module 320 may, in some cases, be referred to as a media access controller.

The PHY module 330 may be configured to provide an interface between the MAC module 320 and the physical medium (not shown). In WLANs, for example, the PHY module 330 operations may include radio frequency (RF) operations, mixed-signal and analog portions of PHY layer processing, and digital baseband (BB) processing. The digital baseband processing may be handled by, for example, a digital signal processor (DSP) in the baseband module 340. The RF operations and mixed-signal and analog portions of PHY layer processing may be part of the transceiver module 350. The transceiver module 350 may be configured to wirelessly transmit and/or receive frames or packets.

The power management module 360 may be configured to control or adjust the power (e.g., voltage, clock frequency) used in one or more of the components of the device 300.

For example, the power management module 360 may adjust the Vdd used by the device 300. Vdd refers to the power supply voltage used in integrated circuit architectures. Other terms may be used to refer to the power supply voltage. Adjusting the power supply voltage of a component of the device 300 may result in an corresponding adjustment of the digital clock frequency used by that component. The power management module 360 may be configured to implement some or all of the techniques described herein for dynamic voltage and frequency scaling. In some cases, the power management module 360 may be part of a power management unit (PMU) and/or a power management integrated circuit (PMIC), for example.

The memory module 370 may be configured to store data associated with various aspects of the operation of the device 300, including initiation/configuration data, intermediate/processing data, software, firmware, and the like.

When the device 300 is used as part of a WLAN modem (e.g., UE 115, AP 120), for example, the device 300 may support different modes of operation. One mode may correspond to a channel bandwidth of 20 MHz. This mode may be used with legacy WLAN packets (e.g., IEEE 802.11a/g) and may be referred to as HT20 (referring to high throughput 20 MHz). Another mode may correspond to a higher channel bandwidth, typically 40 MHz. This mode may be used with high throughput (HT) WLAN packets (e.g., IEEE 802.11n) and may be referred to as HT40. In some cases, the WLAN may support a mode with a channel bandwidth of 80 MHz. This mode may be used with very high throughput (VHT) WLAN packets (e.g., IEEE 802.11ac) and may be referred to as VHT80. The device 300 may also support static and dynamic modes of operation.

In a static HT20 mode for search and receive operations, it may be possible for a clock used with the PHY (e.g., PHY module 330) to operate at the lowest allowable frequency (and corresponding voltage) for an entire frame receive (frame-RX) operation. A nominal Vdd (e.g., 1.1V, tailored to the specific fabrication process node) may be typically applied to the digital modem (e.g., BB/MAC) and RF blocks. This approach may be used in connection with early reception (Early-Rx), beacon reception (Beacon-Rx), listen (search mode), and data receive (Data-Rx), for example.

In a dynamic HT20/HT40/VHT80 listen mode, it may be possible to operate at a scaled PHY clock (and scaled PHY voltage) during a frame listen zone (e.g., up to a VHT short training field (VHT-STF) in a preamble of a packet or frame) (see e.g., FIG. 4A and FIG. 4B) before deciding to (1) abort the frame reception (Frame-Rx) because of errors or because the frame is not destined for the device, or (2) scale up (i.e., increase) the PHY clock (and PHY voltage) to receive at a higher bandwidth. Typically, however, a nominal Vdd (1.1V) is applied during the entire packet or frame reception, leading to higher power consumption in the listen mode. Any power savings that may be achieved during listen mode may significantly reduce power consumption in semi-active loads.

In a dynamic HT20/HT40/VHT80 transmit and receive (Tx/Rx) mode, the MAC (e.g., MAC module 320) may use a just-in-time bandwidth detection using clear channel assessment (CCA) techniques to decide whether to transmit a packet at 20/40/80 MHz (in some cases 160 MHz may also be supported). If a packet is relegated to a lower bandwidth transmission, the PHY (e.g., PHY module 330) may operate with a scaled back clock during the packet transmission. When higher bandwidth transmissions are possible (from CCA operations), the PHY may transmit using higher clocks. In these examples, the entire packet or frame may be transmitted using the appropriate clock (voltage). In the receive mode, depending on a bandwidth (BW) indication in the HT-SIG or VHT-SIG field of the preamble, the PHY may operate at a lower clock (and reduced voltage) when an HT40 packet is received instead of a VHT80 or VHT160 packet. The clock (voltage adjustment may take place inframe and a portion of the packet or frame is processed at the appropriate clock (voltage). Typically, however, a nominal Vdd (1.1V) is used in both transmit and receive modes.

For an LTE modem (e.g., UE 115, eNB 105, device 300), the downlink scheduling control information (DCI) messages in a physical downlink control channel (PDCCH) may need to be decoded every 1 millisecond (ms). The scheduling information may indicate that a downlink (DL) or uplink (UL) grant may or may not have been provided to the UE by the eNodeB. When a DL grant is not provided, it may be sub-optimal to clock the LTE modem at highest clock or at nominal Vdd for the remainder of the sub-frame. Furthermore, when a UL grant is provided, it may still be sub-optimal to process the remainder of the sub-frame at the highest clock and voltage since the UE needs to act 4 ms later. A similar issue may arise with respect to the long and short discontinuous reception (DRX) intervals and measurement gaps used in LTE.

Additional details on how to implement dynamic voltage and frequency scaling in a WLAN modem or in an LTE modem are described below with respect to various embodiments.

With respect to a static HT20 mode for listen and receive, for example, it may be possible to operate at a reduced Vdd (e.g., 0.9V or lower) during the entire listen and frame-RX phase once the WLAN modem is configured in the static HT20 mode. This reduced Vdd is lower than the nominal Vdd (1.1V) described above. The configuration of the WLAN modem into this particular mode may be based on knowledge of the channel bandwidth being used in the reception of packets or frames. That is, the WLAN modem may receive an indication of the channel (connection) bandwidth and may switch to the static HT20 mode with its lower Vdd (and lower clock).

With respect to the dynamic HT40/VHT80 mode for listen, for example, it may be possible to operate at a reduced Vdd (e.g., 0.9V or lower) during the entire listen phase. When a VHT packet is detected, the voltage may be scaled from the reduced Vdd up to a nominal Vdd over a certain period of time. In one example, a slew rate of ~0.2V/3 microseconds (μs) may be provided by a PMIC (e.g., power management module 360). Other slew rates may be used, some of which may be faster that 0.2V/3 μs. To provide the appropriate voltage level, switched-mode power supplies (SMPS) or low-dropout linear regulators (LDOs) may be used with level shifters across different voltage domains (e.g., voltage islands) of the modem architecture.

In addition to the voltage adjustment (and corresponding clock frequency adjustment) based on the throughput and/or bandwidth of a particular packet, there may be other aspects that determine whether to adjust the voltage, power, and/or frequency of operations in a wireless modem.

For example, for VHT packets (e.g., VHT80 packets), certain fields of the packet may be used to determine if the packet is destined for the wireless device (e.g., STA). For single user multiple-input multiple-output (MIMO) systems, the field inspected for the destination information may be partial association identifier (pAID), while for downlink (DL) multi-user MIMO (MU-MIMO), the field inspected for the destination information may be group identifier (GID). When the packet is destined for the STA, the WLAN modem may remain enabled at a high supply voltage and frequency, subject to decisions based on dynamic bandwidth indicated in the preamble fields. When the packet is not destined for the STA, the WLAN modem may select one of several options: (1) clock gate itself (e.g., MAC/BB) and the RF portions; (2) perform the same operations as in (1) and also scale Vdd down (e.g., 0.9V) for the duration of the packet or data unit (e.g., Physical Layer Convergence Protocol (PLCP) Protocol Data Unit or PPDU); and (3) perform the same operations as in (1) and power gate the entire MAC/BB/RF domains (e.g., MAC module 320, baseband module 340, and transceiver module 350). The selection of one of these options may depend on the length of the PPDU, and/or on the associated slew rate of a PMIC (e.g., power management module 360) and power collapse/restore latencies of the PMIC. That is, the selection depends on how long the packets are and how long does it take to make a voltage/frequency transition.

For high throughput (e.g., HT40) and legacy (e.g., HT20) packets, the detection of the destination of the packet may occur within the MAC header in the packet. The voltage and frequency of the WLAN modem (e.g., device 300) may remains at the higher or maximum level for the duration of the HT-STF until the MAC receiver address (RA) is found. When the packet is not destined for the STA, it may be possible to apply one of the techniques (1), (2), and (3) described above with respect to the VHT packets. When the packet is directed or destined for the STA, the nominal voltage or the reduced voltage, commensurate with the incoming bandwidth mode, and the corresponding frequency, may be maintained until the completion of frame-RX.

Other events that may cause dynamic voltage and frequency scaling in a wireless modem may include a failure in a cyclic redundancy check (CRC) delimiter or termination of frame-RX from continuous PHY metrics. For example, the clock and the voltage may be scaled for the remainder of a frame that has encountered a delimiter CRC failure in an aggregated MAC protocol data unit (A-MPDU). In another example, clock scaling and voltage scaling may be applied as a trigger from the continuous PHY metric decisions, such as predicting in the middle of the Frame-Rx that the eventual Frame Check Sequence is likely to fail the integrity check and aborting the Frame-Rx mid-frame.

In dynamic HT40/VHT80 transmit and receive (Tx/Rx) mode, for those packets that are directed or destined for the STA it may be possible to first decode the bandwidth (BW) field from a (V)HT-SIG-A field. Using a table or some other like device (e.g., a BW-to-Frequency lookup table or LUT), the PHY clocks may be adjusted or chose appropriately (e.g., frequency for 20 MHz (f_20), frequency for 40 MHz (f_40), frequency for 80 MHz (f_80), frequency for 160 MHz (f_160)) and Vdd scaled from nominal Vdd (e.g., Vdd 160=1.1V) down to Vdd for 20 MHz or Vdd 20 (e.g., 0.9V or below) in finer steps. This approach allows for DVFS to be used in active RX as well as during active TX (based on CCA and/or dynamic BW decisions).

The various modes described herein have been provided by way of illustration and not of limitation. A wireless modem or other similar or like device may use more, fewer, and/or different modes without departing from the various aspects presented in the disclosure related to dynamic voltage and frequency scaling.

Figure 4A:
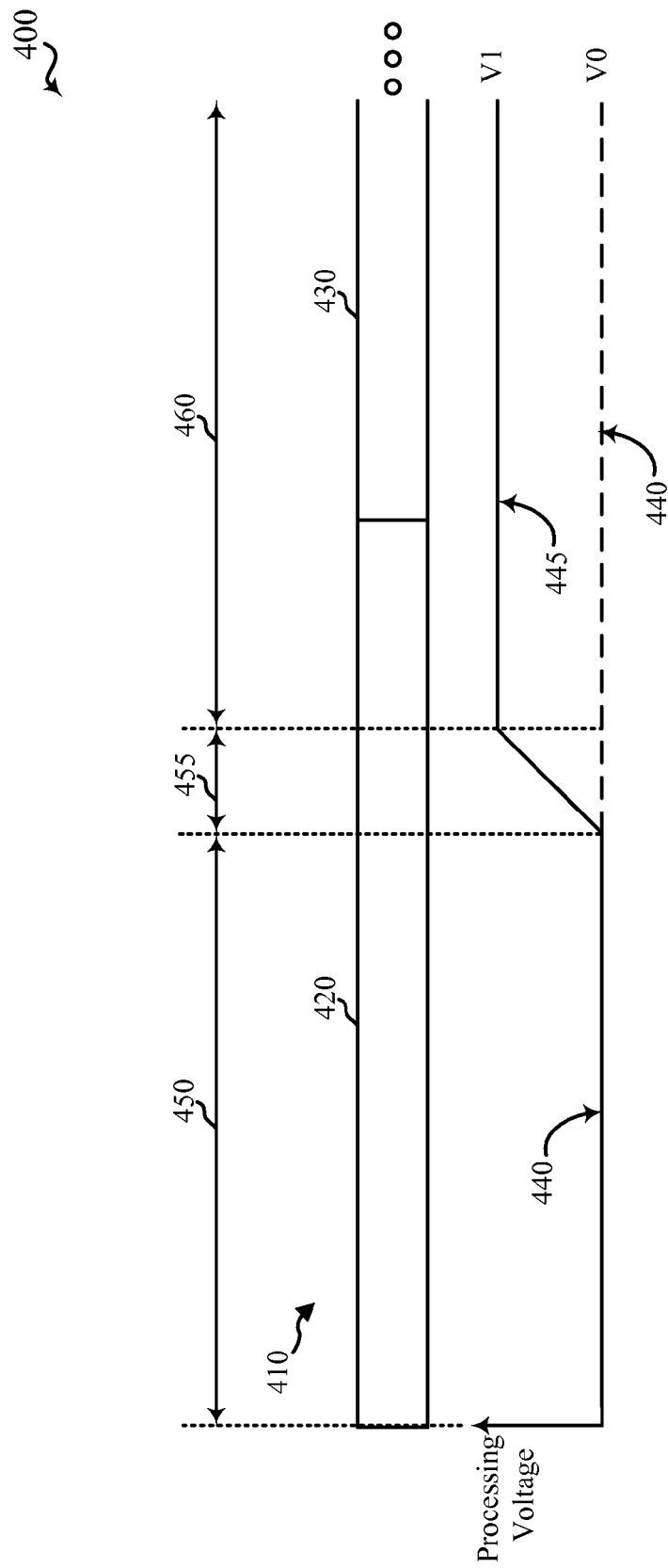
FIG. 4A shows a diagram that illustrates an example of inframe detection for dynamic voltage and frequency scaling according to various embodiments.

The descriptions of FIGS. 4A-6 presented below provide some examples of the techniques for dynamic voltage and frequency scaling described above. Turning next to FIG. 4A, a diagram 400 is shown that includes a frame or packet 410 with a first portion 420 representing a preamble or header of the frame 410, and a second portion 430 representing the data contents of the frame 410. The frame or packet 410 need not be limited to a WLAN frame or packet and may instead correspond to a frame or packet in any of multiple wireless communications protocols. FIG. 4A describes a mechanism by which a wireless modem (e.g., UE 115, AP 120, eNB 105, device 300) may first operate at a first voltage level 440 (V0), may then detect within the frame 410 a frame metric (e.g., throughput category, packet destination, transmission grant, reception grant) associated with one or more packets of the frame 410, and may then determine whether to transition to a second voltage level 445 (V1) to process at least a portion of the one or more contiguous packets of the frame 410 based on the detected frame metric. The first voltage level 440 may correspond to one digital clock frequency and the second voltage level 445 may correspond to a higher digital clock frequency.

In this example, the detection of a throughput category may occur within the first portion 420 of the frame 410 and during a period 450. At the end of the period 450, the determination of whether the frame 410 has a throughput that involves a higher voltage level is made. When the current voltage level (V0) (and corresponding digital clock frequency) is appropriate or sufficient to process the frame 410, no change is made and the current voltage level is maintained. When the current voltage level is not sufficient and the second voltage level (V1) (and corresponding digital clock frequency) is needed to process the data portion of the frame 410, a voltage transition (i.e., scaling) occurs during a period 455 until the appropriate voltage level (V1) is reached. A period 460 corresponds to the application of the higher voltage level for digital processing of the remaining portion of the frame 410.

Figure 4B:
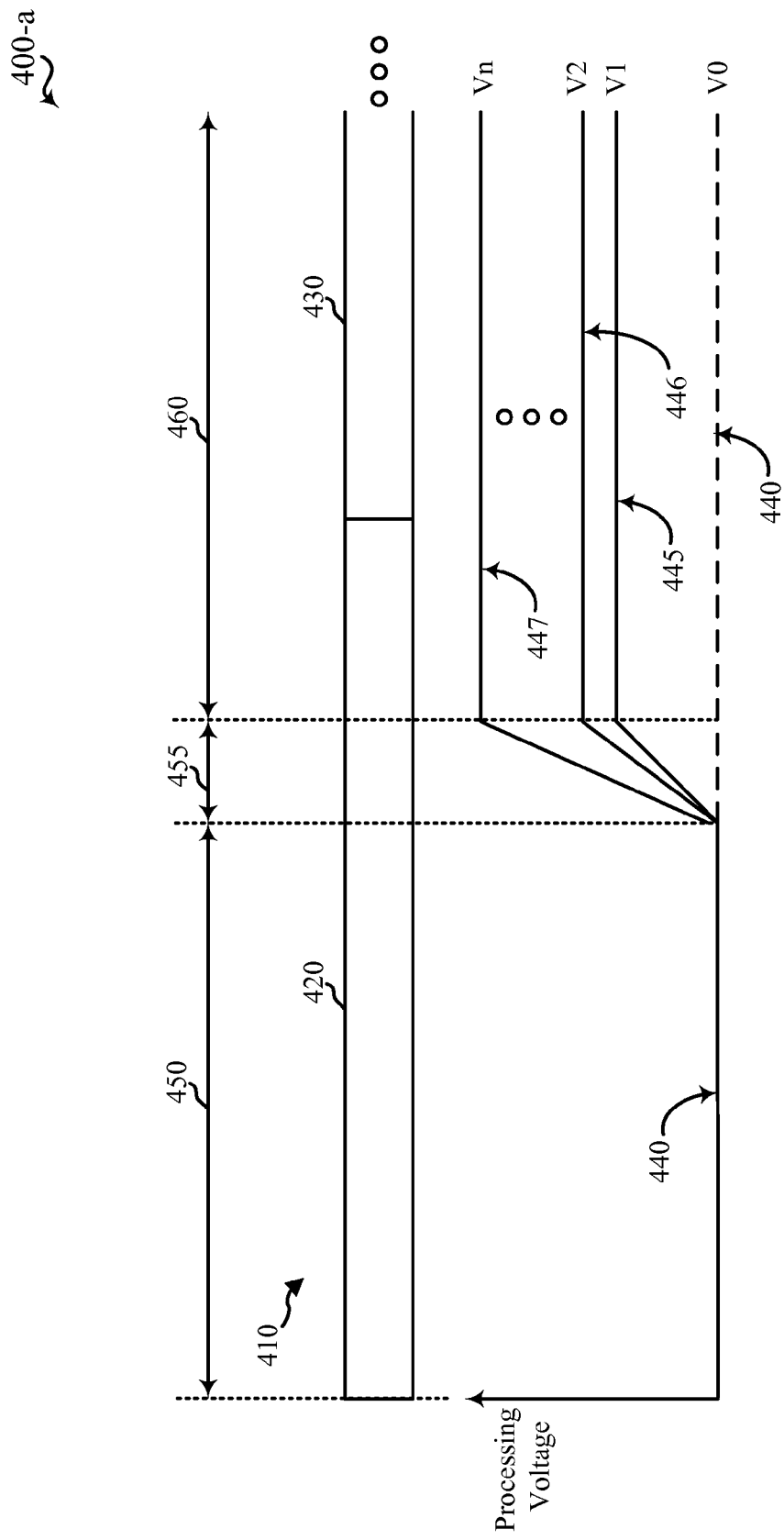
FIG. 4B shows a diagram that illustrates another example of inframe detection for dynamic voltage and frequency scaling according to various embodiments.

Turning to FIG. 4B, a diagram 400-a is shown that includes the frame or packet 410 of FIG. 4A. FIG. 4B describes a mechanism by which a wireless modem (e.g., UE 115, AP 120, eNB 105, device 300) may first operate at a first voltage level 440 (V0), may then detect within the frame 410 a frame metric associated with one or more packets of the frame 410, and may then determine whether to transition to a next voltage level (e.g., 445 (V1), 446 (V2), 447 (Vn)) to process at least a portion of the one or more packets of the frame 410 based on the detected frame metric. The first voltage level 440 may correspond to one digital clock frequency and the other voltage levels may correspond to higher digital clock frequencies.

As with the example of FIG. 4A, the detection of a throughput category may occur within the first portion 420 of the frame 410 and during a period 450. At the end of the period 450, the determination of whether the frame 410 has a throughput that involves a higher voltage level is made. In this example, however, there may be multiple levels of higher throughput (e.g., HT40/VHT80/VHT160) and the determination may include which of these throughputs is associated with the frame 410. Once the throughput is determined, the proper voltage level (and corresponding digital clock frequency) may also need to be identified. When the current voltage level (V0) is appropriate or sufficient to process the frame 410, no change is made and the current voltage level is maintained. When the current voltage level is not sufficient to handle the throughput of frame 410 and a higher voltage level (and higher digital clock frequency) is needed, a voltage transition (i.e., scaling) occurs during the period 455 until the voltage level identified to correspond to the throughput level of frame 410 is reached. The period 460 again corresponds to the application of the higher voltage level for digital processing of the remaining portion of the frame 410.

Figure 4C:
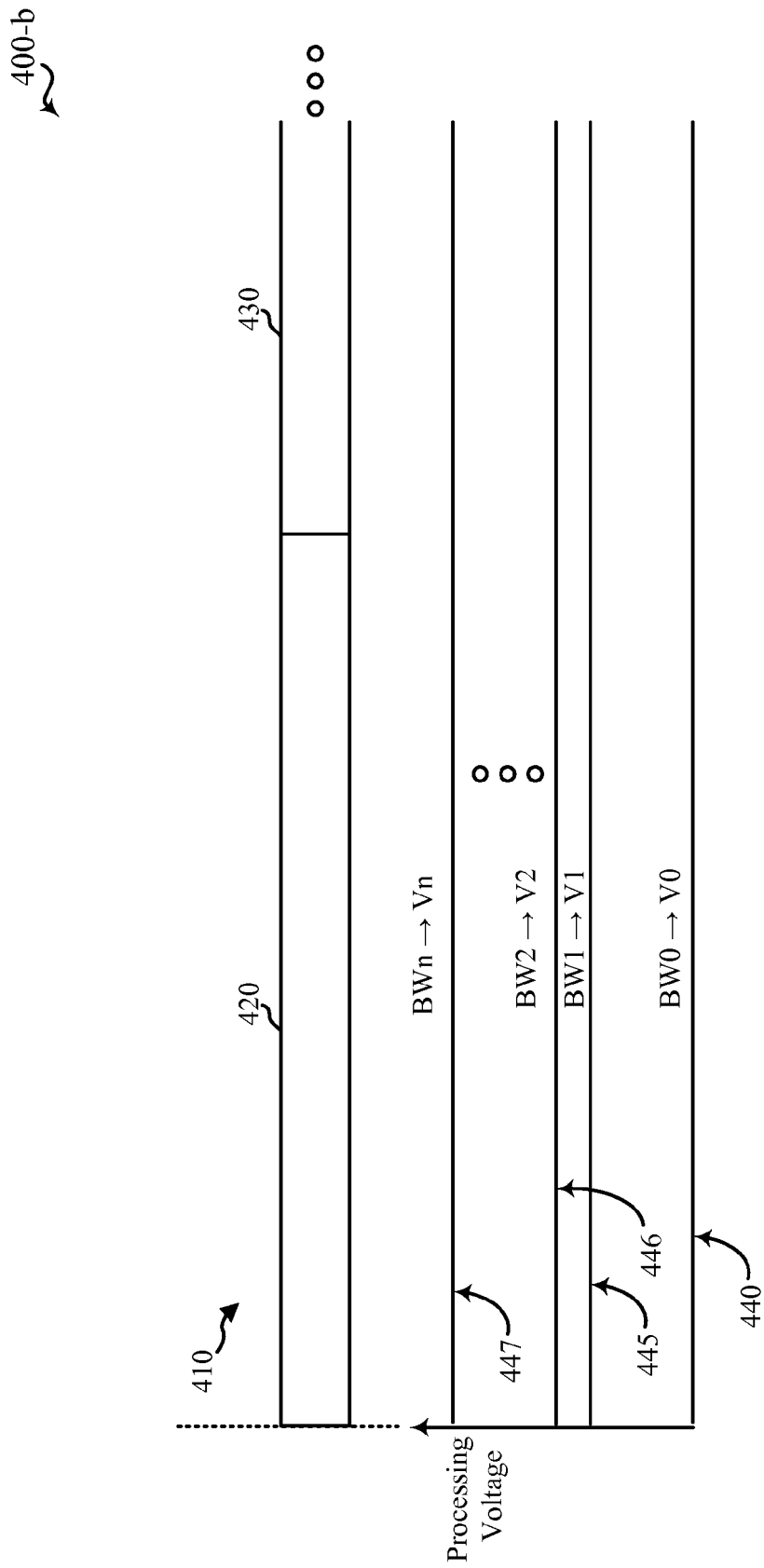
FIG. 4C shows a diagram that illustrates an example of bandwidth-based dynamic voltage and frequency scaling according to various embodiments.

Turning next to FIG. 4C, a diagram 400-b is shown that includes the frame or packet 410 of FIG. 4A and FIG. 4B. FIG. 4C describes a mechanism by which a bandwidth (BW) to be used at a wireless communications device (e.g., UE 115, AP 120, eNB 105, device 300) is determined from multiple bandwidths supported by the device. For WLAN modems (radios), for example, bandwidths supported may include 20 MHz, 40 MHz, 80 MHz, and/or 160 MHz. Other modems may support more, fewer, and/or different bandwidths. A voltage level to use at the wireless communications device may be identified based on the determined bandwidth and a voltage level (and corresponding digital clock frequency) may be scaled to the identified voltage level.

In this example, the bandwidth and corresponding voltage level may be determined before the frame 410 is processed for reception or transmission. For example, for a bandwidth BW0 a corresponding voltage level (V0) is identified. For a higher bandwidth BW1, a different voltage level (V1) that is higher than that for BW0 is identified. Similarly for BW2 through BWn and corresponding voltage levels V2 through Vn. Once determined, the voltage level is applied to process the entire frame 410.

Figure 4D:
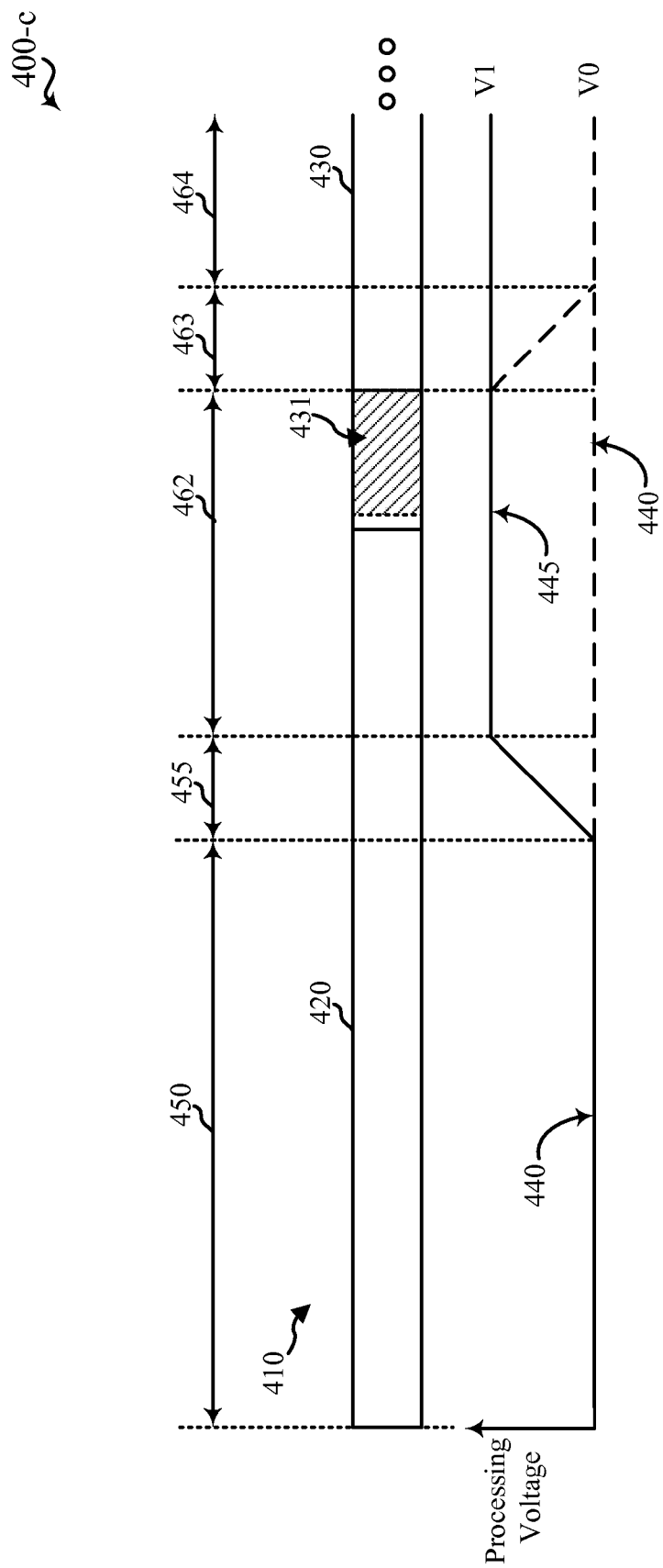
FIG. 4D shows a diagram that illustrates an example of packet destination information in dynamic voltage and frequency scaling according to various embodiments.
Figure 4E:
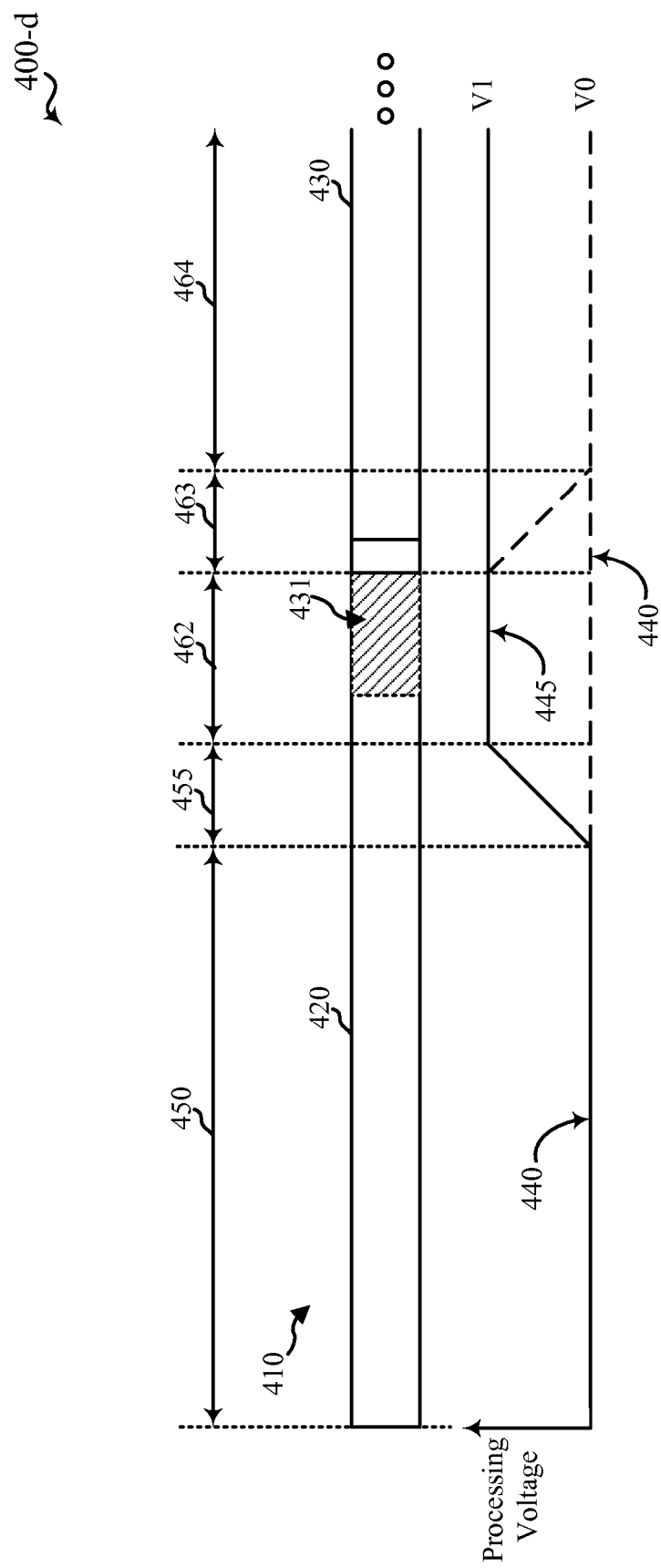
FIG. 4E shows a diagram that illustrates another example of packet destination information in dynamic voltage and frequency scaling according to various embodiments.
Figure 5:
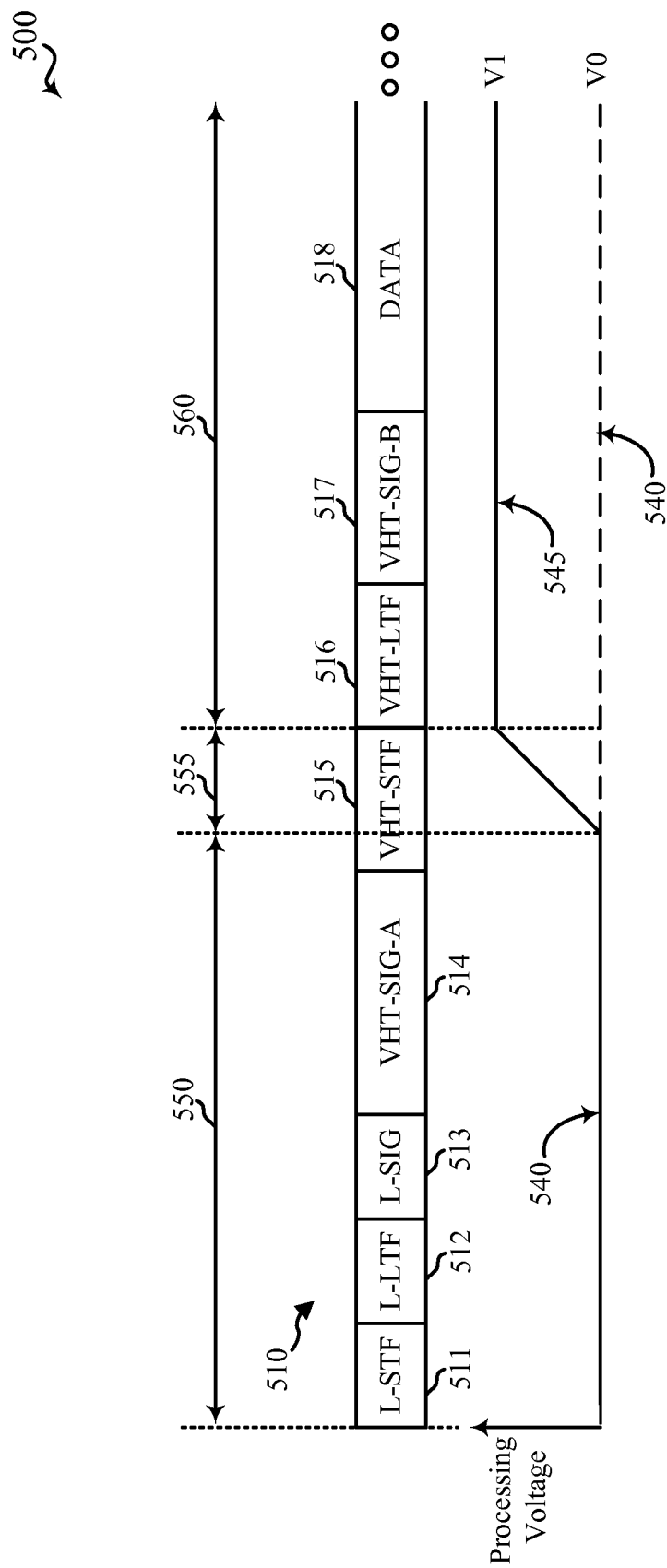
FIG. 5 shows a diagram that illustrates an example of inframe detection in an IEEE 802.11ac very high throughput (VHT) packet according to various embodiments.

Turning next to FIG. 4D, a diagram 400-c is shown that includes the frame or packet 410 of FIGS. 4A-4C. FIG. 4D describes a mechanism by which it is determined whether the frame 410 is directed or destined for the wireless communications device (e.g., UE 115, AP 120, eNB 105, device 300) that received it. As described above, when the voltage level 440 is appropriate for processing, no change is made and the voltage level is maintained at V0. However, when the voltage level (and corresponding digital clock frequency) needs to be scaled, the voltage level is changed during the period 455 to the voltage level 445 (V1). In this example, there is a region 431 in the portion 430 (e.g., data portion), which includes information about the destination of the frame 410. The region 431 may correspond to, for example, the MAC RA. When the frame 410 is not destined for the wireless communications device, there is no reason to proceed processing it and the voltage level may return to the first voltage level 440 during a period 463 and remain at the lower voltage level for a period 464 until a next frame or packet is to be handled. However, when the frame 410 is destined for the wireless communications device, the second voltage level 445 is maintained through periods 463 and 464. FIG. 4E shows a diagram 400-d that illustrates the case when the region 431 is in the portion 420 (e.g., preamble, header). In this example, the information about the destination of the frame 410 may be included in a field (e.g., VHT-SIG-A for VHT packets) in the portion 420 instead of in the MAC RA as in FIG. 4D.

Turning next to FIG. 5A, a diagram 500 is shown that includes a frame or packet 510. The frame 510 may comprise one or more packets and may be an example of the frame 410 of FIGS. 4A-4E. The frame 510 may include a legacy short training field (L-STF) 511, a legacy long training field (L-LTF) 512, a legacy signal (L-SIG) field 513, a very high throughput (VHT) signal A (VHT-SIG-A) field 514, a VHT short training field (VHT-STF) 515, a VHT long training field (VHT-LTF) 516, a VHT signal B (VHT-SIG-B) field 517, and a data field 518. FIG. 5A, like FIG. 4A above, describes a mechanism by which a wireless modem (e.g., UE 115, AP 120, eNB 105, device 300) may first operate at a first voltage level 540 (V0), may then detect within the frame 510 a frame metric associated with one or more packets of the frame 510, and may then determine whether to transition to a second voltage level 545 (V1) to process at least a portion of the one or more packets of the frame 510 based on the detected frame metric. As noted above with respect to FIG. 4A, the first voltage level 540 may correspond to one digital clock frequency and the second voltage level 545 may correspond to a higher digital clock frequency.

In this example, the detection of a throughput category may occur within a period 550 (approximately 29 μs) and may include obtaining throughput category information from one or more of the fields in this period. For example, throughput category information (e.g., whether a packet or frame is HT or VHT, the bandwidth of the packet or frame) may be obtained from the VHT-SIG-A field 514. Once the throughput category is obtained, the determination of whether the frame 510 has a throughput that involves a higher voltage level is made. When the current voltage level (V0) (and corresponding digital clock frequency) is sufficient to process the frame 510 (i.e., throughput category does not involve a higher voltage level), no change is made and the current voltage level is maintained. When the current voltage level is not sufficient and the second voltage level (V1) is needed to properly process the data field 518, a voltage transition (i.e., scaling) occurs during a period 555 (approximately 3 μs) until the appropriate voltage level (V1) is reached. The period 555 may coincide with the VHT-STF 515 of frame 510. A period 560 (which may be in the millisecond range) corresponds to the application of the higher voltage level for digital processing of the VHT-LTF 516, the VHT-SIG-B field 517, and the data field 518.

In some embodiments, the amount of power reduction that may be achieved during the period 550 by using dynamic voltage and frequency scaling may be further enhanced if such techniques are also applied to the radio frequency components of the wireless modem (e.g., transceiver module 350).

Figure 6:
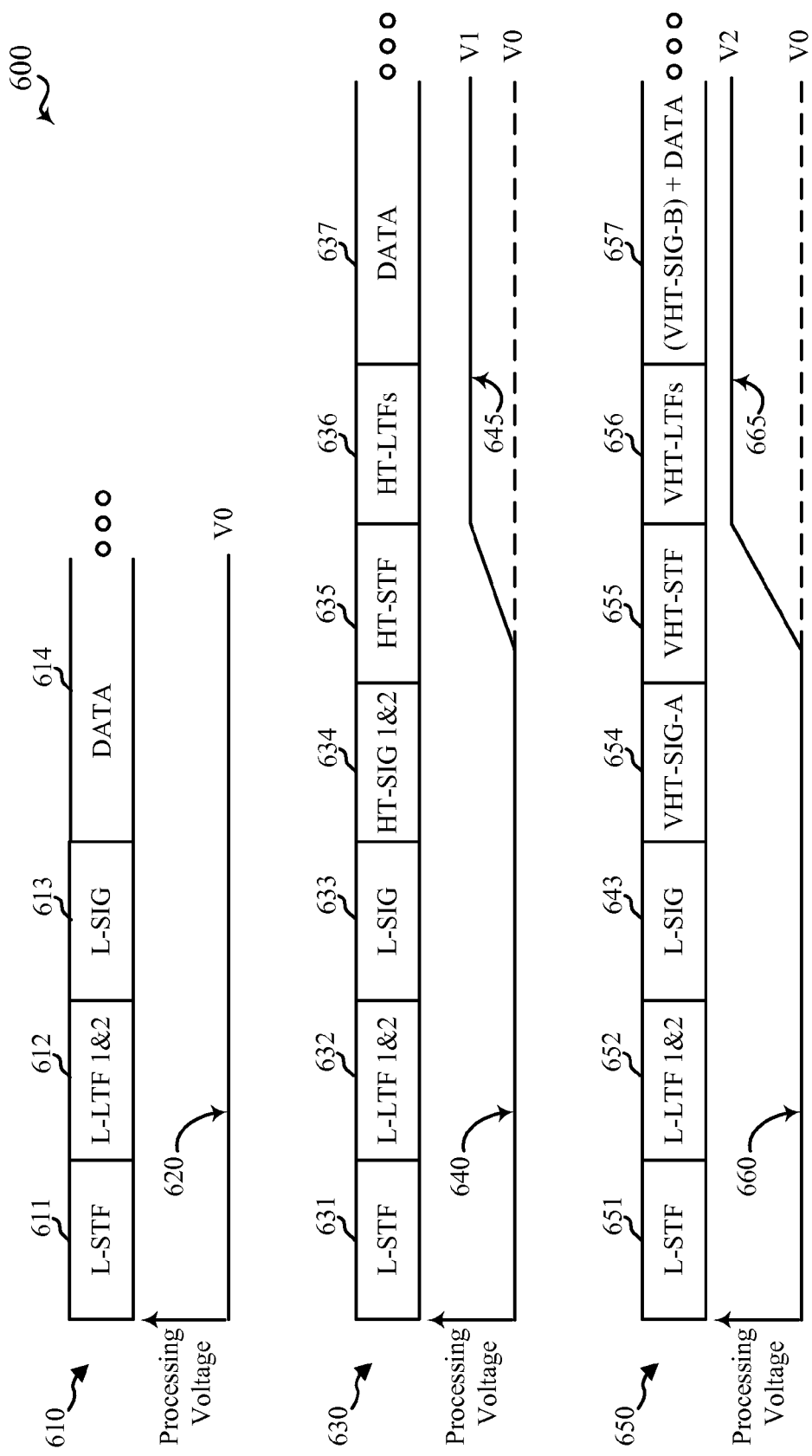
FIG. 6 shows a diagram that illustrates an example of inframe detection for various IEEE 802.11x packets according to various embodiments.

FIG. 6 shows a diagram 600 that illustrates an example of inframe detection for various IEEE 802.11 packets according to various embodiments. The diagram 600 includes a packet or frame 610 that corresponds to an IEEE 802.11a/g packet, a packet or frame 630 that corresponds to an IEEE 802.11n packet, and a packet or frame 650 that corresponds to an IEEE 802.11 ac packet.

The frame 610 includes an L-STF field 611, an L-LTF 1&2 field 612, an L-SIG field 613, and a data field 614. When inframe inspection for detecting the frame metric of the frame 610 identifies the frame 610 as a legacy frame, a voltage level 620 (V0) (and corresponding digital clock frequency) applied at the beginning of the frame 610 may be maintained for processing the entire frame.

The frame 630 includes an L-STF field 631, an L-LTF 1&2 field 632, an L-SIG field 633, an HT-SIG 1&2 field 634, and HT-STF field 635, HT-LTFs field 636, and a data field 637. When inframe (e.g., within frame) inspection for detecting the frame metric of the frame 630 identifies the frame 630 as a high throughput (HT) frame, a voltage level 640 (V0) is applied at the beginning of the frame 630 and it is subsequently scaled to a higher voltage level 645 (V1) during the HT-STF 635. The higher voltage level 645 may be maintained to process the HT-LTFs field 636 and the data field 637. The voltage scaling in this case also results in a corresponding digital clock frequency scaling.

The frame 650 includes an L-STF field 651, an L-LTF 1&2 field 652, an L-SIG field 653, a VHT-SIG-A field 654, a VHT-STF field 655, a VHT-LTFs fields 656, and a VHT-SIG-B and data field 657. The frame 650 may be an example of the frame 510 described above with reference to FIG. 5. When inframe inspection for detecting the frame metric of the frame 650 identifies the frame 650 as a very high throughput (VHT) frame, a voltage level 660 (V0) is applied at the beginning of the frame 650 and it is subsequently scaled to a higher voltage level 665 (V2) during the VHT-STF field 655. The voltage level 665 (V2) may be higher than the voltage level 645 (V1) of the frame 630. In some examples, V0 may be about 0.9V, V1 may be about 1.1V, and V2 may be higher than 1.1V. The higher voltage level 665 may be maintained to process the VHT-LTFs field 656 and the VHT-SIG-B and data field 657. The voltage scaling in this case also results in a corresponding digital clock frequency scaling.

Another consideration that may be taken with respect to the examples shown in FIG. 6 is whether the frames or packets are destined or directed to the UE device that is handling them. FIG. 4D and FIG. 4E provide a general description of what may occur to voltage (and/or frequency) scaling when a frame or packet is directed to the device and what may occur to the voltage (and/or frequency) scaling when the frame or packet is not directed to the device. For example, when the packet is a high-bandwidth packet (e.g., VHT) and is not directed to the device handling it, the voltage level may transition back to a low voltage level after pAID in the VHT-SIG-A. When the packet is a 40 MHz packet (e.g., HT or IEEE 11n) and is not directed at the device handling it, the voltage level may transition back to a lower voltage after the MAC RA field. Whether clock gating, power gating, and/or voltage scaling is used in any one of these scenarios may depend on what remains of the packet after the point when it was determined that the packet is not directed to the device.

There may be additional considerations to be made regarding transitions associated with dynamic voltage and frequency scaling. For example, the initial portion of a listen stage or mode may be started at a reduced Vdd. In some cases, the transition to a higher Vdd may be done early on right after automatic gain control (AGC) detects a valid WLAN signal (see e.g., FIG. 7). In these cases, when dynamic voltage and frequency scaling (DVFS) is implemented right after AGC (i.e., step up to nominal Vdd), it may lead to DVFS thrashing if a PHY layer error is found during the listen stage and the PHY (e.g., PHY module 330) goes back to search mode and switches back to reduced Vdd. The fast change in Vdd may lead to a in-rush power wasted due to LDO/SPMS transitions. In other words, the power used between increasing the voltage level early on and the reducing it once an error is found may result in more power being consumed than saved. On the other hand, because the increase to a higher Vdd occurs early on, the slew rate (i.e., scaling transition) or the PMU module 360 may be relaxed as the transition may take place over a longer period of time.

In other cases, the transition to a higher Vdd may take place after the VHT-SIG-A field (e.g., VHT-SIG-A field 654) identifies that a higher clock may be required. In these cases, when DVFS is implemented later in the frame or packet, more power may be saved during the listen stage. However, a later DVFS may involve more challenging slew rates (e.g., shorter scaling transitions) on a PMIC (e.g., 0.2V/4 us or even higher).

As described above, a PHY layer error may result in DVFS thrashing when AGC detection for DVFS is implemented early in a frame or packet. PHY layer errors may occur for multiple reasons and at different places in a frame or packet.

Figure 7:
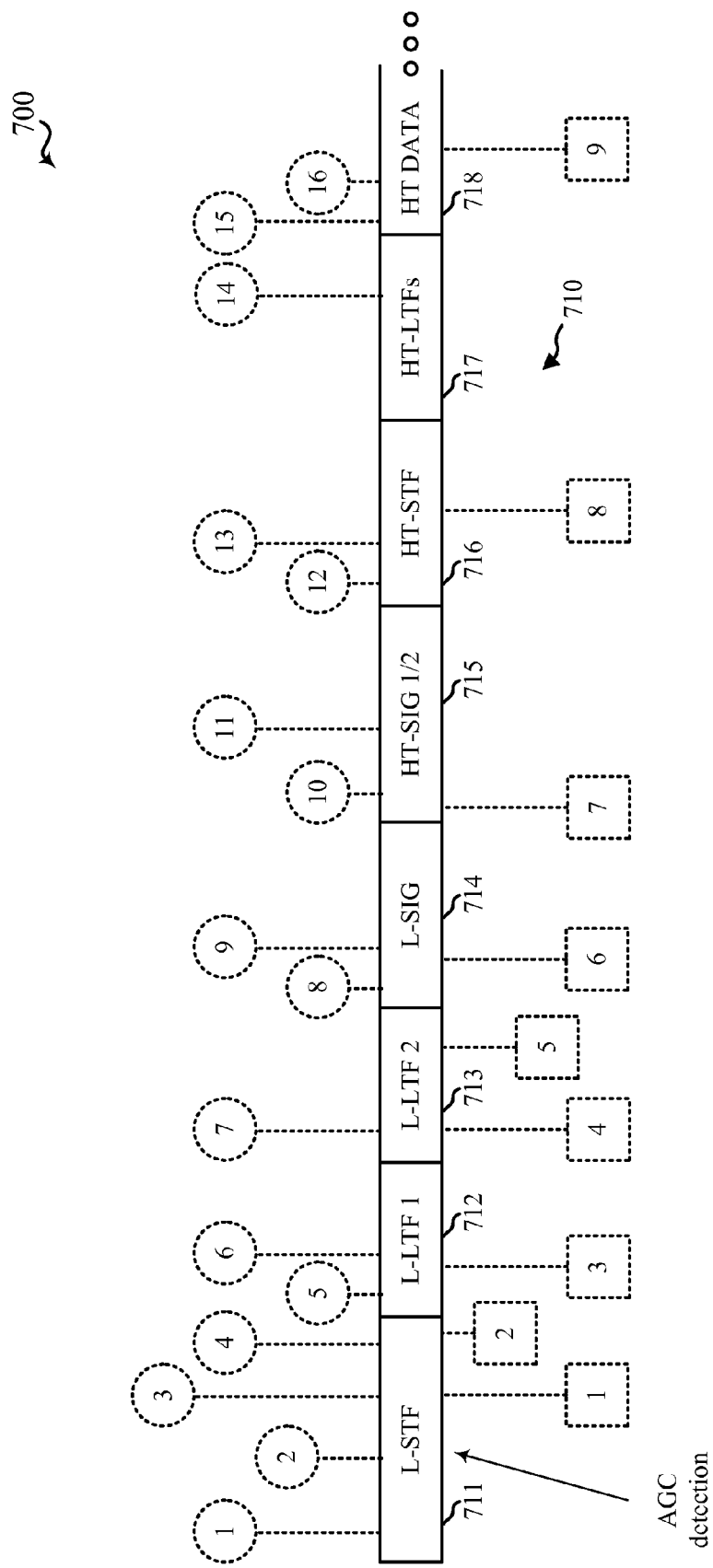
FIG. 7 shows a diagram that illustrates examples of a timeline of packet processing for errors according to various embodiments.

FIG. 7 shows a diagram 700 that illustrates different events, some of which are triggers for PHY layer errors. The diagram 700 includes a frame 710 having an L-STF field 711, an L-LTF 1 field 712, an L-LTF 2 field 713, an L-SIG field 714, an HT-SIG 1/2 field 715, an HT-STF field 716, an HT-LTFs field 717, and an HT data field 718. Each of the events shown in FIG. 7 is connected to a field in the frame 710 where that event occurs. Moreover, the diagram 700 also illustrates where AGC detection occurs (L-STF field 711) when DVFS is implemented early in the frame 710.

The dashed circles shown above the frame 710 identify events associated with various aspects of the fields of the frame 710. For example, events 1, 2, 3, and 4 are associated with the L-STF field 711, while events 15 and 16 are associated with the HT data field 718. The various events above the frame 710 are as follows: 1—drop gain; 2—find strong in-band signal; 3—voting for OFDM; 4—coarse DC/ppm; 5—step (coarse timing); 6—fine DC; 7—fine timing; 8—fine ppm; 9—channel estimation (chan. est.); 10—rate length; 11—find ht packet (pkt); 12—ht fine ppm; 13—modulation and coding scheme (mcs) length 20/40 aggressive (aggr.) short guard interval (sgi.) etc.; 14—ht fine timing; 15—ht channel estimation (cha. est.); and 16—start data detection (det) and tracking.

The dashed squares shown below the frame 710 identify events that may trigger PHY layer errors associated with the frame 710. Each of these events corresponds to a particular field of the frame 710. For example, events 1 and 2 are associated with the L-STF field 711, while event 9 is associated with the HT data field 718. The various events below the frame 710 are as follows: 1—voting for cck; 2—scorr low; 3—xcorr low; 4—fine timing error; 5—step time out; 6—long scorr low; 7—illegal rate/length or parity error; 8—ht-sig cyclic redundancy check (crc) error; and 9—power drop/high. When one of the events occurs, an error may be produced and dynamic voltage and frequency scaling may involve having to bring a previously increased voltage level back to a lower voltage level, which may result in thrashing.

As described above, dynamic voltage and frequency scaling (e.g., inframe DVFS) may be applied in various modes of communication. It may also be applied over an entire subsystem, or over various subsystems, of a wireless modem (e.g., device 300). By using separate and independent voltage islands associated with different subsystems, a more flexible power saving scheme may be implemented. For example, one subsystem may include the following components: AMBA (e.g., CPU module 310, Interconnect fabric etc.)), MAC (e.g., MAC module 320), BB (e.g., baseband module 340), RF (e.g., transceiver module 350), and MEM (e.g., MEM 370). The subsystem may also include one or more interfaces. The following representation may indicate the subsystem having the same source of voltage and its components: {AMBA, MAC, BB, RF, MEM}. This voltage subsystem involves most of the components of, for example, a wireless modem. However, a voltage subsystem may involve fewer and different components. Other examples of subsystems are {MAC, BB}, {MAC, BB, RF}, {AMBA, MAC, BB, MEM}. These voltage subsystems may involve the use of level shifters and voltage isolation, for example. Each voltage subsystem may have a corresponding digital clock frequency that may be scaled along with the voltage level of the voltage subsystem.

Dynamic voltage and frequency scaling may not be suitable for memory devices in some situations. For example, internal memory (e.g., SRAM) may or may not be voltage scaled and functional, depending on Vddmin requirements of memory libraries. The retention of memory, during deep sleep, however, may be accompanied by voltage scaling. In general, inframe DVFS typically may not apply to deep sleep, however, there may be cases when it does. Also, double data rate (DDR) digital logic blocks may not, in some cases, be suitable to on-the-fly clock/voltage scaling because of the presence of a delay-locked loop (DLL). In those cases, the memory may be included in a non-DVFS domain.

Figure 8A:
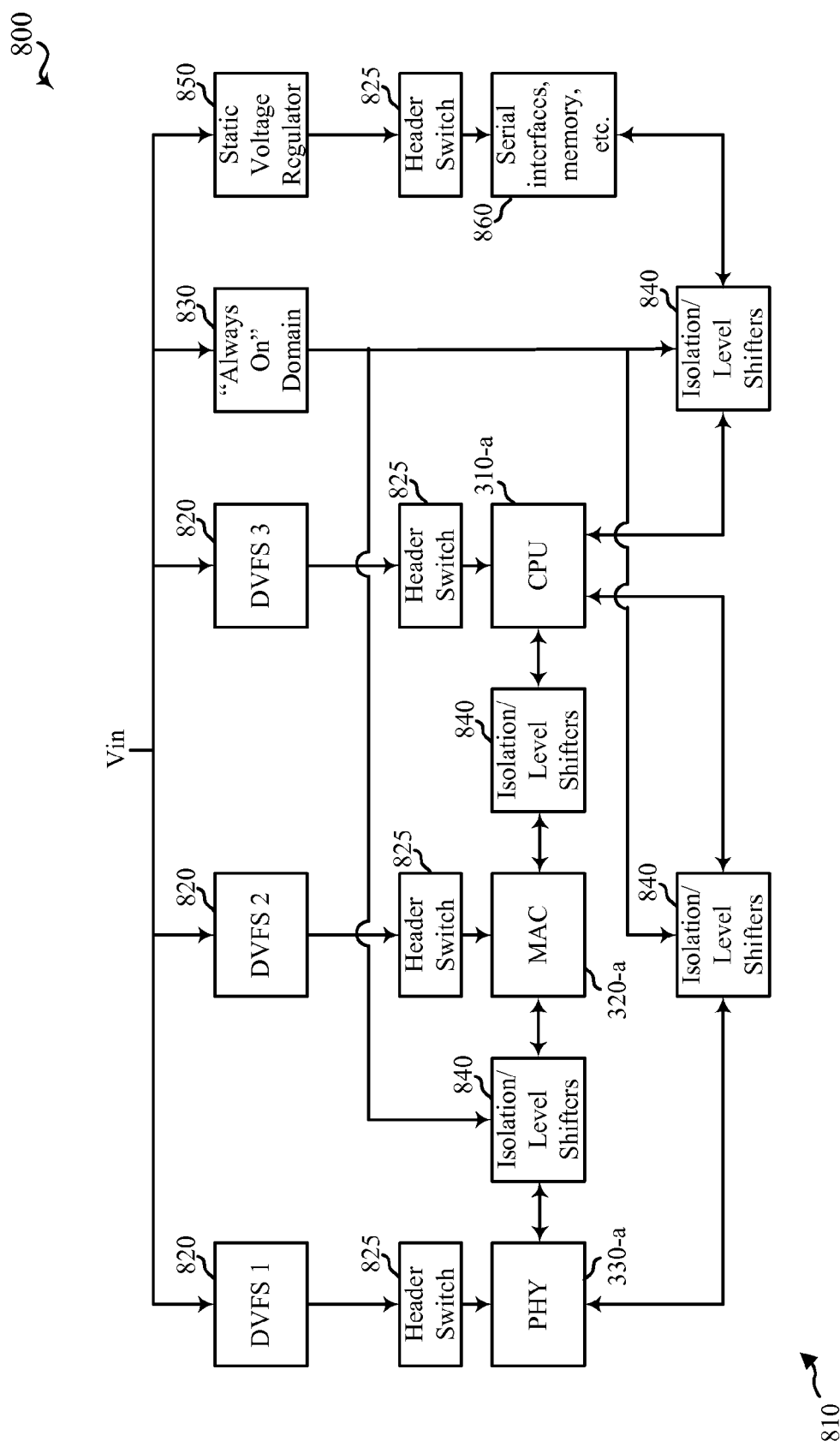
FIG. 8A shows a block diagram that illustrates an example of an architecture for dynamic voltage and frequency scaling of modem subsystems according to various embodiments.
Figure 8B:
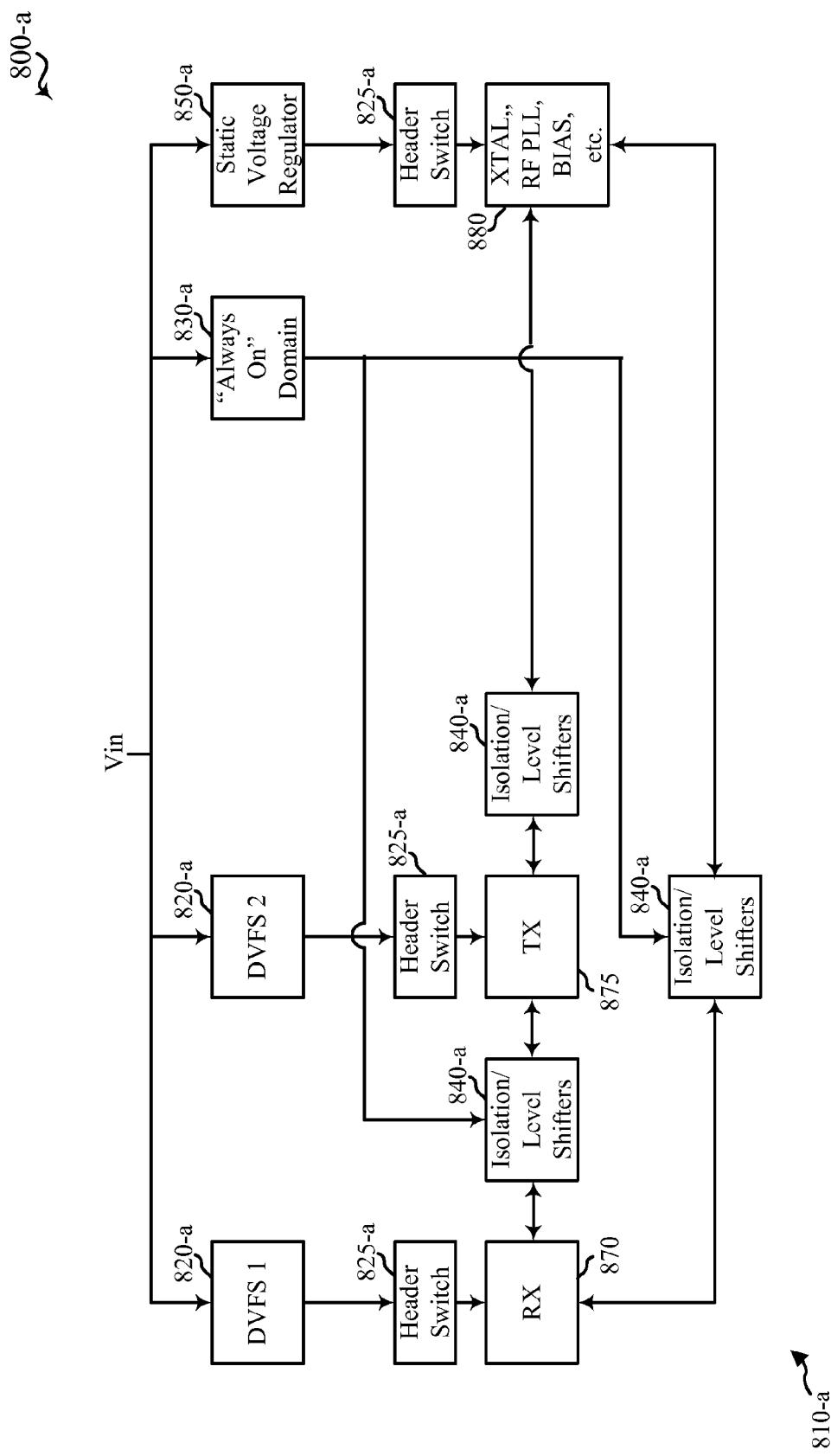
FIG. 8B shows a block diagram that illustrates an example of an architecture for dynamic voltage and frequency scaling of radio frequency (RF) modem subsystems according to various embodiments.

Other architectural considerations may include allowing for a CPU, interfaces (e.g., AXI/AHB/APB) and the associated bridges (e.g., X2H, H2P etc.) to be scaled in both frequency and voltage. Those blocks or components that are not amenable to on-the-fly clock changes may be placed out of a DVFS domain (e.g., PCIE/USB PHY, SERDES, etc.). FIG. 8A and FIG. 8B described below show different examples of voltage subsystems used in connection with dynamic voltage and frequency scaling.

FIG. 8A shows a diagram 800 that illustrates an example of a device 810 where each of the components is included in an independent voltage domain. According to the architecture of FIG. 8A, a PHY 330-a with a header switch 825 and a DVFS 1 820, a MAC 320-a with a header switch 825 and a DVFS 2 820, and a CPU 310-a with a header switch 825 and a DVFS 3 820, are each in a different DVFS (e.g., inframe DVFS) domain. These domains are separated by isolation/level shifters 840. The PHY 330-a, the MAC 320-a, and the CPU 310-a may be examples of the PHY 330, the MAC 320, and the CPU 310 of FIG. 3, respectively.

In addition to the DVFS domains supported by the DVFS 1 820, the DVFS 2 820, and the DVFS 3 820, an "Always On Domain" module 830 may provide appropriate voltage and/or frequency for the continuous operation of the isolation/level shifters 840. Moreover, the serial interfaces and memory 860 with a header switch 825 and a static voltage regulator 850 may be part of a separate, static, and non-DVFS domain. Note that the three DVFS domains, the "Always On" domain, and the static domain are all provided with the same voltage level, Vin, which may originate from a common source.

The DVFS 1 820, DVFS 2 820, and DVFS 3 820 create unique supply rails per digital block and can each be a switching regulator or an LDO. The static voltage regulator 850 creates a unique supply rail that is a fixed voltage and can be a switching regulator or an LDO.

FIG. 8B shows a diagram 800-a that illustrates an example of a device 810-a where each of the components is included in an independent domain. According to the architecture of FIG. 8B, a receiver (RX) 870 with a header switch 825-a and a DVFS 1 820-a, and a transmitter (TX) 875 with a header switch 825-a and a DVFS 2 820-a, are each in a different DVFS domain. These domains are separated by isolation/level shifters 840-a. The RX 870 and the TX 875 may be examples of an RF receiver and an RF transmitter, respectively, which may be included in the transceiver module 350 of FIG. 3.

In addition to the DVFS domains supported by the DVFS 1 820-a and DVFS 2 820-a, an "Always On Domain" module 830-a may provide appropriate voltage and/or frequency for the continuous operation of the isolation/level shifters 840-a. Moreover, the crystal (XTAL)/RF phase-locked loop (PLL)/BIAS 880 with a header switch 825-a and a static voltage regulator 850-a may be part of a separate, static, and non-DVFS domain. Note that the two RF DVFS domains, the "Always On" domain, and the static domain are all provided with the same voltage level, Vin, which may originate from a common source.

The DVFS 1 820-*a* and the DVFS 2 820-*a* create unique supply rails per digital block and can each be a switching regulator or an LDO. The static voltage regulator 850-*a* creates a unique supply rail that is a fixed voltage and can be a switching regulator or an LDO. In some instances, there may be multiple static voltage regulators 850-*a* per analog block that requires a fixed supply independent of the PHY rate.

The use of dynamic voltage and frequency scaling for RF and/or analog modules as shown in FIG. 8B may also be implemented in accordance to different modes of operation. For example, in a static mode, the voltage to the RF/Analog modules from a low noise amplifier (LNA) to an analog-to-digital converter (ADC) may be scaled, tying the RF scaling to the digital dynamic voltage and frequency scaling. In some cases, scaling the voltage may increase the analog receive gain (RxGain). Compensation circuits may be used in the RX path to mitigate any possible increases of RxGain. The compensation circuits may be implemented after the RxGain effects have been characterized. Another approach that may mitigate or minimize the effect of scaling in RF/analog modules may be to scale the baseband blocks independently from the RF blocks.

In a dynamic mode, RF analog filters may be switched from a lower bandwidth to a higher bandwidth in a timeline that corresponds to that of dynamic voltage and frequency scaling (e.g., duration of <10 us). However, implementing fast analog filter switching may present some challenges. Other aspects may include having RF PLL, BIAS, and XTAL in a static voltage domain as shown in FIG. 8B. Moreover, the transmit (TX) and receive (RX) blocks of the RF portion of a wireless modem may be on independent DVFS voltage domains as shown in FIG. 8B.

Figure 9A:
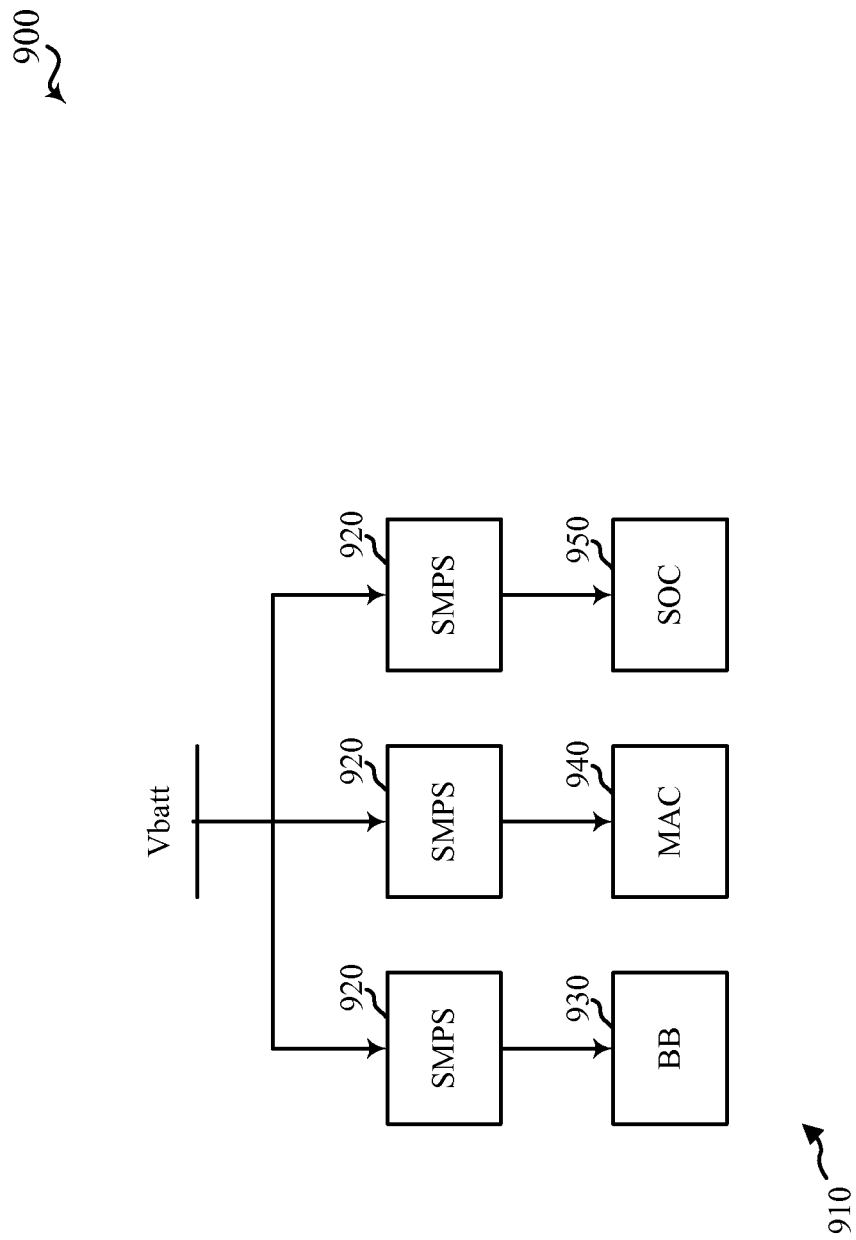
FIG. 9A shows a block diagram that illustrates an example of direct voltage scaling according to various embodiments.

Turning next to FIG. 9A, a diagram 900 is shown that illustrates a device 910 in which the voltages for a BB 930, a MAC 940, and a system-on-chip (SOC) 950 are being scaled directly and independently by different switched-mode power supplies (SMPS) 920. The BB 930 may be an example of the baseband module 340 of FIG. 3. The MAC 940 may be an example of the MAC modules 320 and 320-*a* of FIG. 3 and FIG. 8A, respectively. The SOC 950 may be an example of the CPU modules 310 and 310-*a* of FIG. 3 and FIG. 8A, respectively.

The following expressions describe the power analysis associated with the dynamic voltage scaling using SMPSs 940 (i.e., direct scaling):

$$V_{SCALED} = V_{SMPS}$$

$$I_{LOAD} = C \times V_{SMPS} \times F$$

$$I_{BATT} = I_{LOAD} \times (V_{SMPS}/V_{BATT}) \times (1/e)$$

$$P = V_{BATT} \times I_{BATT}$$

where $V_{SCALED}$=output of the SMPS, e=efficiency of SMPS, $I_{BATT}$=current drawn at battery, $V_{BATT}$=battery voltage, $I_{LOAD}$=current drawn at each block; C=load capacitance, F=block operational frequency, and P=power. The power calculations may be as follows:

Power before scaling: $(C \times F) \times (V_{SMPS})^2 \times (1/e)$

Power after scaling: $(C \times F) \times (V_{SCALED})^2 \times (1/e)$ which results in power savings that may be proportional to $V^2$ at $V_{BATT}$.

Figure 9B:
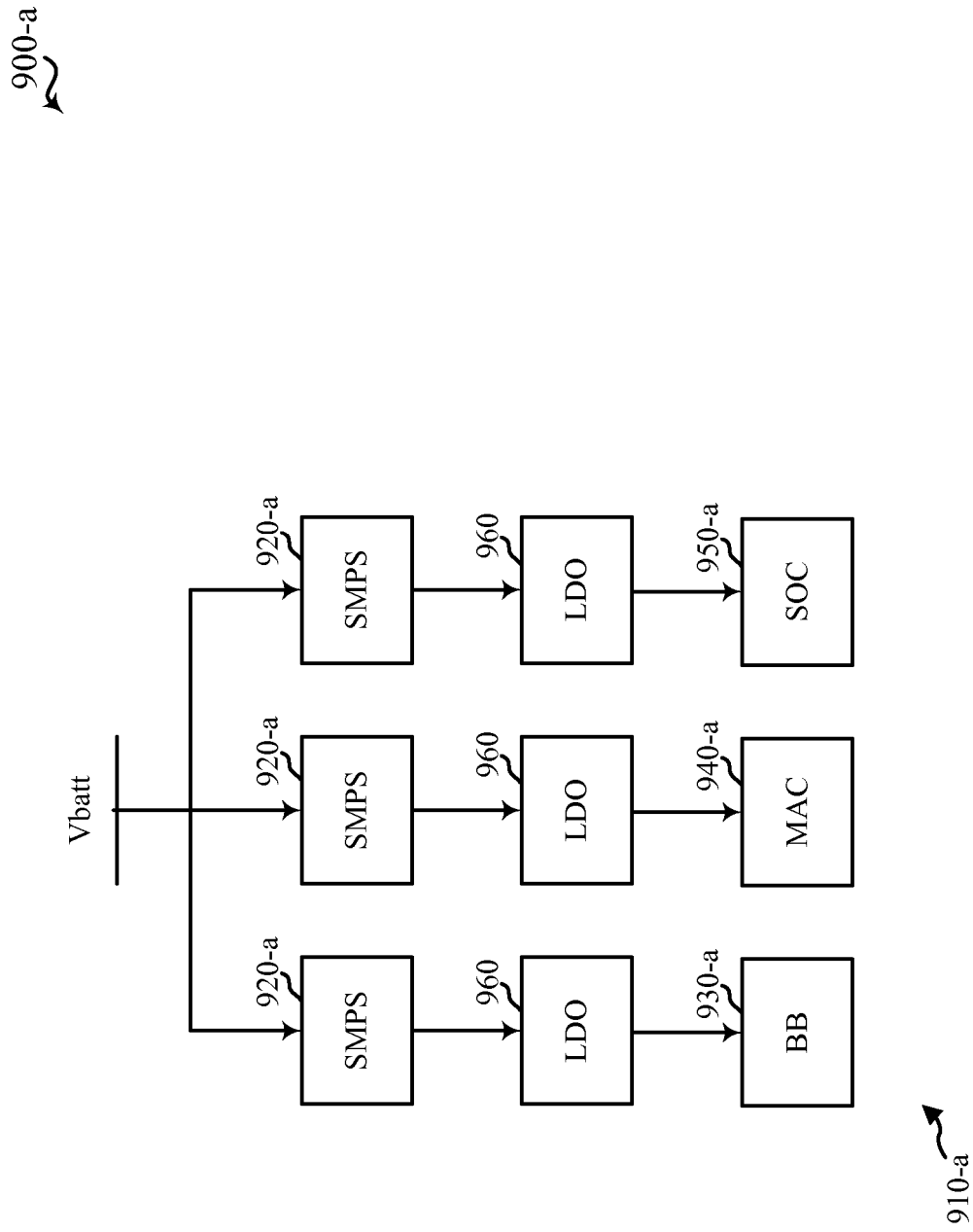
FIG. 9B shows a block diagram that illustrates an example of indirect voltage scaling according to various embodiments.

Turning to FIG. 9B, a diagram 900-*a* is shown that illustrates a device 910-*a* in which the voltages for a BB 930-*a*, a MAC 940-*a*, and an SOC 950-*a* are being scaled indirectly and independently by different SMPS 920-*a* through LDOs 960. The BB 930-*a* may be an example of the baseband module 340 of FIG. 3 and the BB 930 of FIG. 9A. The MAC 940-*a* may be an example of the MAC modules 320 and 320-*a* of FIG. 3 and FIG. 8A, respectively, and of the MAC 940 of FIG. 9A. The SOC 950-*a* may be an example of the CPU modules 310 and 310-*a* of FIG. 3 and FIG. 8A, respectively, and of the SOC 950 of FIG. 9A. The SMPS 920-*a* may be an example of the SMPS 920 of FIG. 9A.

The following expressions describe the power analysis associated with the dynamic voltage scaling using SMPSs 940-*a* and LDOs 960 (i.e., indirect scaling):

$$V_{SCALED} = V_{LDO}$$

$$I_{LOAD} = C \times V_{LDO} \times F + I_{BIAS}$$

$$I_{BATT} = I_{LOAD} \times (V_{SMPS}/V_{BATT}) \times (1/e)$$

$$P = V_{BATT} \times I_{BATT}$$

where some of these terms are common to those described above for the analysis with respect to FIG. 9A. Moreover, $V_{LDO}$=output of the LDO and $I_{BIAS}$=LDO bias current. The power calculations may be as follows:

Power before scaling: $(C \times F) \times (V_{SMPS})^2 \times (1/e)$

Power after scaling: $(C \times F) \times (V_{SCALED}) \times (V_{SMPS}) \times (1/e)$ (not including LDO bias current)

Power after scaling: $(V_{SMPS}) \times (C \times F \times V_{SCALED} + I_{BIAS}) \times (1/e)$ (including LDO bias current)

In an example that provides comparison between the implementation of the device 910 and the device 910-*a* in FIG. 9A and FIG. 9B, respectively, the following assumptions may be made:

$$V_{BATT} = 3.6 \text{ V}$$

$$V_{SMPS} = 1.05 \text{ V}$$

$$V_{SCALED} = 0.8 \text{ V}$$

$$I_{BIAS} = 50 \text{ μA}$$

$$e(\text{fficiency}) = 0.9$$

$$C \times F = 10^{-3}$$

Nominal block current=$C \times F \times V_{SMPS} = C \times F \times (1.05 \text{ V})$ Under these conditions, the calculated power without the use of DVFS may be 12.25 mW. The calculated power when DVFS and direct scaling (i.e., SMPS as shown in FIG. 9A) are used may be 7.1 mW, approximately a 42% reduction in the amount of power used. The calculated power when DVFS and indirect scaling (i.e., SMPS/LDO as shown in FIG. 9B) are used and the LDO bias is ignored may be 9.33 mW, approximately a 24% reduction in the amount of power used. The calculated power when DVFS and indirect scaling (i.e., SMPS/LDO as shown in FIG. 9B) are used and the LDO bias is included may be 9.39 mW, approximately a 23% reduction in the amount of power used. From these results, direct scaling may be used to provide a larger reduction in the amount of power used. This approach may be easy to implement in an integrated solution with an external PMIC with multiple DVFS capable SMPSs. Indirect scaling, on the other hand, may be suitable in discrete (not integrated) solutions. Note that the voltage scaling outlined in FIG. 9A and FIG. 9B may be used to scale corresponding clock frequencies used for processing digital data.

The various techniques described herein for implementing dynamic voltage and frequency scaling may also be applicable to wireless modems used in cellular communications such as those use in UEs for LTE networks. Below are provided some embodiments that implement features or aspects of dynamic voltage and frequency scaling into LTE-based communications.

Figure 10:
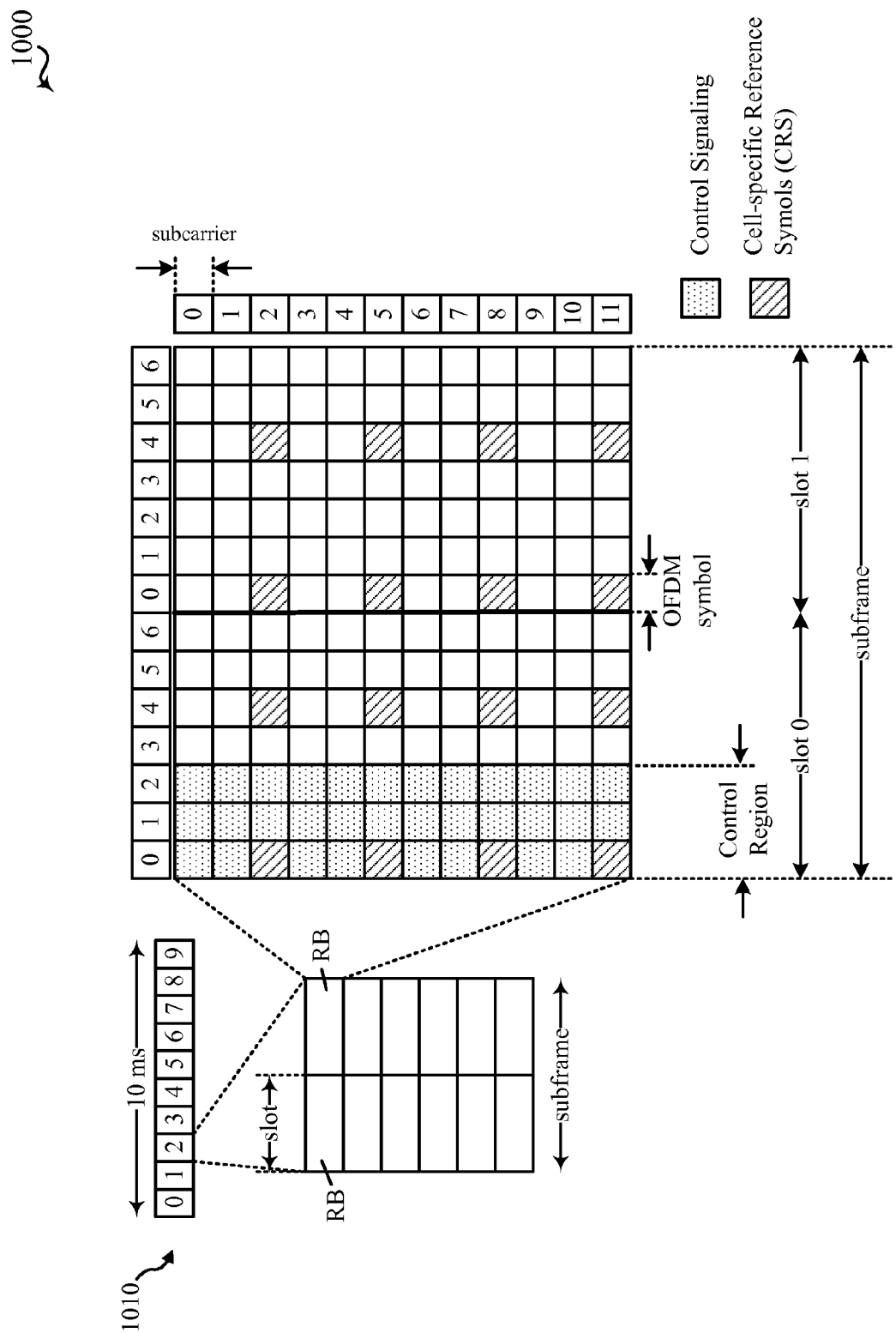
FIG. 10 shows a block diagram that illustrates an example of an LTE frame structure for use in dynamic voltage and frequency scaling according to various embodiments.

FIG. 10 shows a diagram 1000 that illustrates an example of frame structure that may be used in a wireless communication system, including the wireless communication systems described above with reference to FIG. 1 and FIG. 2. The frame structure may be used in LTE or similar systems. A frame (10 ms) 1010 may be divided into 10 equally sized sub-frames. Each sub-frame may include two consecutive time slots. A resource grid may be used to represent two time slots, each time slot including a resource block (RB). The resource grid may be divided into multiple resource elements.

In LTE, a resource block may contain 12 consecutive subcarriers in the frequency domain and, for a normal cyclic prefix in each OFDM symbol, 7 consecutive OFDM symbols in the time domain, or 84 resource elements. The number of bits carried by each resource element may depend on the modulation scheme. Thus, the more resource blocks that a UE receives and the higher the modulation scheme, the higher the data rate may be for the UE.

In this example, the first 1-3 or 1-4 OFDM symbols in the first slot may be used as a control region that includes control signaling symbols (dotted) and cell-specific reference symbols (CR-RS) (diagonal lines). The CR-RS may also be included in the remaining portion of the first slot and in the second slot. Control information provided in the control signaling symbols may include control information for one or multiple UEs contained in downlink control information (DCI) messages transmitted through physical downlink control channel (PDCCH).

Dynamic voltage and frequency scaling may be implemented in connection with the decoding stage of PDCCH. For example, each PDCCH or control region (i.e., first 3 or 4 OFDM symbols) may needs to be decoded at a 1 ms periodicity. A UE (e.g., UE 115), however, may or may not have downlink (DL) or reception grant or an uplink (UL) or transmission grant given to it. Because such grant may not be provided for a portion of the sub-frame, the remaining 11 or 10 OFDM symbols in the sub-frame may be ignored (i.e., not processed). When a DCI UL/DL grant is offered to the UE through the PDCCH, the UE may receive information about the resource block (RB) associated with the grants. The DL RB may be in the next slot, in which case the UE time may have between 3 and 4 OFDM symbols in the first slot to scale the clock and/or the voltage down before it needs to ready for the assigned DL grant.

When the grant is an UL grant, for example, which may be determined by decoding the first 1-3 or 1-4 OFDM symbols, the UE may ignore the remainder of the first slot and may clock gate with power scaling (i.e., reduced Vdd, reduced clock) the second slot of the sub-frame. The UL typically takes place 4 sub-frames after the grant. For the next PDCCH, which occurs in the next sub-frame 1 ms later, the UE may get the clock back up for decoding the PDCCH control information, which may provide a DL grant (for that sub-frame) or another UL grant 4 ms later.

When the grant is a DL grant in the same sub-frame as the 1-3 or 1-4 OFDM symbols from which the grant is determined, the UE may ignore the remaining OFDM symbols in the first slot and may operate during the first slot at a reduced Vdd (and corresponding lower clock). For the second slot, the UE may increase the Vdd (and the clock) back up to handle the DL.

Because each OFDM symbol has a duration of approximately 71 µs, implementing dynamic voltage and frequency scaling as described above for LTE slots and sub-frames may provide a significant amount of power savings in the operation of a wireless modem in a UE.

Figure 11A:
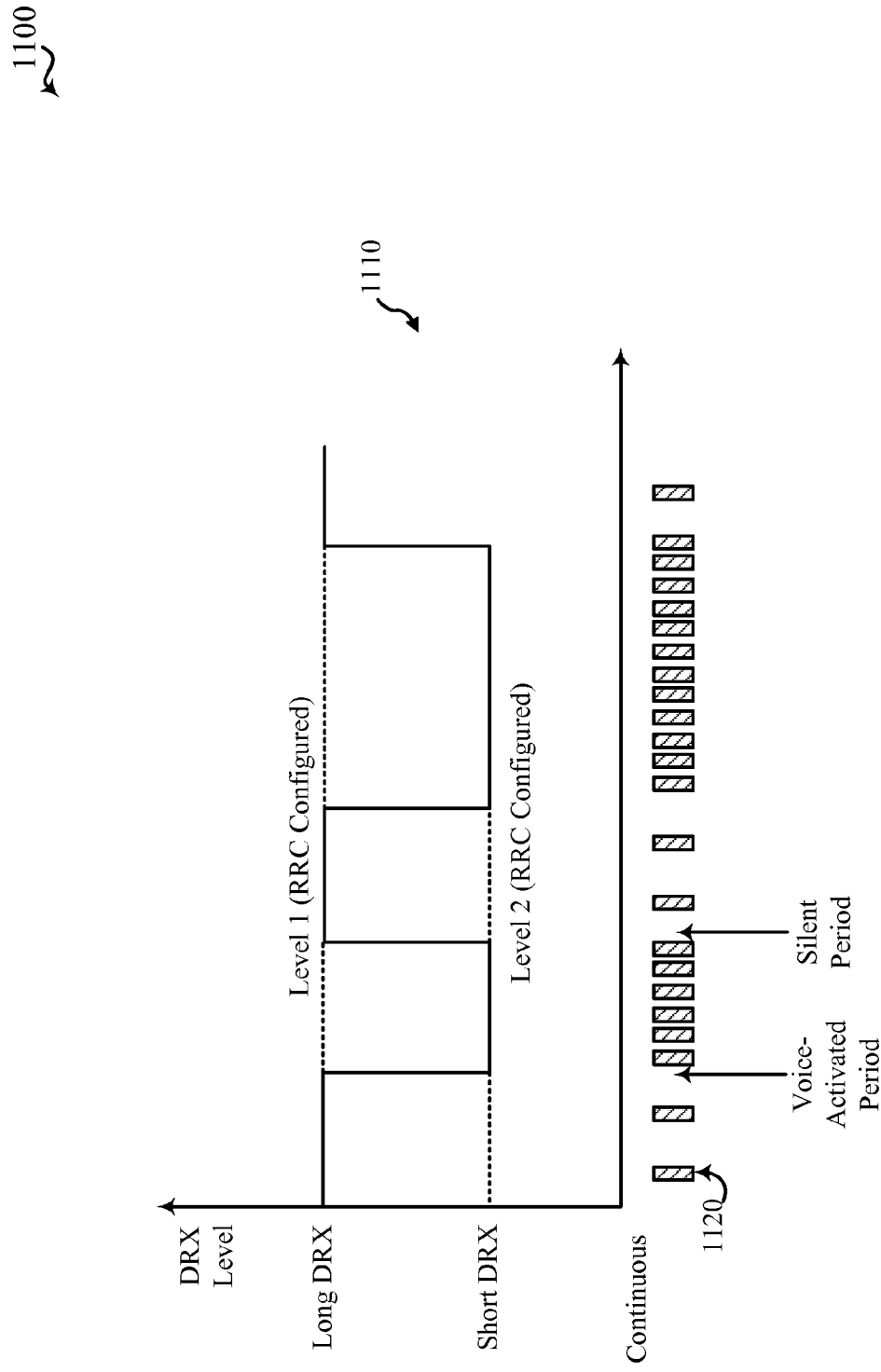
FIG. 11A shows a diagram that illustrates an example of long and short discontinuous reception (DRX) intervals in LTE according to various embodiments.

Turning next to FIG. 11A, a diagram 1100 illustrates a chart 1110 that describes long and short discontinuous reception (DRX) intervals during an active data connection in LTE for use in connection with dynamic voltage and frequency scaling. DRX intervals allow a UE (e.g., UE 115) to switch off its receiver for a period of time before it needs to turn it back on to receive or listen to signals. The chart 1110 shows both a long DRX, which may be configured by a radio resource control (RRC) message, for example. The chart 1110 also shows a short DRX, which may also be configured by an RRC message. Packets 1120 are shown to illustrate the pattern of information associated with the long and short DRXs of chart 1110. The packets 1120 may be realtime packets (e.g., Voice-over-IP (VoIP) packets) transmitted to the UE.

Figure 11B:
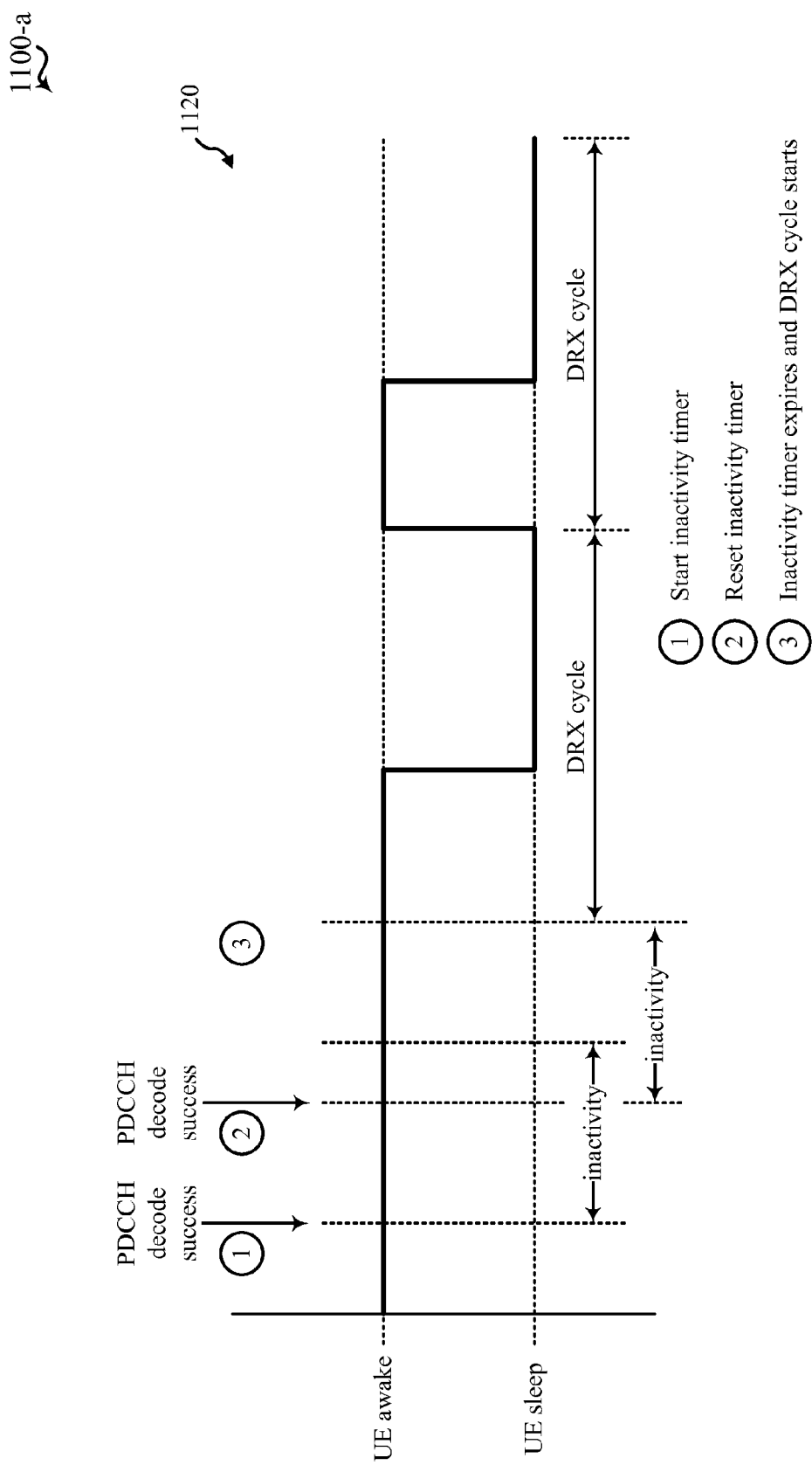
FIG. 11B shows a diagram that illustrates an example of dynamic voltage and frequency scaling during DRX intervals according to various embodiments.

During the DRX intervals or DRX cycles, the UE may stop or discontinue decoding the PDCCH. Thus, one approach to implement dynamic voltage and frequency scaling with DRX intervals may include that, at an entry into a DRX interval (long or short), the digital modem of the UE device and the RF subsystem may be frequency scaled and voltage scaled. Depending on one or more criterion (e.g., the DRX interval length), either clock gating, power gating, and/or voltage scaling may be applied. For example, if the duration is long enough, power collapse may be applied. FIG. 11B shows a diagram 1100-a in which a chart 1120 illustrates the timing of a DRX cycle in connection with PDCCH decoding. In the chart 1120, a successful PDCCH decoding starts an inactivity timer (1) when the UE is awake. The inactivity timer may expire after certain duration. However, when another successful PDCCH decoding starts before the inactivity timer expires, the inactivity timer may be reset (2). After the inactivity timer expires (3), the DRX cycle may start and dynamic voltage and frequency scaling may be applied when, for example, the UE is in a sleep or similar mode.

Another aspect of consideration for dynamic voltage and frequency scaling may be the measurement gaps that occur when an LTE modem (e.g., device 300) stops or discontinues active DL/UL traffic and begins to scan adjacent cells. During scanning, some operations may be performed. One or more of those operations may include the use of a Fast Fourier Transform (FFT). The FFT used during scanning, however, may be smaller than an FFT used during an active transmit/receive (TX/RX) mode. For example, a 64-point FFT may be used during scanning and a 2048-point FFT may be used during active TX/RX modes. This is because that cell physical layer identification typically arrives at a reduced bandwidth centrally located around a center frequency. A scaled clock may be used for the smaller FFT during scanning, which may be combined with voltage scaling of the digital modem of the UE device and the RF subsystem to provide greater power savings.

Figure 11C:
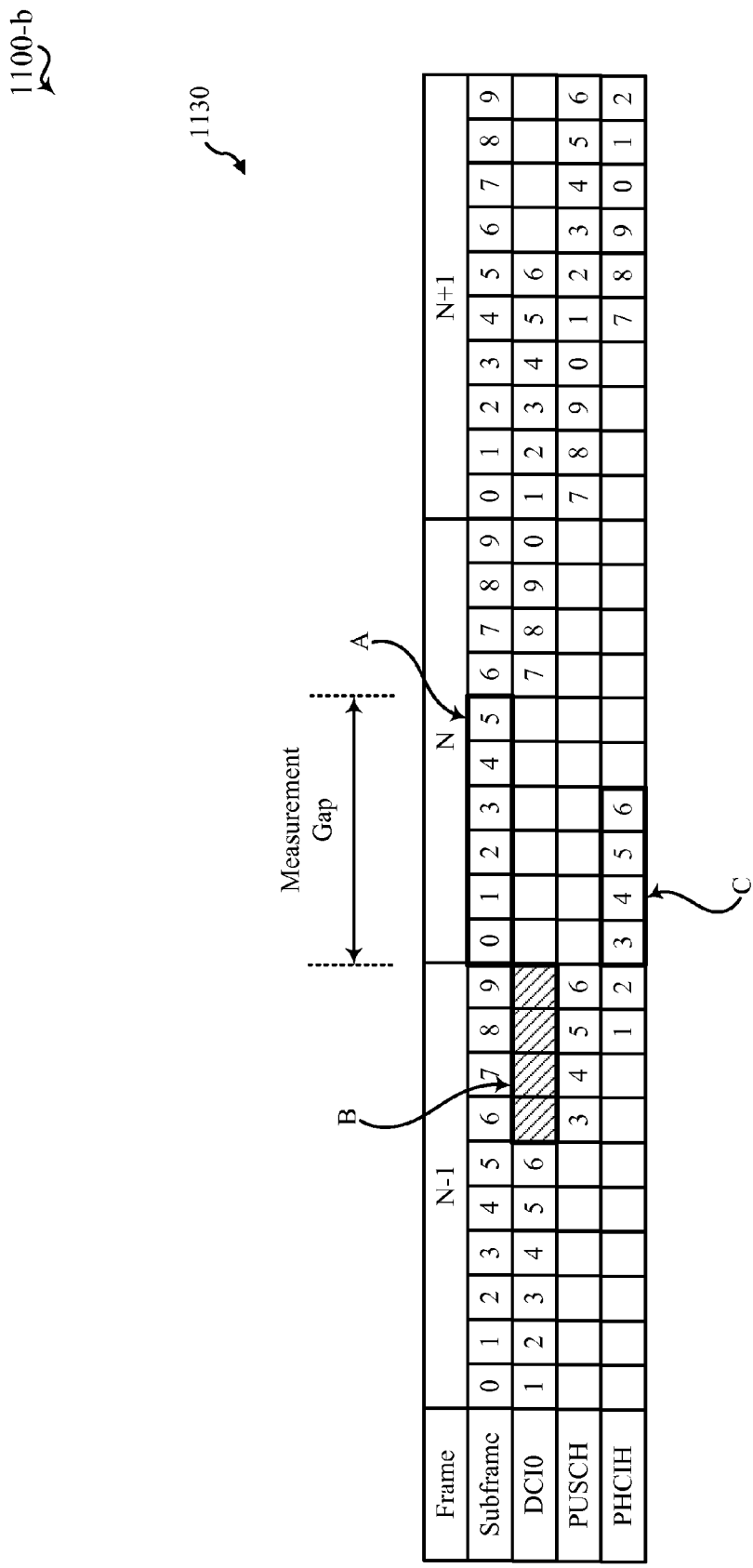
FIG. 11C shows a diagram that illustrates an example of dynamic voltage and frequency scaling during measurement gaps according to various embodiments.

FIG. 11C shows a diagram 1100-b in which a frame sequence 1130 illustrates various aspects of dynamic voltage and frequency scaling during measurement gaps. As shown in the frame sequence 1130, a gap (e.g., 6 ms) may arise every 40 ms or 80 ms, approximately, during a connected TX/RX mode. The gap in this example is shown in connection with a block A of six sub-frames in frame N. During this gap, the UE device (e.g., UE 115) may perform inter-frequency measurements and report signal parameters. As noted above, this kind of signal estimation may be performed using a 64-point FFT (where the physical layer channel primary broadcast channel (P-SCH) and the secondary synchronization channel (S-SCH) reside). The P-SCH and S-SCH typically refer to the central 72-subcarriers. When scaling (e.g., a scaled mode is applied) involves scaling a clock, the scaling may also involve voltage scaling. Block B shown in FIG. 11C illustrates a block of four sub-frames in which DCI0 may not be transmitted because a corresponding to a physical uplink shared channel (PUSCH) may fall within the measurement gap. Moreover, a block C of four sub-frames illustrates that a physical hybrid-ARQ indicator channel (PHICH) for PUSCH sub-frames 3, 4, 5, and 6 may not be transmitted because they may be within the measurement gap.

In another aspect related to using dynamic voltage and frequency scaling in LTE, one or more of the scaling schemes or techniques described herein may be applied to various features of OFDM/A or OFDMA. For example, when engaged in a TX/RX mode, a UE (e.g., UE 115), may perform a wide-band FFT using a 2048-point FFT. However, OFDM/A typically incorporates sub-20 MHz bandwidth blocks across the frequency access. Moreover, these blocks may change in each sub-frame. Generally, cellular chipsets used for OFDM/A applications tend to operate at the highest clock rate to perform wide-band analysis to report channel quality indication (CQI) wide-band and sub-bands. CQI reporting, however, may not be needed at all times and dynamic voltage and frequency scaling may be applied.

For example, an UE (e.g., UE 115) in LTE may not need to report wide-band CQI. The UE may then get assigned a resource block (e.g., physical resource block (PRB) of 0.5 ms and 12 sub-carriers) of about 5 MHz, for example, which is smaller than the 20 MHz total system bandwidth. The UE may detect this information in the first three or four OFDM symbols (see e.g., FIG. 10). In such a case, there may be no need to operate at the highest clock for a DL grant. Instead, it may be possible to scale the clock to process the small bandwidth of data (e.g., 5 MHz), which is offset from the center frequency, and scale the voltage for the duration of the PRB. This approach may not be applicable to the first three or four OFDM symbols since those symbols are used to obtain the control data, which is wide-band.

The examples described above may allow for having the UE sleep in the frequency domain based on the characteristics of OFDM/A. Then, clock and/or voltage scaling may be performed at line-rate and based on the PRB assignment. The above scheme may be abandoned for sub-frames where the UE is required to report a wideband CQI report to the eNode-B. Furthermore, in the event of a distributed PRB assignment, the highest clock selected may be commensurate with the highest bandwidth from the multiple bandwidths associated with each distributed PRB.

Next is provided information about LTE across its operational bandwidth in connection with implementing dynamic voltage and frequency scaling. For at least some of the modes (e.g., channel bandwidths), for the 76 central sub-carriers, a 128-point FFT may be used. However, to optimize the cell search process, the primary synchronization sequence (PSS) and the secondary synchronization sequence (SSS) may be transmitted in 64 subcarriers (e.g., PBCH) to allow for a 64-point FFT to be used. It may be possible, then, to operate at a scaled clock of 1.92 MHz or lower as the dynamic range of the clock is quite high. This approach may provide great flexibility in scaling the voltage for cell search measurement gaps (see e.g., FIG. 11C). A more general approach may be to perform a reduced, N-point FFT, select a minimum sample clock that is needed to perform the FFT (e.g., subcarrier frequency spacing×N) as granted by the PRB bandwidth, and scale the voltage at line-rate processing of LTE DL/UL traffic. This more general approach may correspond to the implementation of a sleep function in the frequency domain.

Figure 12:
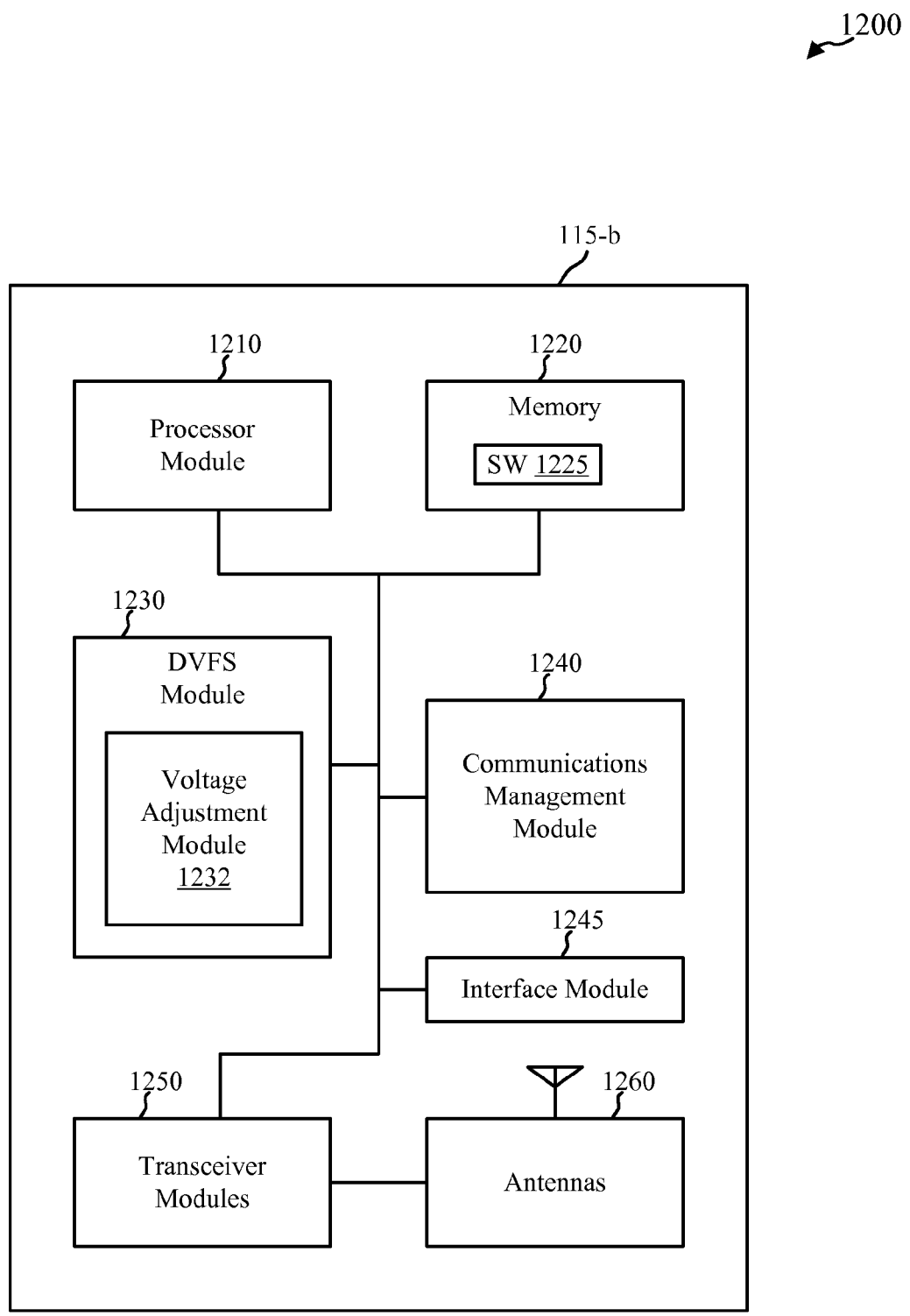
FIG. 12 shows a block diagram that illustrates an example of a wireless communications device architecture according to various embodiments.

Turning next to FIG. 12, a diagram 1200 is shown that illustrates an UE 115-*b* configured for dynamic voltage and frequency scaling. The UE 115-*b* may be used with cellular networks (e.g., LTE) and connects through base stations, and/or in WLAN or Wi-Fi communications and connects through an access point, for example. The UE 115-*b* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 115-*v* may have an internal power supply (not shown), such as a small battery, to facilitate mobile operation. The UE 115-*b* may be an example of the user equipments 115 of FIG. 1 and FIG. 2. The UE 115-*b* may include the device 300 of FIG. 3, the devices 810 and 810-*a* of FIG. 8A and FIG. 8B, and/or the devices 910 and 910-*a* of FIG. 9A and FIG. 9B. The UE 115-*b* may be referred to as a wireless communications device, a user equipment, or a station in some cases.

The UE 115-*b* may include antennas 1260, a transceiver module 1250, a memory 1220, a processor module 1210, and an interface module 1245, which each may be in communication, directly or indirectly, with each other (e.g., via one or more buses). The transceiver module 1250 may be configured to communicate bi-directionally, via the antennas 1260 and/or one or more wired or wireless links, with one or more networks, as described above. For example, the transceiver module 1250 may be configured to communicate bi-directionally with base stations 105 FIG. 1 and/or the access points 120 and 120-*a* of FIG. 1 and FIG. 2. The transceiver module 1250 may be implemented as a transmitter module and a separate receiver module. The transceiver module 1250 may include a modem configured to modulate the packets and provide the modulated packets to the antennas 1260 for transmission, and to demodulate packets received from the antennas 1260. The modem may include at least a portion of the device 300 described with respect to FIG. 3. While the UE 115-*b* may include a single antenna, there may be embodiments in which the UE 115-*b* may include multiple antennas 1260.

The memory 1220 may include random access memory (RAM) and read-only memory (ROM). The memory 1220 may store computer-readable, computer-executable software code 1225 containing instructions that are configured to, when executed, cause the processor module 1210 to perform or control various functions described herein for dynamic voltage and frequency scaling. Alternatively, the software code 1225 may not be directly executable by the processor module 1210 but be configured to cause the computer (e.g., when compiled and executed) to perform functions described herein.

The processor module 1210 may include an intelligent hardware device, e.g., a central processing unit (CPU) such as those made by Intel® Corporation or AMD®, a microcontroller, an ASIC, etc. The processor module 1210 may process information received through the transceiver module 1250 and/or to be sent to the transceiver module 1250 for transmission through the antennas 1260. The processor module 1210 may handle, alone or in connection with the DVFS module 1230, various aspects of dynamic voltage and frequency scaling.

According to the architecture of FIG. 12, the UE 115-*b* may further include a communications management module 1240. The communications management module 1240 may manage communications with other user equipments 115, with various base stations (e.g., macro cells, small cells), and/or with various access points. By way of example, the communications management module 1240 may be a component of the UE 115-*b* in communication with some or all of the other components of the UE 115-*b* via a bus (as shown in FIG. 12). Alternatively, functionality of the communications management module 1240 may be implemented as a component of the transceiver module 1250, as a computer program product, and/or as one or more controller elements of the processor module 1210.

Figure 19:
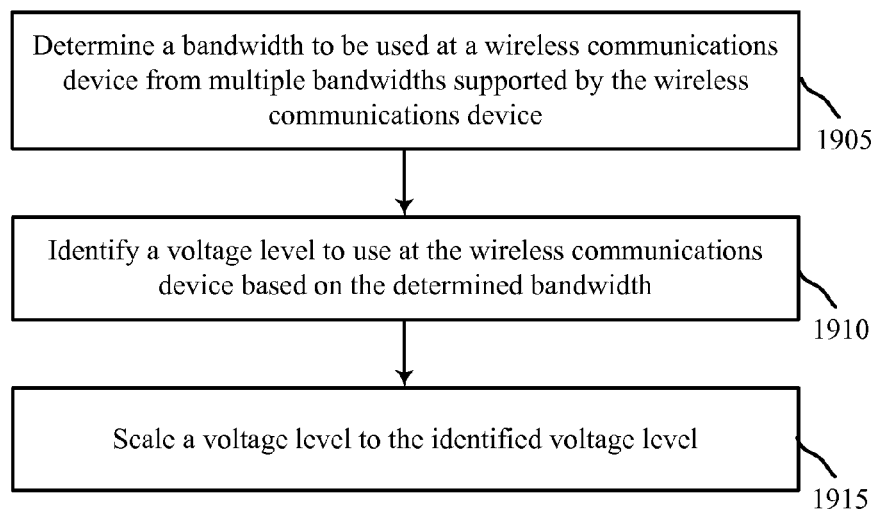
FIG. 19 is a flowchart of an example of a method for dynamic voltage and frequency scaling according to various embodiments.
Figure 20:
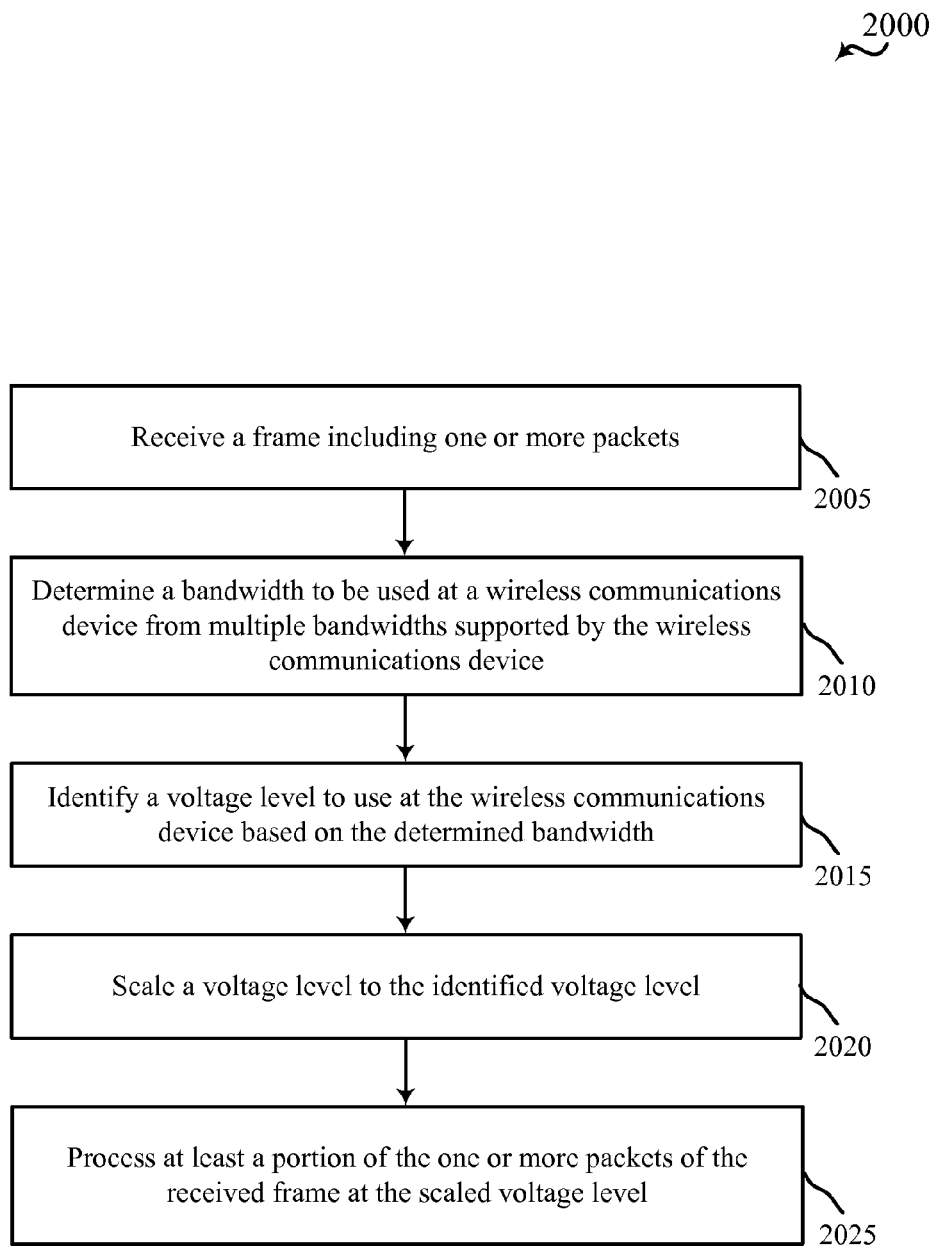
FIG. 20 is a flowchart of an example of another method for dynamic voltage and frequency scaling according to various embodiments.
Figure 21:
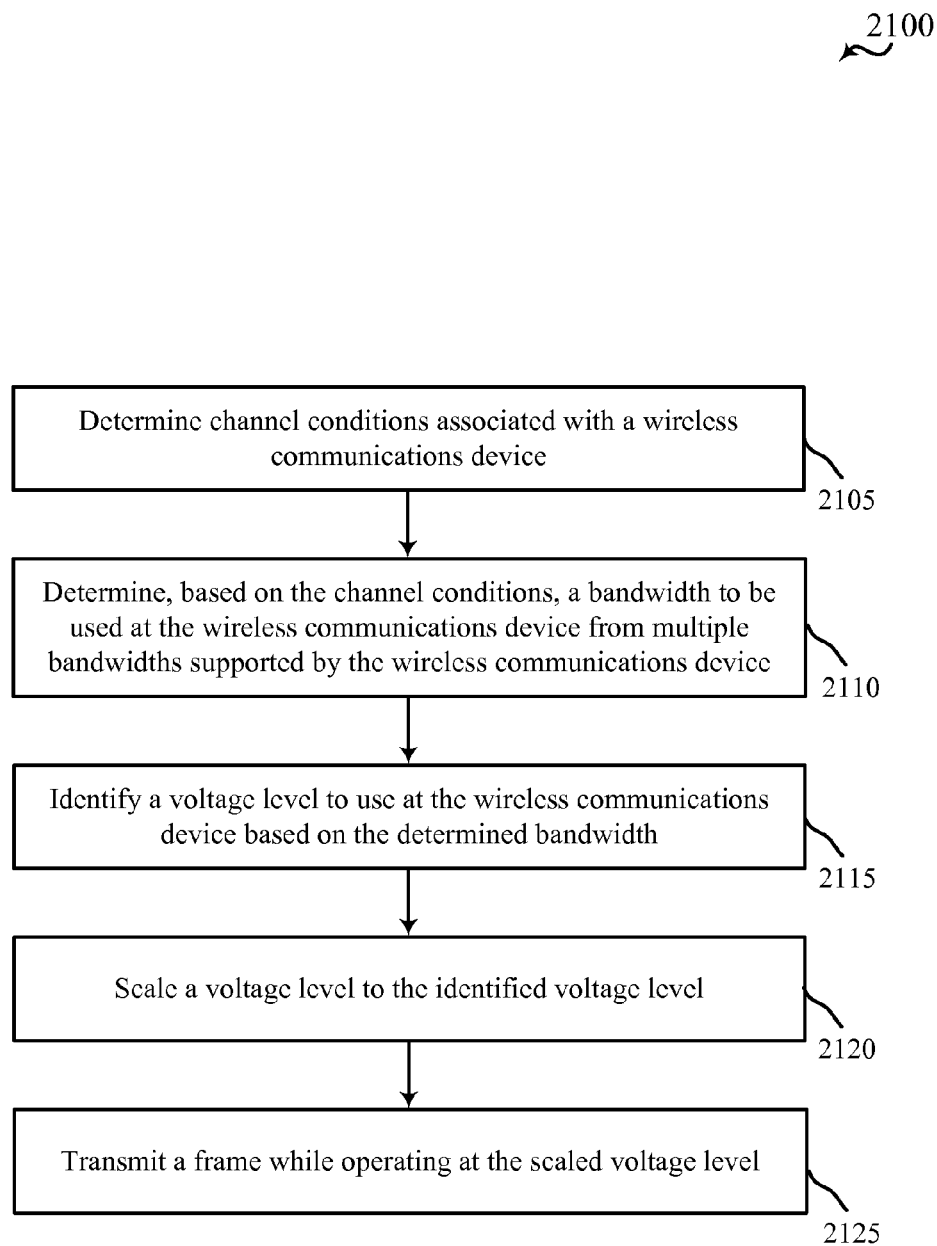
FIG. 21 is a flowchart of an example of yet another method for dynamic voltage and frequency scaling according to various embodiments.

The components of the UE 115-*b* may be configured to implement aspects discussed above with respect to devices 300, 810, 810-*a*, 910, and 910-*a* and those aspects may not be repeated here for the sake of brevity. The components of the UE 115-*b* may be configured to implement aspects discussed above with respect to the diagrams in FIG. 4A, FIG. 4B, FIG. 4C, FIG. 4E, FIG. 5, and FIG. 6. Moreover, the components of the UE 115-*b* may be configured to implement aspects discussed below with respect to methods 1600, 1700, 1800, 1900, 2000, and 2100 of FIG. 16, FIG. 17, FIG. 18. FIG. 19, FIG. 20, and FIG. 21, respectively, and those aspects may not be repeated here also for the sake of brevity.

The UE 115-*b* may also include the DVFS module 1230, which as described above, may be configured to handle various aspects of dynamic voltage and frequency scaling. The DVFS module 1230 may include a voltage adjustment module 1232. The voltage adjustment module 1232 may perform one or more aspects of operating at a first voltage level in the UE 115-*b*; detecting, within a received frame, a frame metric associated with one or more packets of the received frame; and determining whether to transition to a second voltage level to process at least a portion of the one or more packets of the received frame based on the detected frame metric. The frame metric may include one or more of a throughput category, a destination of a packet, a transmission grant, and a reception grant. The voltage adjustment module 1232 may perform one or more aspects of determining a bandwidth to be used at the UE 115-*b* from multiple bandwidths supported by the UE 115-*b*; identifying a voltage level to use at the UE 115-*b* based on the determined bandwidth; and scaling a voltage level to the identified voltage level. The voltage adjustment module 1232 may be configured to perform digital clock frequency adjustments that correspond to the voltage adjustments. For example, the voltage adjustment module 1232 may use an increased voltage level to produce a higher digital clock frequency and may use a reduced voltage level to produce a lower digital clock frequency.

The UE 115-*b* may also include the interface module 1245, which may be configured to include a PCIE/USB/ SDIO bridge for the data pipe between the processor module 1210 and a portion of the UE 115-*b* performing MAC layer operations. The interface module 1245 may be an example of the interface module 315 in FIG. 3.

Figure 13:
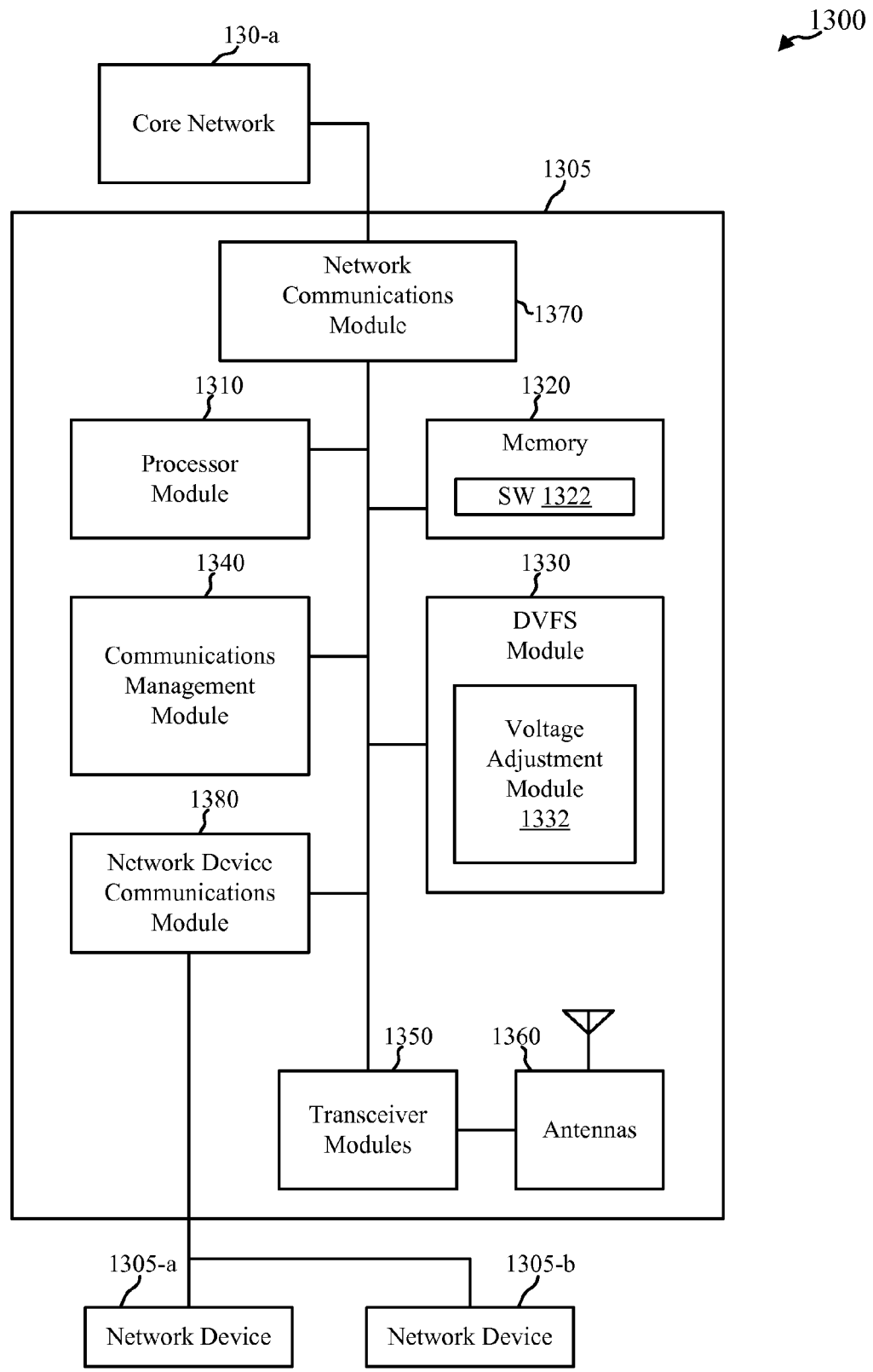
FIG. 13 shows a block diagram that illustrates an example of a network device architecture according to various embodiments.

Turning to FIG. 13, a diagram 1300 is shown that illustrates a network device 1305. In some embodiments, the network device 1305 may be an example of the base stations 105 of FIG. 1 and/or the access points 120 and 120-*a* of FIG. 1 and FIG. 2. The network device 1305 may be used in a cellular network (e.g., LTE) or for WLAN or Wi-Fi communications. The network device 1305 may include antennas 1360, transceiver modules 1350, a memory 1320, and a processor module 1310, which each may be in communication, directly or indirectly, with each other (e.g., over one or more buses). The transceiver modules 1350 may be configured to communicate bi-directionally, via the antennas 1360, with one or more user equipments such as the UE 115-*b* of FIG. 12. The transceiver modules 1350 (and/or other components of the network device 1305) may also be configured to communicate bi-directionally with one or more networks. In some cases, the network device 1305 may communicate with a core network 130-*a* through a network communications module 1370. The core network 130-*a* may be an example of the core network 130 of FIG. 1. The network device 1305 may be an example of an eNodeB base station, a Home eNodeB base station, a NodeB base station, and/or a Home NodeB base station. The network device 1305 may also be an example of an access point.

The network device 1305 may also communicate with other network devices, such as the network device 1305-*a* and the network device 1305-*b*. In one example, the network device 1305-*a* may be another access point. In another example, the network device 1305-*b* may be a base station through which the network device 1305 may establish a cellular connection. Each of the network devices 1305, 12305-*a*, and 1305-*b* may communicate with a user equipment using different wireless communications technologies, such as different Radio Access Technologies. In some cases, the network device 1305 may communicate with other network devices using a network device communications module 1380. In some embodiments, the network device communications module 1380 may provide an X2 interface within an LTE wireless communication technology to provide communication between some of the network devices. In some embodiments, the network device 1305 may communicate with other network devices through the core network 130-*a*.

The memory 1320 may include RAM and ROM. The memory 1320 may also store computer-readable, computer-executable software code 1322 containing instructions that are configured to, when executed, cause the processor module 1310 to perform various functions described herein for dynamic voltage and frequency scaling. Alternatively, the software code 1322 may not be directly executable by the processor module 1310 but be configured to cause the computer, e.g., when compiled and executed, to perform functions described herein.

The processor module 1310 may include an intelligent hardware device, e.g., a CPU, a microcontroller, an ASIC, etc. The processor module 1310 may process information received through the transceiver modules 1350, the network device communications module 1380, and/or the network communications module 1370. The processor module 1310 may also process information to be sent to the transceiver modules 1350 for transmission through the antennas 1360, to the network device communications module 1380, and/or to the network communications module 1370. The processor module 1310 may handle, alone or in connection with the DVFS module 1330, various aspects of dynamic voltage and frequency scaling.

The transceiver modules 1350 may include a modem configured to modulate the packets and provide the modulated packets to the antennas 1360 for transmission, and to demodulate packets received from the antennas 1360. The modem may include at least a portion of the device 300 described above with reference to FIG. 3. The transceiver modules 1350 may be implemented as a transmitter module and a separate receiver module.

According to the architecture of FIG. 13, the network device 1305 may further include a communications management module 1340. The communications management module 1340 may manage communications with other network devices. By way of example, the communications management module 1340 may be a component of the network device 1305 in communication with some or all of the other components of the network device 1305 via a bus (as shown in FIG. 13). Alternatively, functionality of the communications management module 1350 may be implemented as a component of the transceiver modules 1350, as a computer program product, and/or as one or more controller elements of the processor module 1310.

The components for the network device 1305 may be configured to implement aspects discussed above with respect to devices 300, 810, 810-*a*, 910, and 910-*a* and those aspects may not be repeated here for the sake of brevity. The components of the network device 1305 may be configured to implement aspects discussed above with respect to the diagrams in FIG. 4A, FIG. 4B, FIG. 4C, FIG. 4E, FIG. 5, and FIG. 6. Moreover, the components for the network device 1305 may be configured to implement aspects discussed below with respect to methods 1600, 1700, 1800, 1900, 2000, and 2100 of FIG. 16, FIG. 17, FIG. 18. FIG. 19, FIG. 20, and FIG. 21, respectively, and those aspects may not be repeated here also for the sake of brevity.

The network device 1305 may also include the DVFS module 1330, which as described above, may be configured to handle various aspects of dynamic voltage and frequency scaling. The DVFS module 1330 may include a voltage adjustment module 1332. The voltage adjustment module 1332 may perform one or more aspects of operating at a first voltage level in the network device 1305; detecting, within a received frame, a frame metric associated with one or more packets of the received frame; and determining whether to transition to a second voltage level to process at least a portion of the one or more packets of the received frame based on the detected frame metric. The frame metric may include one or more of a throughput category, a destination of a packet, a transmission grant, and a reception grant. The voltage adjustment module 1332 may perform one or more aspects of determining a bandwidth to be used at the network device 1305 from multiple bandwidths supported by the network device 1305; identifying a voltage level to use at the network device 1305 based on the determined bandwidth; and scaling a voltage level to the identified voltage level. The voltage adjustment module 1332 may be configured to perform digital clock frequency adjustments that correspond to the voltage adjustments. For example, the voltage adjustment module 1332 may use an increased voltage level to produce a higher digital clock frequency and may use a reduced voltage level to produce a lower digital clock frequency.

Figure 14A:
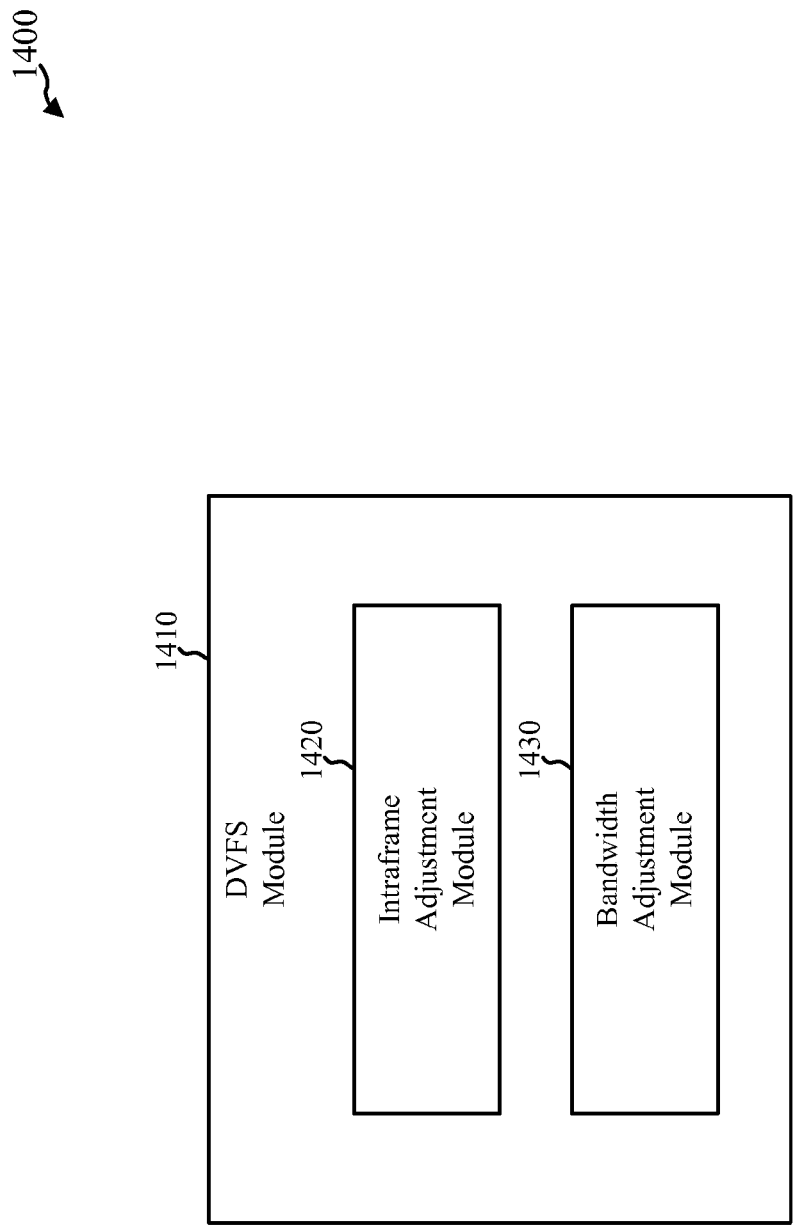
FIG. 14A shows a block diagram that illustrates an example of a dynamic scaling and frequency module according to various embodiments.

FIG. 14A shows a diagram 1400 that illustrates a DVFS module 1410, which may be an example of the DVFS module 1230 of FIG. 12 and the DVFS module 1330 of FIG. 13. The DVFS module 1410 may include an intraframe adjustment module 1420 and a bandwidth adjustment module 1430. The DVFS module, or at least portions of it, may be a processor.

The intraframe adjustment module 1420 may be configured to operate at a first voltage level in a wireless communications device, to detect, within a received frame, a frame metric associated with one or more packets of the received frame, and to determine whether to transition to a second voltage level to process at least a portion of the one or more packets of the received frame based on the detected frame metric. The frame metric may include one or more of a throughput category, a destination of a packet, a transmission grant, and a reception grant.

The intraframe adjustment module 1420 may be configured to scale from the first voltage level to the second voltage level, where the second voltage level is greater than the first voltage level. The intraframe adjustment module 1420 may be configured to scale from the second voltage level to the first voltage level for a next received frame after processing the at least a portion of the one or more packets of the received frame at the second voltage level. The detection performed by the intraframe adjustment module 1420 may include the detection of the frame metric within a preamble of the received frame. In some embodiments, the one or more packets in the received frame is a IEEE 802.11ac packet. Moreover, the one or more packets may be a VHT packet, and the detection performed by the intraframe adjustment module 1420 includes the detection of the frame metric during the VHT-STF of the received VHT packet. The intraframe adjustment module 1420 may be configured to scale from the first voltage level to the second voltage level within the VHT packet, where the second voltage level is greater than the first voltage level.

The intraframe adjustment module 1420 may be configured to determine whether the frame is destined for the wireless communications device, and to operate at the first voltage level when the frame is not destined for the wireless communications device. In some embodiments, the determination includes identifying a MAC portion of the frame and determining a destination of the frame from the MAC portion of the frame. In other embodiments, the determination includes identifying a pAID field or a GID field in the frame, and determining a destination of the frame from the pAID field or the GID field.

The intraframe adjustment module 1420 may be configured to handle HT packets and scale from the first voltage level to the second voltage level to process at least a portion of the HT packet, where the second voltage level is greater than the first voltage level. The intraframe adjustment module 1420 may be configured to handle a legacy packet and to maintain the first voltage level for processing the legacy packet.

The intraframe adjustment module 1420 may be configured to identify a bandwidth associated with the one or more packets of received frame, and to scale from the first voltage level to the second voltage level based at least in part on the frame metric and the identified bandwidth. The intraframe adjustment module 1420 may be configured to identify a different bandwidth associated with the one or more packets of received frame, and to scale from the second voltage level to a third voltage level based at least in part on the frame metric and the identified different bandwidth. The intraframe adjustment module 1420 may be configured to scale from a first clock frequency to a second clock frequency based on the frame metric, where the second clock frequency is greater than the first clock frequency. Voltage scaling by the intraframe adjustment module 1420 may result in a corresponding digital clock frequency scaling.

In some embodiments, the frame is an LTE sub-frame having a first slot and a second slot, where the first slot includes a region with PDCCH information, and the intraframe adjustment module 1420 may be configured to detect the frame metric from within the region in the first slot. The frame metric may be a bandwidth associated with one or more packets of the received frame. The intraframe adjustment module 1420 may determine from the frame metric whether a portion of the frame is to be decoded by an LTE modem, and may scale from the first voltage to the second voltage to process the portion of the frame when a determination is made that the portion of the frame is not to be decoded by the LTE modem. The intraframe adjustment module 1420 may be configured to apply the second voltage level to one or more subsystems of the wireless communications device.

The bandwidth adjustment module 1430 may be configured to determine a bandwidth to be used at a wireless communications device from multiple bandwidths supported by the wireless communications device, to identify a voltage level to use at the wireless communications device based on the determined bandwidth, and to scale a voltage level to the identified voltage level to process a frame. Voltage scaling by the bandwidth adjustment module 1430 may result in a corresponding digital clock frequency scaling. In some embodiments, the bandwidth adjustment module 1430 is configured to transmit the frame while operating at the scaled voltage level. In other embodiments, the bandwidth adjustment module 1430 is configured to receive the frame having one or more packets, and to process at least a portion of the one or more packets of the received frame at the scaled voltage level. The bandwidth adjustment module 1430 may be configured to receive the frame having one or more packets, detect, within the received frame, a frame metric associated with one or more packets of the received frame, and process at least a portion of the one or more packets of the received frame at the scaled voltage level based on the frame metric and the determined bandwidth. Each of the bandwidths supported by the wireless communications device may have a corresponding voltage level that is different from the voltage level of another bandwidth, and the identified voltage level may be the voltage level corresponding to the determined bandwidth.

The bandwidth adjustment module 1430 may be configured to adjust, based on the determined bandwidth, one or more PHY clocks used by the wireless communications device. In some embodiments, the determination performed by the bandwidth adjustment module 1430 may include determining the bandwidth to be used at the wireless communications device based on channel conditions associated with the wireless communications device. In some embodiments, the scaling performed by the bandwidth adjustment module 1430 may include scaling to the identified voltage level from a voltage level corresponding to a bandwidth different from the determined bandwidth. The bandwidth adjustment module 1430 may be configured to apply the scaled voltage level to one or more subsystems of the wireless communications device.

The components of the DVFS module 1400 may, individually or collectively, be implemented with one or more ASICs adapted to perform some or all of the applicable functions in hardware. Each of the noted modules may be a means for performing one or more functions related to operation of the DVFS module 1400.

Figure 14B:
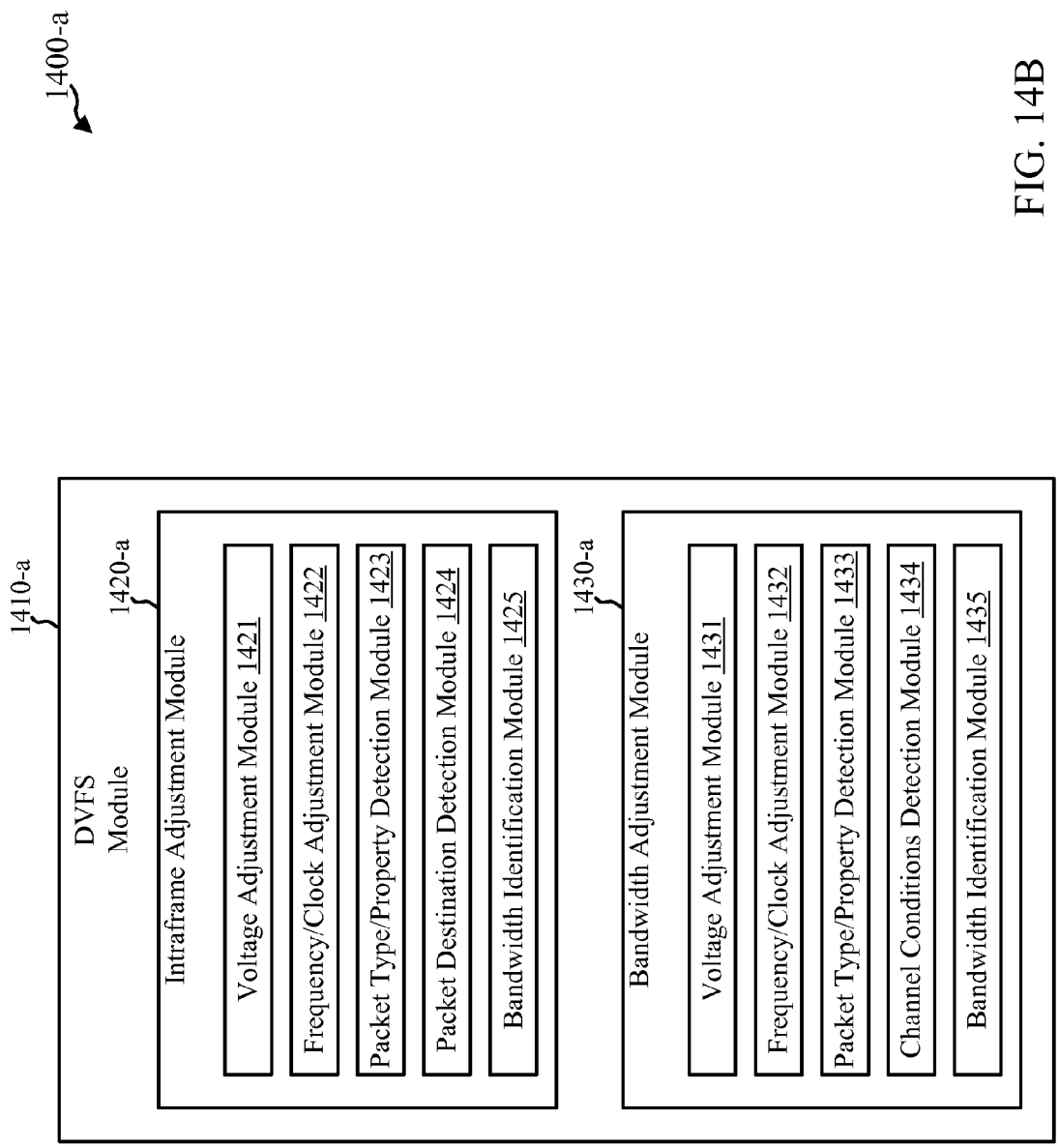
FIG. 14B shows a block diagram that illustrates another example of a dynamic scaling and frequency module according to various embodiments.

Turning next to FIG. 14B, a diagram 1400-*a* that illustrates a DVFS module 1410-*a*, which may be an example of the DVFS module 1230 of FIG. 12, the DVFS module 1330 of FIG. 13, and the DVFS module 1410 of FIG. 14A. The DVFS module 1410-*a* may include an intraframe adjustment module 1420-*a* and a bandwidth adjustment module 1430-*a*. The intraframe adjustment module 1420-*a* may be an example of the intraframe adjustment module 1420 of FIG. 14A. Similarly, the bandwidth adjustment module 1430-*a* may be an example of the bandwidth adjustment module 1430 of FIG. 14A. The DVFS module 1410-*a*, or at least portions of it, may be a processor.

The intraframe adjustment module 1420-*a* may include a voltage adjustment module 1421, a frequency/clock adjustment module 1422, a packet type/property detection module 1423, a packet destination module 1424, and a bandwidth identification module 1425. The voltage adjustment module 1421 may be configured to perform various aspects described herein related to identifying, selecting, scaling, modifying, or adjusting voltage levels. The frequency/clock adjustment module 1422 may be configured to perform various aspects described herein related to identifying, selecting, scaling, modifying, or adjusting frequencies and/or clocks. The adjustment of frequencies and/or clocks may correspond to the adjustment of voltages by the voltage adjustment module 1421. The packet type/property detection module 1423 may be configured to perform various aspects described herein related to determining and identifying packet types and properties, including but not limited to frame metrics, throughput categories, bandwidths, and grants. The packet destination module 1424 may be configured to perform various aspects described herein related to inspecting, identifying, and determining destination information for a packet or frame. The bandwidth identification module 1425 may be configured to perform various aspects described herein related to identifying one or more bandwidths and/or corresponding information such as voltage levels.

The bandwidth adjustment module 1430-*a* may include a voltage adjustment module 1431, a frequency/clock adjustment module 1432, a packet type/property detection module 1433, a channel conditions detection module 1434, and a bandwidth identification module 1435. The voltage adjustment module 1431 may be configured to perform various aspects described herein related to identifying, selecting, scaling, modifying, or adjusting voltage levels. The frequency/clock adjustment module 1432 may be configured to perform various aspects described herein related to identifying, selecting, scaling, modifying, or adjusting frequencies and/or clocks. The adjustment of frequencies and/or clocks may correspond to the adjustment of voltages by the voltage adjustment module 1431. The packet type/property detection module 1433 may be configured to perform various aspects described herein related to determining and identifying packet types and properties, including but not limited to frame metrics, throughput categories, bandwidths, and grants. The channel conditions module 1434 may be configured to perform various aspects described herein related determine channel conditions for selection of a communication bandwidth. The bandwidth identification module 1435 may be configured to perform various aspects described herein related to identifying one or more bandwidths and/or corresponding information such as voltage levels.

The components of the DVFS module 1400-*a* may, individually or collectively, be implemented with one or more ASICs adapted to perform some or all of the applicable functions in hardware. Each of the noted modules may be a means for performing one or more functions related to operation of the DVFS module 1400-*a*.

Figure 15:
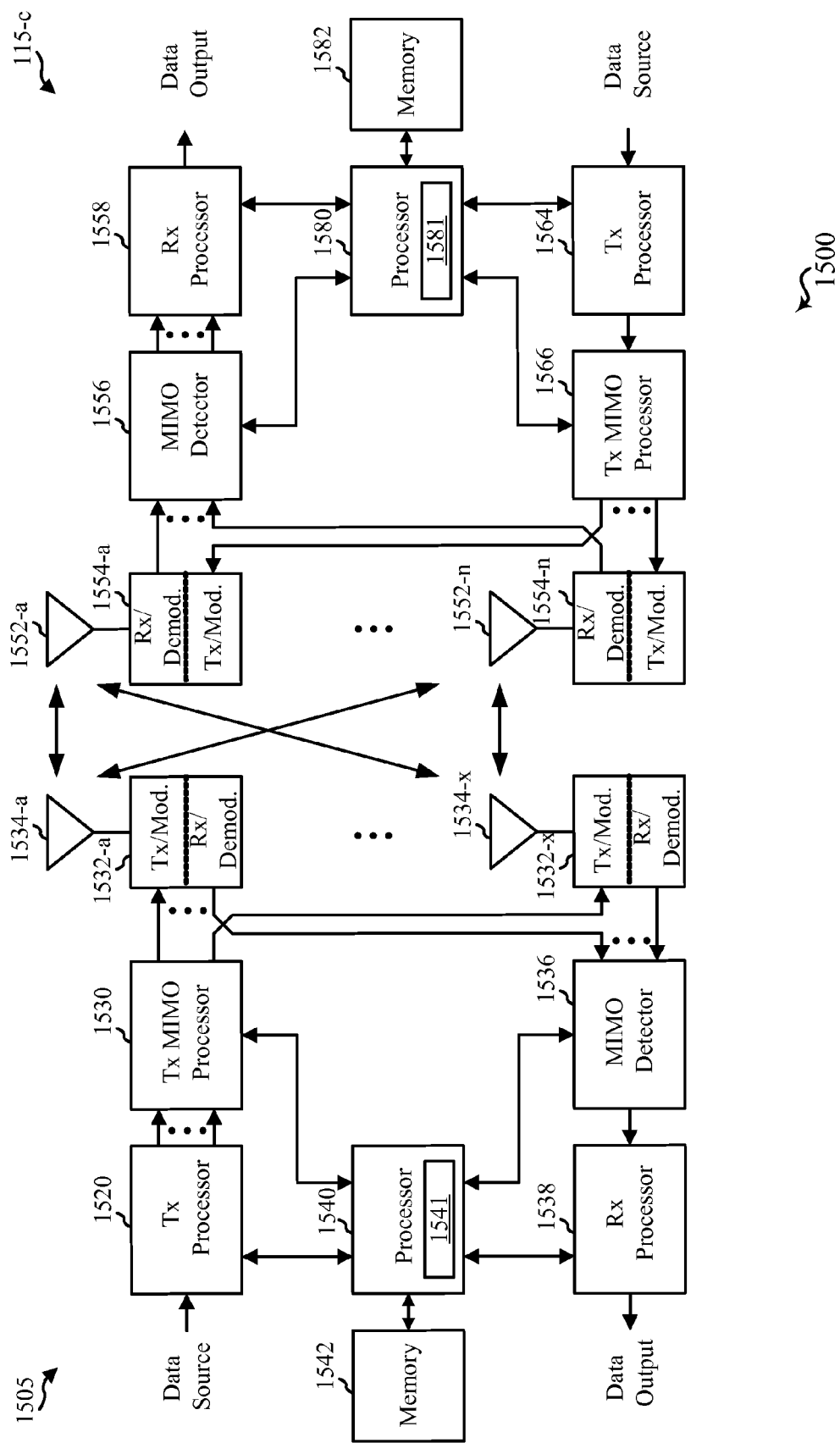
FIG. 15 shows a block diagram that illustrates an example of a multiple-input multiple-output (MIMO) communications system according to various embodiments.

Turning to FIG. 15, a block diagram of a multiple-input multiple-output (MIMO) communication system 1500 is shown including a network device 1505 and a UE 115-*c*. The network device 1505 may be an example of the base stations 105 of FIG. 1, the access points 120 and 120-*a* of FIG. 1 and FIG. 2, and the network device 1305 of FIG. 13. The UE 115-*c* may be an example of the user equipments 115 and 115-*a* of FIG. 1 and FIG. 2 and the UE 115-*b* of FIG. 12. The system 1500 may illustrate aspects of the networks of FIG. 1 and FIG. 2. The network device 1505 may be equipped with antennas 1534-*a* through 1534-*x*, and the UE 115-*c* may be equipped with antennas 1552-*a* through 1552-*n*. In the system 1500, the network device 1505 may be able to send data over multiple communication links at the same time. Each communication link may be called a "layer" and the "rank" of the communication link may indicate the number of layers used for communication. For example, in a 2×2 MIMO system where network device 1505 transmits two "layers," the rank of the communication link between the network device 1505 and the UE 115-*c* is two.

At the network device 1505, a transmit (Tx) processor 1520 may receive data from a data source. The transmit processor 1520 may process the data. The transmit processor 1520 may also generate reference symbols, and a cell-specific reference signal. A transmit (Tx) MIMO processor 1530 may perform spatial processing (e.g., precoding) on data symbols, control symbols, and/or reference symbols, if applicable, and may provide output symbol streams to the transmit modulators 1532-*a* through 1532-*x*. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-*a* through 1532-*x* may be transmitted via the antennas 1534-*a* through 1534-*x*, respectively.

At the UE 115-*c*, the antennas 1552-*a* through 1552-*n* may receive the DL signals from the network device 1505 and may provide the received signals to the demodulators 1554-*a* through 1554-*n*, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-*a* through 1554-*n*, perform MIMO detection on the received symbols if applicable, and provide detected symbols. A receive (Rx) processor 1558 may process (e.g., demodulate, deinterleave, and decode) the detected symbols, providing decoded data for the UE 115-*c* to a data output, and provide decoded control information to a processor 1580, or memory 1582. The processor 1580 may include a module 1581 that may perform functions related to dynamic voltage and frequency scaling (e.g., intraframe DVFS).

On the uplink (UL), at the UE 115-*c*, a transmit (Tx) processor 1564 may receive and process data from a data source. The transmit processor 1564 may also generate reference symbols for a reference signal. The symbols from the transmit processor 1564 may be precoded by a transmit (Tx) MIMO processor 1566 if applicable, further processed by the demodulators 1554-*a* through 1554-*n* (e.g., for SC-FDMA, etc.), and be transmitted to the network device 1505 in accordance with the transmission parameters received from the network device 1505. At the network device 1505, the UL signals from the UE 115-*c* may be received by the antennas 1534, processed by the demodulators 1532, detected by a MIMO detector 1536 if applicable, and further processed by a receive processor. The receive (Rx) processor 1538 may provide decoded data to a data output and to the processor 1540. The processor 1540 may include a module 1541 that may perform functions related to dynamic voltage and frequency scaling (e.g., intraframe DVFS). The components of the network device 1505 may, individually or collectively, be implemented with one or more ASICs adapted to perform some or all of the applicable functions in hardware. Each of the noted modules may be a means for performing one or more functions related to operation of the system 1500. Similarly, the components of the UE 115-*c* may, individually or collectively, be implemented with one or more ASICs adapted to perform some or all of the applicable functions in hardware. Each of the noted components may be a means for performing one or more functions related to operation of the system 1500.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. The MAC layer may perform priority handling and multiplexing of logical channels into transport channels. The MAC layer may also use Hybrid ARQ (HARM) to provide retransmission at the MAC layer to improve link efficiency. At the PHY layer, the transport channels may be mapped to Physical channels.

Figure 16:
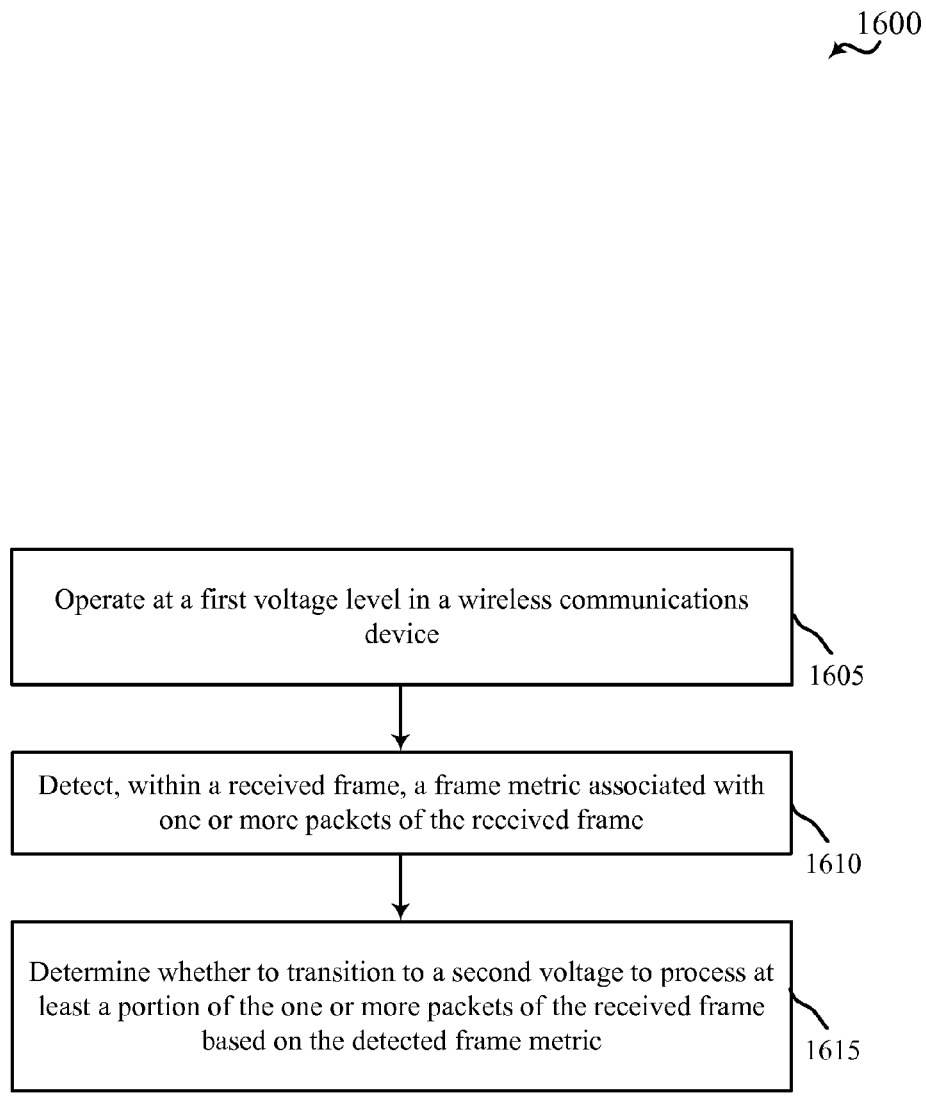
FIG. 16 is a flowchart of an example of a method for dynamic voltage and frequency scaling according to various embodiments.

Turning next to FIG. 16, a flowchart is shown of an example method 1600 for intraframe dynamic voltage and frequency scaling. The method 1600 may be performed using, for example, the user equipments 115 of FIG. 1, FIG. 2, FIG. 2, and FIG. 15; the access points 120 of FIG. 1 and FIG. 2, the network devices 1305 and 1505 of FIG. 13 and FIG. 15; the devices 300, 810, 810-*a*, 910, and 910-*a* of FIG. 3, FIG. 8A, FIG. 8B, FIG. 9A, and FIG. 9B; and/or the DVFS modules 1230, 1330, 1410, and 1410-*a* of FIG. 12, FIG. 13, FIG. 14A, and FIG. 14B.

At block 1605, a wireless communications device (e.g., UE 115, APs 120, base stations 105) may operate at a first voltage level. At block 1610, a frame metric (e.g., throughput category, bandwidth, grant, destination) associated with one of more packets of a received frame may be detected within the frame. At block 1615, a determination is made as to whether to transition to a second voltage to process at least a portion of the one or more packets of the received frame based on the detected transmission category.

In some embodiments of the method 1600, the first voltage level is scaled to the second voltage level, where the second voltage level is greater than the first voltage level. The method may include scaling from the second voltage level to the first voltage level for a next received frame after processing the at least a portion of the one or more packets of the received frame at the second voltage level. The method may include detecting the frame metric within a preamble of the received frame. In some embodiments, the one or more packets in the received frame are IEEE 802.11 ac packets. Moreover, the one or more packets may be VHT packets, and the detecting may include detecting the frame metric during the VHT-STF of the received VHT packet. The method may include scaling from the first voltage level to the second voltage level within the VHT packet, where the second voltage level is greater than the first voltage level.

In some embodiments of the method 1600, the method may include determining whether the frame is destined for the wireless communications device, and operating at the first voltage level when the frame is not destined for the wireless communications device. In some embodiments, the determination includes identifying a MAC portion of the frame and determining a destination of the frame from the MAC portion of the frame (e.g., MAC RA). In other embodiments, the determination includes identifying a pAID field or a GID field in the frame, and determining a destination of the frame from the pAID field or the GID field.

In some embodiments of the method 1600, HT packets may be handled and the scaling includes scaling from the first voltage level to the second voltage level to process at least a portion of the HT packet, where the second voltage level is greater than the first voltage level. In some cases, legacy packets may be handled and the method includes maintaining the first voltage level for processing the legacy packet.

In some embodiments of the method 1600, the method includes identifying a bandwidth associated with the one or more packets of received frame, and scaling from the first voltage level to the second voltage level based at least in part on the frame metric and the identified bandwidth. The method may include identifying a different bandwidth associated with the one or more packets of received frame, and scaling from the second voltage level to a third voltage level based at least in part on the frame metric and the identified different bandwidth. The method may include scaling from a first clock frequency to a second clock frequency based on the frame metric, where the second clock frequency is greater than the first clock frequency.

In some embodiments of the method 1600, the frame is an LTE sub-frame having a first slot and a second slot, where the first slot includes a region with PDCCH information, and the method includes detecting the frame metric from within the region in the first slot. The frame metric may be a bandwidth associated with one or more packets of the received frame. The method may include applying the second voltage level to one or more subsystems of the wireless communications device.

Figure 17:
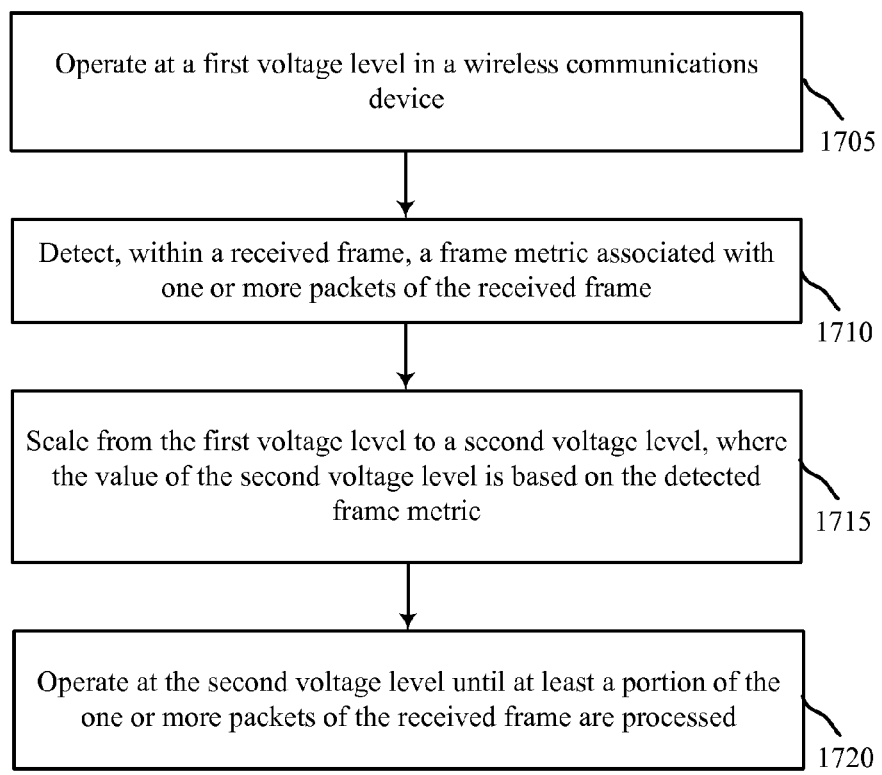
FIG. 17 is a flowchart of an example of another method for dynamic voltage and frequency scaling according to various embodiments.

Turning next to FIG. 17, a flowchart is shown of an example method 1700 for intraframe dynamic voltage and frequency scaling. The method 1700, like the method 1600 above, may be performed using, for example, the user equipments 115 of FIG. 1, FIG. 2, FIG. 2, and FIG. 15; the access points 120 of FIG. 1 and FIG. 2, the network devices 1305 and 1505 of FIG. 13 and FIG. 15; the devices 300, 810, 810-*a*, 910, and 910-*a* of FIG. 3, FIG. 8A, FIG. 8B, FIG. 9A, and FIG. 9B; and/or the DVFS modules 1230, 1330, 1410, and 1410-*a* of FIG. 12, FIG. 13, FIG. 14A, and FIG. 14B.

At block 1705, a wireless communications device (e.g., UE 115, APs 120, base stations 105) may operate at a first voltage level. At block 1710, a frame metric (e.g., throughput category, bandwidth, grant, destination) associated with one of more packets of a received frame may be detected within the frame. At block 1715, the first voltage level is scaled to a second voltage level, where the value of the second voltage level is based on the detected frame metric. At block 1720, the wireless communications device may operate at the second voltage level until at least a portion of the one or more packets of the received frame are processed.

Figure 18:
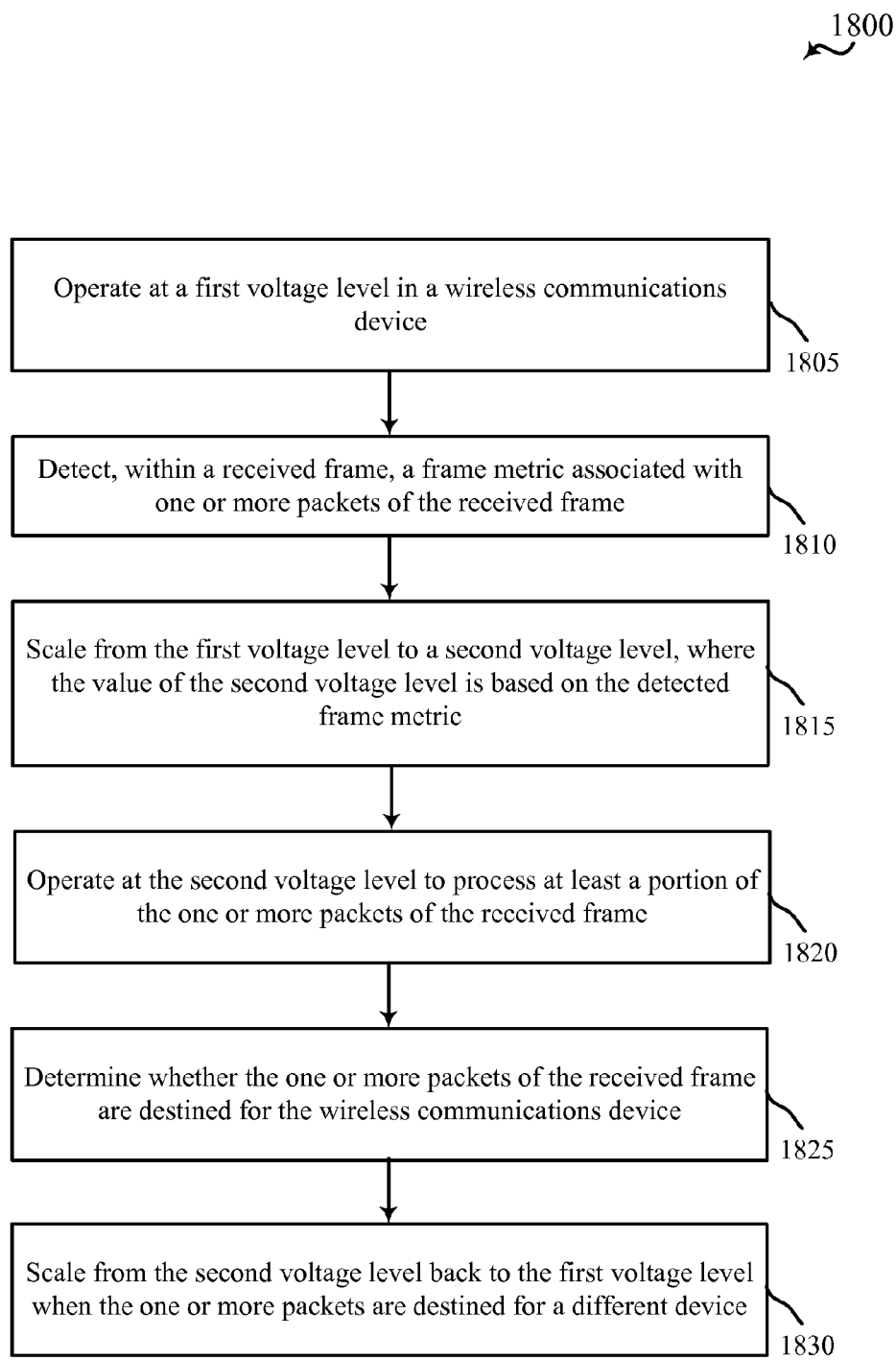
FIG. 18 is a flowchart of an example of yet another method for dynamic voltage and frequency scaling according to various embodiments.

Turning to FIG. 18, a flowchart is shown of an example method 1800 for intraframe dynamic voltage and frequency scaling. The method 1800, like the methods 1600 and 1700 above, may be performed using, for example, the user equipments 115 of FIG. 1, FIG. 2, FIG. 2, and FIG. 15; the access points 120 of FIG. 1 and FIG. 2, the network devices 1305 and 1505 of FIG. 13 and FIG. 15; the devices 300, 810, 810-*a*, 910, and 910-*a* of FIG. 3, FIG. 8A, FIG. 8B, FIG. 9A, and FIG. 9B; and/or the DVFS modules 1230, 1330, 1410, and 1410-*a* of FIG. 12, FIG. 13, FIG. 14A, and FIG. 14B.

At block 1805, a wireless communications device (e.g., UE 115, APs 120, base stations 105) may operate at a first voltage level. At block 1810, a frame metric (e.g., throughput category, bandwidth, grant, destination) associated with one or more packets of a received frame may be detected within the frame. At block 1815, the first voltage level is scaled to a second voltage level, where the value of the second voltage level is based on the detected frame metric. At block 1820, the wireless communications device may operate at the second voltage level to process at least a portion of the one or more packets of the received frame. At block 1825, it may be determined whether the one or more packets of the received frame are destined or directed to the wireless communications device. At 1830, the second voltage level may be scaled back to the first voltage level when the one or more packet are destined for a different device.

Turning next to FIG. 19, a flowchart is shown of an example method 1900 for dynamic voltage and frequency scaling. The method 1900, like the methods 1600, 1700, and 1800 above, may be performed using, for example, the user equipments 115 of FIG. 1, FIG. 2, FIG. 2, and FIG. 15; the access points 120 of FIG. 1 and FIG. 2, the network devices 1305 and 1505 of FIG. 13 and FIG. 15; the devices 300, 810, 810-*a*, 910, and 910-*a* of FIG. 3, FIG. 8A, FIG. 8B, FIG. 9A, and FIG. 9B; and/or the DVFS modules 1230, 1330, 1410, and 1410-*a* of FIG. 12, FIG. 13, FIG. 14A, and FIG. 14B.

At block 1905, a bandwidth to be used by a wireless communications device (e.g., UE 115, APs 120, base stations 105) may be determined from multiple bandwidths supported by the wireless communications device. At block 1910, a voltage level is identified to use at the wireless communications device based on the determined bandwidth. At block 1915, a voltage level is scaled to the identified voltage level to process a frame.

In some embodiments of the method 1900, the method includes transmitting the frame while operating at the scaled voltage level. The method may include receiving the frame having one or more packets, and processing at least a portion of the one or more packets of the received frame at the scaled voltage level. The method may include receiving the frame having one or more packets, detecting, within the received frame, a frame metric associated with one or more packets of the received frame, and processing at least a portion of the one or more packets of the received frame at the scaled voltage level based on the frame metric and the determined bandwidth. Each of the bandwidths supported by the wireless communications device may have a corresponding voltage level that is different from the voltage level of another bandwidth, and the identified voltage level may be the voltage level corresponding to the determined bandwidth.

In some embodiments of the method 1900, the method includes adjusting, based on the determined bandwidth, one or more PHY clocks used by the wireless communications device. The determining may include determining the bandwidth to be used at the wireless communications device based on channel conditions associated with the wireless communications device. In some embodiments, the scaling may include scaling to the identified voltage level from a voltage level corresponding to a bandwidth different from the determined bandwidth. The method may include applying the scaled voltage level to one or more subsystems of the wireless communications device.

Turning to FIG. 20, a flowchart is shown of an example method 2000 for dynamic voltage and frequency scaling. The method 2000, like the methods 1600, 1700, 1800, and 1900 above, may be performed using, for example, the user equipments 115 of FIG. 1, FIG. 2, FIG. 2, and FIG. 15; the access points 120 of FIG. 1 and FIG. 2, the network devices 1305 and 1505 of FIG. 13 and FIG. 15; the devices 300, 800, 810-a, 910, and 910-a of FIG. 3, FIG. 8A, FIG. 8B, FIG. 9A, and FIG. 9B; and/or the DVFS modules 1230, 1330, 1410, and 1410-a of FIG. 12, FIG. 13, FIG. 14A, and FIG. 14B.

At block 2005, a frame including one or more packets may be received. At block 2010, a bandwidth to be used by a wireless communications device (e.g., UE 115, APs 120, base stations 105) may be determined from multiple bandwidths supported by the wireless communications device. At block 2015, a voltage level is identified to use at the wireless communications device based on the determined bandwidth. At block 2020, a voltage level is scaled to the identified voltage level. At block 2025, at least a portion of the one or more packets of the received frame are processed at the scaled voltage level.

Turning next to FIG. 21, a flowchart is shown of an example method 2100 for dynamic voltage and frequency scaling. The method 2100, like the methods 1600, 1700, 1800, 1900, and 2000 above, may be performed using, for example, the user equipments 115 of FIG. 1, FIG. 2, FIG. 2, and FIG. 15; the access points 120 of FIG. 1 and FIG. 2; the network devices 1305 and 1505 of FIG. 13 and FIG. 15; the devices 300, 810, 810-a, 900, and 900-a of FIG. 3, FIG. 8A, FIG. 8B, FIG. 9A, and FIG. 9B; and/or the DVFS modules 1230, 1330, 1410, and 1410-a of FIG. 12, FIG. 13, FIG. 14A, and FIG. 14B.

At block 2105, channel conditions associated with a wireless communications device (e.g., UE 115, APs 120, base stations 105) may be determined. At block 2110, a bandwidth to be used by the wireless communications device may be determined from multiple bandwidths supported by the wireless communications device. At block 2115, a voltage level is identified to use at the wireless communications device based on the determined bandwidth. At block 2120, a voltage level is scaled to the identified voltage level. At block 2125, the frame may be transmitted while operating at the scaled voltage level.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, instructions, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media. Any combination of one or more non-transitory computer readable medium(s) may be utilized. Non-transitory computer-readable media comprise all computer-readable media, with the sole exception being a transitory, propagating signal.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein; the disclosure is to be accorded the widest scope consistent with the principles and novel features disclosed herein.

What is claimed is:

1. A method for wireless communications, comprising:
operating at a first voltage level in a wireless communications device;
detecting, based at least in part on information within a first portion of a received frame, a throughput category corresponding to a bandwidth of one or more packets of the received frame; and
determining whether to transition, during processing of the first portion of the received frame, to a second voltage level to process at least a portion of the one or more packets including a second portion of the received frame based at least in part on the detected throughput category, wherein the transition to the second voltage level occurs during processing of the first portion of the received frame, and wherein the second portion of the received frame is subsequent to the first portion of the received frame.

2. The method of claim 1, further comprising:
detecting, based at least in part on the information within the first portion of the received frame or information within the second portion of the received frame, one or more of a destination of a packet, a transmission grant, and a reception grant.

3. The method of claim 1, further comprising:
scaling from the first voltage level to the second voltage level, the second voltage level being greater than the first voltage level.

4. The method of claim 1, further comprising:
scaling from the second voltage level to the first voltage level for a next received frame after processing the at least a portion of the one or more packets including the second portion of the received frame at the second voltage level.

5. The method of claim 1, wherein the detecting comprises:
detecting the throughput category within a preamble of the received frame.

6. The method of claim 1, wherein:
the one or more packets in the received frame is an IEEE 802.11 packet.

7. The method of claim 6, wherein:
the one or more packets is a very high throughput (VHT) packet, and
the detecting comprises detecting the throughput category during the VHT short training field (VHT-STF) of the received VHT packet.

8. The method of claim 7, further comprising:
scaling from the first voltage level to the second voltage level within the VHT packet, the second voltage level being greater than the first voltage level.

9. The method of claim 1, further comprising:
determining whether the received frame is destined for the wireless communications device; and
operating at the first voltage level when the received frame is not destined for the wireless communications device.

10. The method of claim 9, wherein the determining comprises:
identifying a media access control (MAC) portion of the received frame; and
determining a destination of the received frame from the MAC portion of the received frame.

11. The method of claim 9, wherein the determining comprises:
identifying a pAID field or a GID field in the received frame; and
determining a destination of the received frame from the pAID field or the GID field.

12. The method of claim 1, wherein the one or more packets is a high throughput (HT) packet, the method comprising:
scaling from the first voltage level to the second voltage level to process at least a portion of the HT packet, the second voltage level being greater than the first voltage level.

13. The method of claim 1, wherein the one or more packets is a legacy packet, the method comprising:
maintaining the first voltage level for processing the legacy packet.

14. The method of claim 1, further comprising:
identifying a bandwidth associated with the one or more packets of the received frame; and
scaling from the first voltage level to the second voltage level based at least in part on the throughput category and the identified bandwidth.

15. The method of claim 14, further comprising:
identifying a different bandwidth associated with the one or more packets of the received frame; and
scaling from the second voltage level to a third voltage level based at least in part on the throughput category and the identified different bandwidth.

16. The method of claim 1, further comprising:
scaling from a first clock frequency to a second clock frequency based at least in part on the throughput category, the second clock frequency being greater than the first clock frequency.

17. The method of claim 1, wherein:
the received frame is an LTE sub-frame comprising a first slot and a second slot, the first slot comprising a region with physical downlink control channel (PDCCH) information, and
the detecting comprises detecting the throughput category within the region in the first slot.

18. The method of claim 17, further comprising:
determining from the throughput category whether a portion of the received frame is to be decoded by an LTE modem; and
scaling from the first voltage level to the second voltage level to process the portion of the received frame when a determination is made that the portion of the received frame is not to be decoded by the LTE modem.

19. The method of claim 1, further comprising:
applying the second voltage level to one or more subsystems of the wireless communications device.

20. An apparatus for wireless communications, comprising:
means for operating at a first voltage level in a wireless communications device;
means for detecting, based at least in part on information within a first portion of a received frame, a throughput category corresponding to a bandwidth of one or more packets of the received frame; and
means for determining whether to transition, during processing of the first portion of the received frame, to a second voltage level to process at least a portion of the one or more packets including a second portion of the received frame based at least in part on the detected throughput category, wherein the transition to the second voltage level occurs during processing of the first portion of the received frame, and wherein the second portion of the received frame is subsequent to the first portion of the received frame.

21. A wireless communications device, comprising:

a processor; and a memory in electronic communication with the processor, instructions stored in the memory being executable by the processor to:

operate at a first voltage level in the wireless communications device;

detect, based at least in part on information within a first portion of a received frame, a throughput category corresponding to a bandwidth of one or more packets of the received frame; and determine whether to transition, during processing of the first portion of the received frame, to a second voltage level to process at least a portion of the one or more packets including a second portion of the received frame based at least in part on the detected throughput category, wherein the transition to the second voltage level occurs during processing of the first portion of the received frame, and wherein the second portion of the received frame is subsequent to the first portion of the received frame.

22. A wireless communications device, comprising:

a detector configured to detect, based at least in part on information within a first portion of a received frame, a throughput category corresponding to a bandwidth of one or more packets of the received frame; and a voltage adjuster configured to:

operate at a first voltage level, and determine whether to transition, during processing of the first portion of the received frame, to a second voltage level to process at least a portion of the one or more packets including a second portion of the received frame based at least in part on the detected throughput category, wherein the transition to the second voltage level occurs during processing of the first portion of the received frame, and wherein the second portion of the received frame is subsequent to the first portion of the received frame.

23. A computer program product, comprising:

a non-transitory computer-readable medium comprising:

code for causing at least one computer to operate at a first voltage level in a wireless communications device;

code for causing the at least one computer to detect, based at least in part on information within a first portion of a received frame, a throughput category corresponding to a bandwidth of one or more packets of the received frame; and code for causing the at least one computer to determine whether to transition, during processing of the first portion of the received frame, to a second voltage level to process at least a portion of the one or more packets including a second portion of the received frame based at least in part on the detected throughput category, wherein the transition to the second voltage level occurs during processing of the first portion of the received frame, and wherein the second portion of the received frame is subsequent to the first portion of the received frame.

* * * * *